US010491122B2

United States Patent
Goto et al.

(10) Patent No.: US 10,491,122 B2
(45) Date of Patent: Nov. 26, 2019

(54) POWER SUPPLY SYSTEM FOR CONTROLLING DC VOLTAGE BETWEEN POWER LINES

(71) Applicant: TOYOTA JIDOSHA KABUSHIKI KAISHA, Toyota-shi, Aichi-ken (JP)

(72) Inventors: Shigeaki Goto, Nagakute (JP); Shuji Tomura, Nagakute (JP); Naoki Yanagizawa, Nagakute (JP); Masaki Okamura, Toyota (JP); Naoyoshi Takamatsu, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/754,164

(22) PCT Filed: Aug. 31, 2016

(86) PCT No.: PCT/JP2016/075393
§ 371 (c)(1),
(2) Date: Feb. 21, 2018

(87) PCT Pub. No.: WO2017/038842
PCT Pub. Date: Mar. 9, 2017

(65) Prior Publication Data
US 2018/0248484 A1 Aug. 30, 2018

(30) Foreign Application Priority Data
Sep. 1, 2015 (JP) ................... 2015-172055

(51) Int. Cl.
*H02M 3/158* (2006.01)
*B60L 50/51* (2019.01)
(Continued)

(52) U.S. Cl.
CPC .......... *H02M 3/1588* (2013.01); *B60L 50/51* (2019.02); *B60L 58/21* (2019.02); *H02M 3/158* (2013.01);
(Continued)

(58) Field of Classification Search
CPC ..................................... H02M 3/158
See application file for complete search history.

(56) References Cited

U.S. PATENT DOCUMENTS

2012/0099348 A1\* 4/2012 Umetani ............... H02M 3/158
363/37
2012/0187887 A1\* 7/2012 Sone ................... B60L 11/1868
318/504
(Continued)

FOREIGN PATENT DOCUMENTS

JP 2013-013234 A 1/2013
JP 2013-046446 A 3/2013
(Continued)

*Primary Examiner* — Jue Zhang
*Assistant Examiner* — Trinh Q Dang
(74) *Attorney, Agent, or Firm* — Oliff PLC

(57) ABSTRACT

A relative maximum point and a relative minimum point, are provided in a first reactor current and a second reactor current within one control cycle as a result of control of on and off of switching elements. At least one of the inflection points in the first and second reactor currents, a plurality of switching elements to simultaneously be turned on or and off are controlled to be turned on or off in a prescribed order with a time lag being set. At the inflection point with the time lag being set, a switching loss is produced in a switching element turned on later or a switching element turned on earlier in accordance with the prescribed order.

10 Claims, 44 Drawing Sheets

(51) Int. Cl.
  *B60L 58/21* (2019.01)
  *H02J 1/10* (2006.01)
  *H02M 1/00* (2006.01)

(52) U.S. Cl.
  CPC ........... *B60L 2210/10* (2013.01); *H02J 1/102* (2013.01); *H02M 3/1584* (2013.01); *H02M 2001/0048* (2013.01); *H02M 2001/0077* (2013.01); *H02M 2003/1586* (2013.01); *Y02T 10/7005* (2013.01); *Y02T 10/7061* (2013.01); *Y02T 10/92* (2013.01)

(56) References Cited

U.S. PATENT DOCUMENTS

| | | | |
|---|---|---|---|
| 2014/0049238 A1* | 2/2014 | Hu | G01R 19/00 |
| | | | 323/282 |
| 2014/0145694 A1 | 5/2014 | Ishigaki et al. | |
| 2015/0084611 A1* | 3/2015 | Agrawal | H02M 3/158 |
| | | | 323/282 |
| 2017/0018921 A1 | 1/2017 | Tomura et al. | |
| 2017/0077810 A1 | 3/2017 | Goto et al. | |

FOREIGN PATENT DOCUMENTS

| | | |
|---|---|---|
| JP | 2015-165759 A | 9/2015 |
| JP | 2016-178812 A | 10/2016 |

\* cited by examiner

FIG.9
(a)
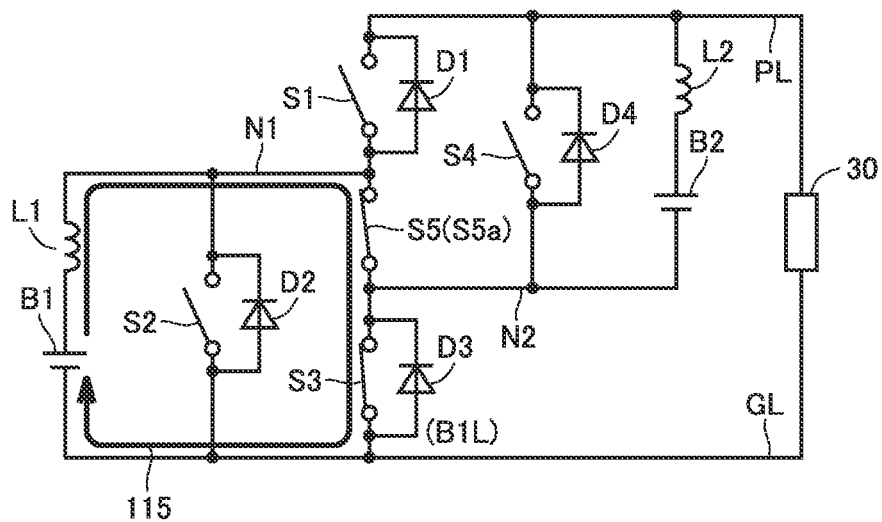
(b)
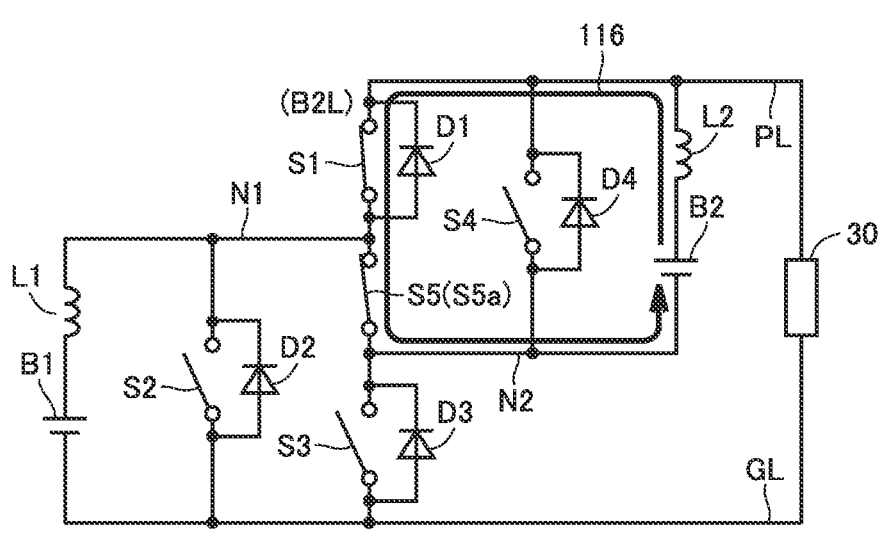

FIG.10
(a)
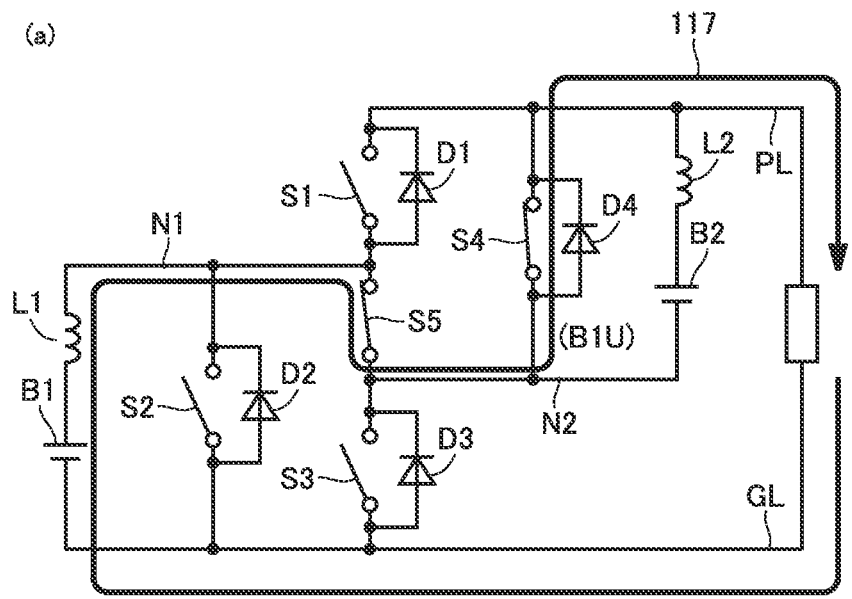
(b)
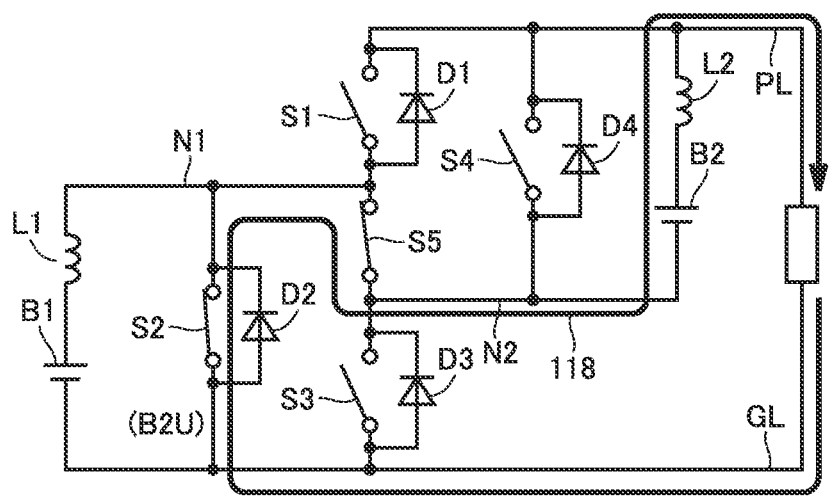

FIG.11

|  |  | S1 | S2 | S3 | S4 | S5 |
|---|---|---|---|---|---|---|
| FIRST ARM (S5:OFF) | B1 UPPER(B1U)ON | ON | (OFF) | — | — | — |
|  | B1 LOWER(B1L)ON | (OFF) | ON | — | — | — |
|  | B2 UPPER(B2U)ON | — | — | ON | (OFF) | — |
|  | B2 LOWER(B2L)ON | — | — | (OFF) | ON | — |
| SECOND ARM (S5:ON) | B1 UPPER(B1U)ON | — | — | (OFF) | ON | ON |
|  | B1 LOWER(B1L)ON | — | — | ON | (OFF) | ON |
|  | B2 UPPER(B2U)ON | (OFF) | ON | — | — | ON |
|  | B2 LOWER(B2L)ON | ON | (OFF) | — | — | ON |

FIG.12

| SWITCH | GATE BOOLEAN EXPRESSION |
|---|---|
| S1 | /SD1 |
| S2 | SD1 |
| S3 | /SD2 |
| S4 | SD2 |
| S5a | SD1 OR SD2 (SD1 XOR SD2) |
| S5b | /SD1 OR /SD2 (SD1 XOR SD2) |

| PATTERN | SD1 | SD2 | S1 | S2 | S3 | S4 | S5a | S5b |
|---|---|---|---|---|---|---|---|---|
| I | H (I[1]INCREASE) | L (I[2]DECREASE) | OFF | ON | ON | OFF | ON | ON |
| II | H (I[1]INCREASE) | H (I[2]INCREASE) | OFF | ON | OFF | ON | ON | OFF |
| III | L (I[1]DECREASE) | H (I[2]INCREASE) | ON | OFF | OFF | ON | ON | ON |
| IV | L (I[1]DECREASE) | L (I[2]DECREASE) | ON | OFF | ON | OFF | OFF | ON |

FIG.17
(a)
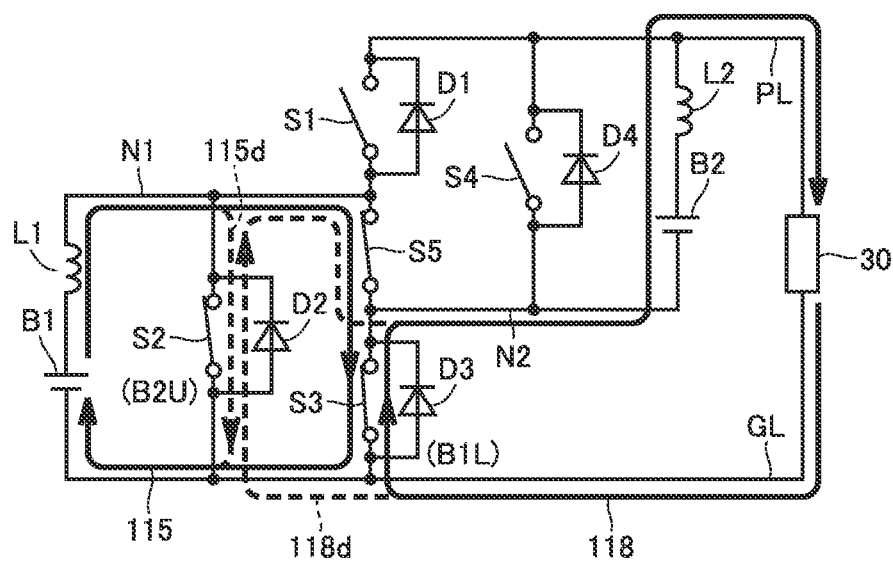
(b)
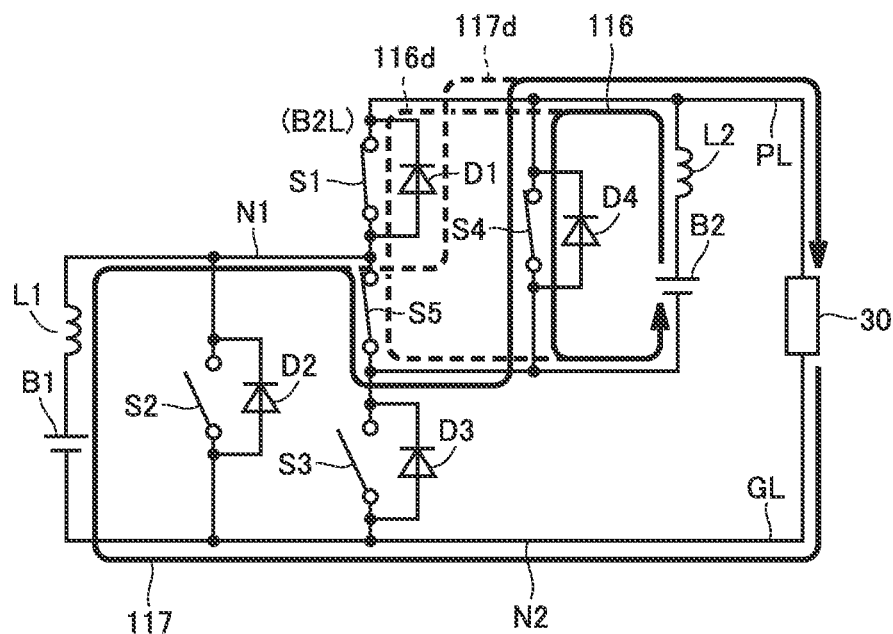

FIG.20
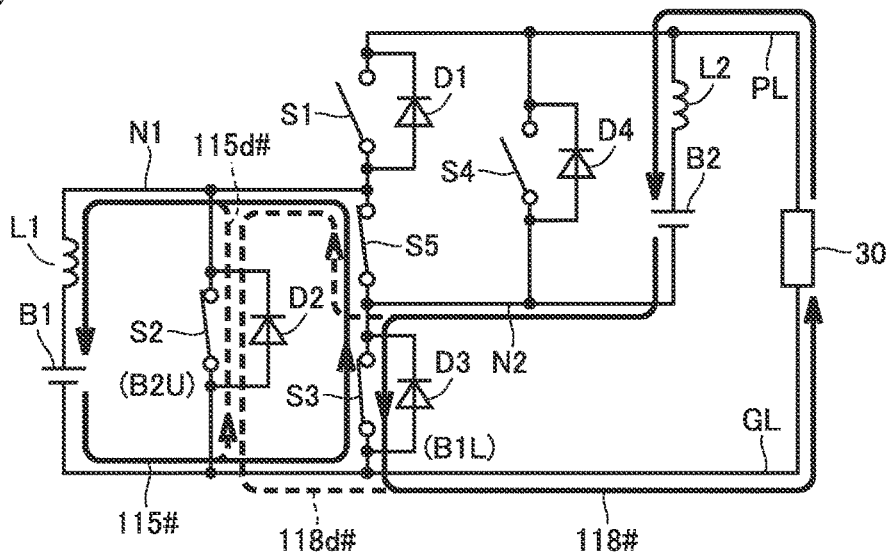
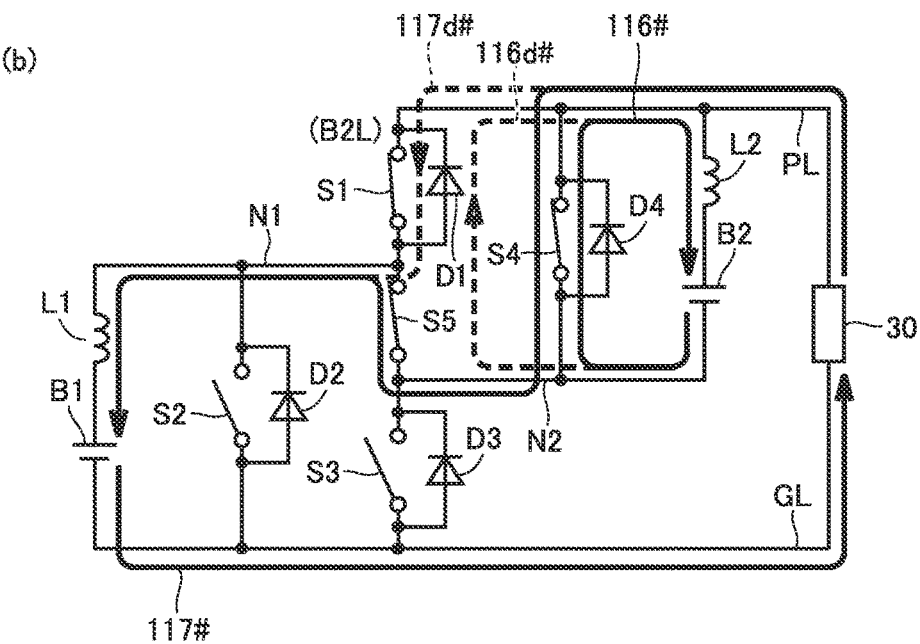

FIG.22
(a) WITHOUT TIME LAG (FIG. 19)
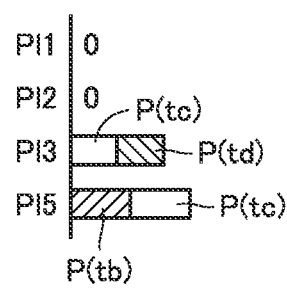
(b) WITH TIME LAG (FIG. 21)
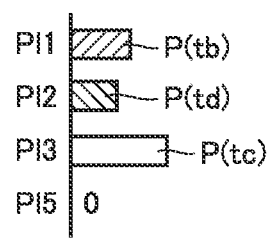

FIG.25
(a) WITHOUT TIME LAG (FIG. 23)
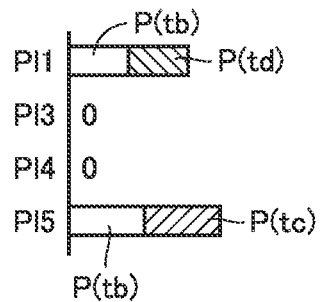
(b) WITH TIME LAG (FIG. 24)
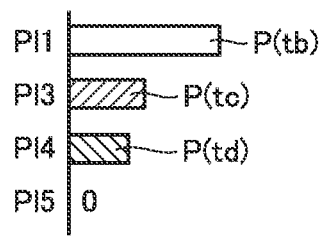

FIG.28
(a) WITHOUT TIME LAG (FIG. 26)
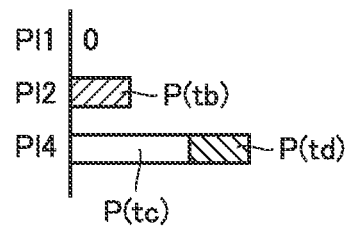
(b) WITH TIME LAG (FIG. 27)
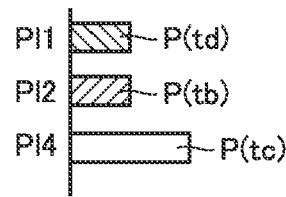

FIG.31
(a) WITHOUT TIME LAG (FIG. 29)
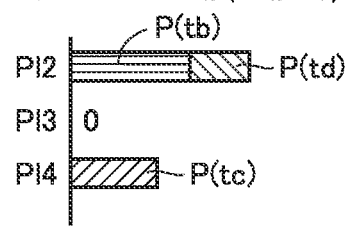
(b) WITH TIME LAG (FIG. 30)
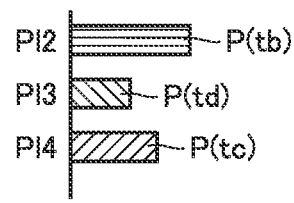

FIG.32

| | HIGH CURRENT | TIME LAG | S1 | S2 | S3 | S4 | S5 |
|---|---|---|---|---|---|---|---|
| REGENERATION ($IL1<0$, $IL2<0$) | IL2 (FIG. 22) | NO | — | — | LOSS ($\Delta I+\Delta I$) | — | LOSS (IL1+IL1) |
| | | YES | LOSS (IL1) | LOSS ($\Delta I$) | LOSS (IL2) | — | — |
| | IL1 (FIG. 25) | NO | LOSS ($\Delta I+\Delta I$) | — | — | — | LOSS (IL2+IL2) |
| | | YES | LOSS (IL1) | — | LOSS (IL2) | LOSS ($\Delta I$) | — |
| POWER RUNNING ($IL1>0$, $IL2>0$) | IL2 (FIG. 28) | NO | — | LOSS (IL1) | — | LOSS (IL2+$\Delta I$) | — |
| | | YES | LOSS ($\Delta I$) | LOSS (IL1) | — | LOSS (IL2) | — |
| | IL1 (FIG. 31) | NO | — | LOSS (IL1+$\Delta I$) | — | LOSS (IL2) | — |
| | | YES | — | LOSS (IL1) | LOSS ($\Delta I$) | LOSS (IL2) | — |

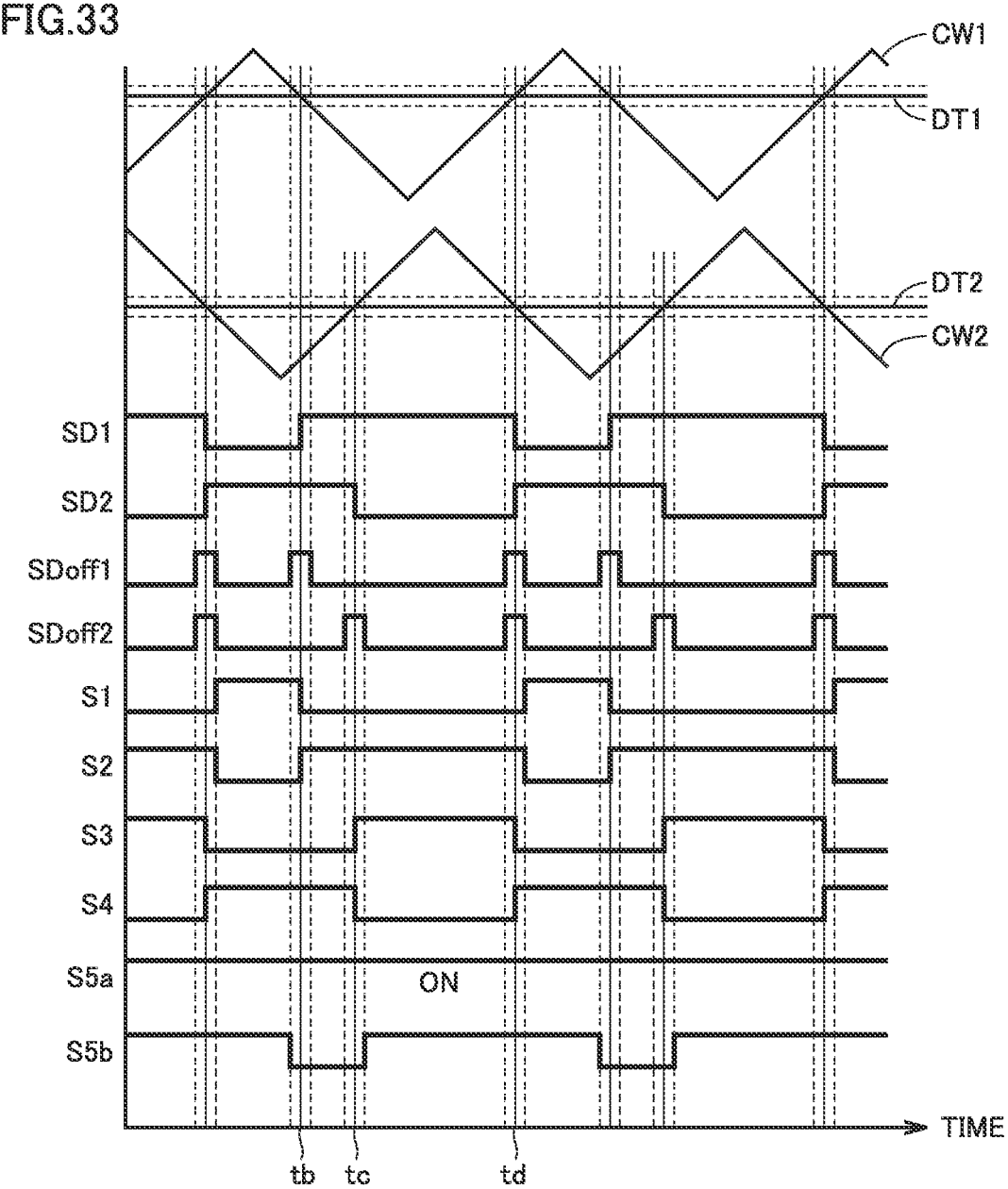

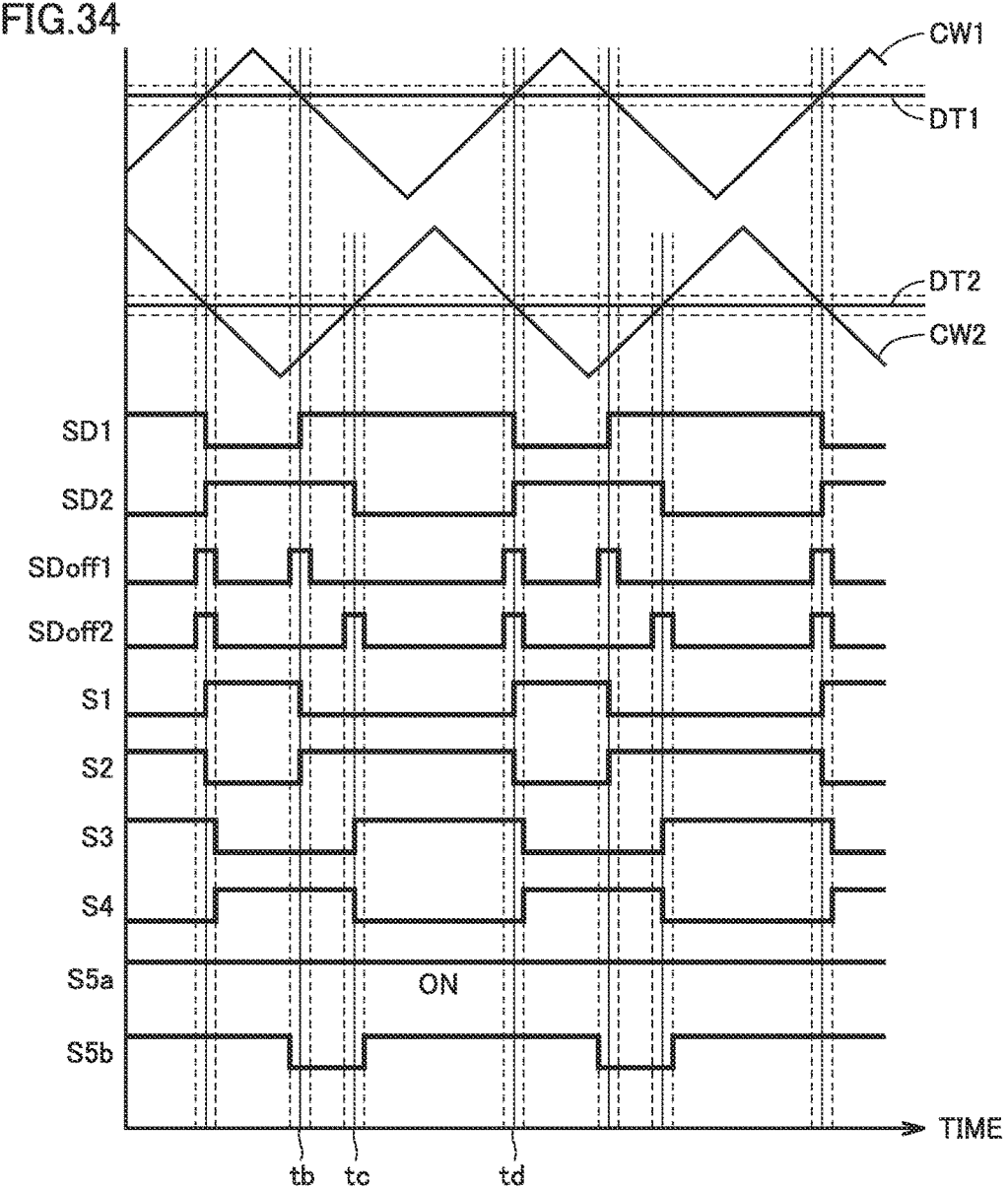

| SWITCH | BOOLEAN EXPRESSION |
|---|---|
| S1 | /SD1 |
| S2 | SD1 |
| S3 | /SD2 |
| S4 | SD2 |
| S5 | SD1 xor SD2 |

| SWITCH | GATE BOOLEAN EXPRESSION |
|--------|-------------------------|
| S1     | FIXED TO L(OFF)         |
| S2     | SD                      |
| S3     | FIXED TO L(OFF)         |
| S4     | SD                      |
| S5a    | FIXED TO H(ON)          |
| S5b    | /SD                     |

| SWITCH | GATE BOOLEAN EXPRESSION |
|---|---|
| S1 | FIXED TO L(OFF) |
| S2 | SD |
| S3 | FIXED TO L(OFF) |
| S4 | SD |
| S5 | /SD |

FIG.53

| MODE | POWER SUPPLY | OUTPUT VOLTAGE | S1 | S2 | S3 | S4 | S5 (S5a,S5b) |
|---|---|---|---|---|---|---|---|
| PARALLEL BOOST | B1, B2 | VH → VH* | ON/OFF CONTROL IN ACCORDANCE WITH FIG. 12 (FIG. 38) | | | | |
| SERIES BOOST | B1, B2 | VH → VH* | ON/OFF CONTROL IN ACCORDANCE WITH FIG. 49 (FIG. 52) | | | | |
| B1 BOOST | ONLY B1 | VH → VH* | /SD1 | SD1 | FIX TO OFF | FIX TO OFF | FIX TO OFF |
| B2 BOOST | ONLY B2 | VH → VH* | FIX TO OFF | FIX TO OFF | /SD2 | SD2 | FIX TO OFF |
| B1 DIRECT COUPLING | ONLY B1 | V[1] (>V[2]) | FIX TO ON | FIX TO OFF | FIX TO OFF | FIX TO OFF | FIX TO OFF |
| B2 DIRECT COUPLING | ONLY B2 | V[2] (>V[1]) | FIX TO OFF | FIX TO OFF | FIX TO ON | FIX TO OFF | FIX TO OFF |
| SERIES DIRECT COUPLING | B1, B2 | V[1] + V[2] | FIX TO OFF | FIX TO OFF | FIX TO OFF | FIX TO OFF | FIX TO ON |
| PARALLEL DIRECT COUPLING | B1, B2 | wax(V[1],V[2]) | FIX TO ON | FIX TO OFF | FIX TO ON | FIX TO OFF | FIX TO OFF |

POWER SUPPLY SYSTEM FOR CONTROLLING DC VOLTAGE BETWEEN POWER LINES

TECHNICAL FIELD

This invention relates to a power supply system, and more particularly to control of a power supply system configured to include a power converter connected between two direct-current (DC) power supplies and a common power line.

BACKGROUND ART

A hybrid power supply system supplying, by using a power converter connected between a plurality of power supplies and a load, power supply to the load with the plurality of power supplies being combined, has been employed.

For example, Japanese Patent Laying-Open No. 2013-46446 (PTD 1) describes a power supply system for a vehicle in which boost choppers (power converters) provided for each of a secondary battery and an auxiliary power supply which can be charged and discharge are connected in parallel.

Japanese Patent Laying-Open No. 2013-13234 (PTD 2) describes a configuration of a power converter capable of switching between an operation mode in which DC/DC conversion is carried out while two DC power supplies are connected in series (a series connection mode) and an operation mode in which DC/DC conversion is carried out while two DC power supplies are used in parallel (a parallel connection mode) by switching a switching pattern of a plurality of power semiconductor switching elements (which are hereinafter also simply referred to as "switching elements").

CITATION LIST

Patent Document

PTD 1: Japanese Patent Laying-Open No. 2013-46446
PTD 2: Japanese Patent Laying-Open No. 2013-13234

SUMMARY OF INVENTION

Technical Problem

In the power converter described in PTD 2, by suppressing a boost ratio by selecting the series connection mode, a power loss during output of a high voltage can be suppressed as compared with the configuration in PTD 1. In the circuit configuration in PTD 2, such a phenomenon further occurs that a current for electric power conversion for a first DC power supply and a current for electric power conversion for a second DC power supply flow through a common switching element as being superimposed on each other.

Therefore, PTD 2 describes control of relation of a phase (specifically, relation between timing of rise and timing of fall) between a current which flows through the first DC power supply and a first reactor and a current which flows through the second DC power supply and a second reactor so as to reduce a power loss in a specific switching element. Since a total value for power losses in switching elements as a whole can thus be reduced, efficiency of the power converter can be improved.

In consideration of manufacturing cost for the power converter, however, preferably, not only the total value for power losses in switching elements is suppressed but also unevenness in such power losses among the switching elements is lessened. In general, the switching element is modularized by connecting transistor chips in parallel, and thermal rating is designed based on the number of transistor chips connected in parallel. Therefore, when an amount of heat generation in at least one of the switching elements relatively increases, a greater number of chips connected in parallel are required in that switching element than in other switching elements and an effect of reduction in manufacturing cost in mass production is less.

This invention was made to solve such problems, and an object thereof is to provide such switching control as suppressing unevenness in power loss among switching elements in electric power conversion in a power supply system including two DC power supplies.

Solution to Problem

In one aspect of the present disclosure, a power supply system which controls a DC voltage between a first power line on a high voltage side and a second power line on a low voltage side includes a first DC power supply, a second DC power supply, a power converter which carries out DC voltage conversion between the first and second DC power supplies and the first and second power lines, and a control device which controls an operation of the power converter. The power converter includes first to fifth semiconductor elements and first and second reactors. The first semiconductor element is electrically connected between the first power line and a first node. The first reactor is electrically connected in series with the first DC power supply, between the first node and the second power line. The second semiconductor element is electrically connected between the second power line and the first node. The second reactor is electrically connected in series with the second DC power supply, between a second node and the first power line. The third semiconductor element is electrically connected between the second node and the second power line. The fourth semiconductor element is electrically connected between the first power line and the second node. The fifth semiconductor element is electrically connected between the first node and the second node. At least some of the first to fifth semiconductor elements each include a switching element configured to control formation and cut-off of a current path in response to a signal from the control device. Each of a first reactor current which flows through the first reactor and a second reactor current which flows through the second reactor is controlled to have a plurality of inflection points in each control cycle as a result of control of on and off of the switching element in response to a control signal from the control device. The control device includes a first switching control mode. In the first switching control mode, the control signal for the switching element is generated to turn on or off a plurality of switching elements to simultaneously be turned on or off in a prescribed order with a time lag being set at at least one of the plurality of inflection points produced in the first and second reactor currents. In the first switching control mode, at the inflection point with the time lag being set, a switching loss is produced in a switching element turned off later or a switching element turned on earlier in accordance with the prescribed order.

According to the power supply system, such switching control as suppressing unevenness in power loss among switching elements in electric power conversion in a power supply system including two DC power supplies can be achieved.

Consequently, an amount of heat generation can be equal among the switching elements and reduction in cost can be achieved.

BRIEF DESCRIPTION OF DRAWINGS

FIG. 9 is a circuit diagram showing a current path when the lower arm of each DC power supply is turned on in the equivalent circuit diagram shown in FIG. 8.

FIG. 10 is a circuit diagram showing a current path when the upper arm of each DC power supply is turned on in the equivalent circuit diagram shown in FIG. 8.

FIG. 11 shows correspondence between on and off of each arm of the boost chopper circuit including a first arm and a second arm and on and off of a switching element.

FIG. 12 is a chart showing a list of gate Boolean expressions for controlling on and off of each switching element in the parallel boost mode of the power converter according to the first embodiment.

FIG. 17 is a circuit diagram illustrating a behavior of a current in formation of the second arm.

FIG. 20 is a circuit diagram illustrating a behavior of a current when the second arm is formed in a power converter 10 in a regeneration operation.

FIG. 22 is a conceptual diagram for comparing a switching loss between application (FIG. 21) and non-application (FIG. 19) of switching control according to the first embodiment.

FIG. 25 is a conceptual diagram in which a switching loss is compared between FIGS. 23 and 24.

FIG. 28 is a conceptual diagram in which a switching loss is compared between FIGS. 26 and 27.

FIG. 31 is a conceptual diagram in which a switching loss is compared between FIGS. 29 and 30.

FIG. 32 is a chart for comparing a switching loss in each combination of a power running operation and a regeneration operation and relation in magnitude between IL1 and IL2.

FIG. 33 is a waveform diagram for illustrating PWM control while switching control (in the regeneration operation) according to the first embodiment is applied.

FIG. 34 is a waveform diagram for illustrating PWM control while switching control (in the power running operation) according to a modification of the first embodiment is applied.

FIG. 53 is a chart for showing a list of a plurality of operation modes which can selectively be applied to the power converter according to the first and third embodiments.

DESCRIPTION OF EMBODIMENTS

Figure 1:
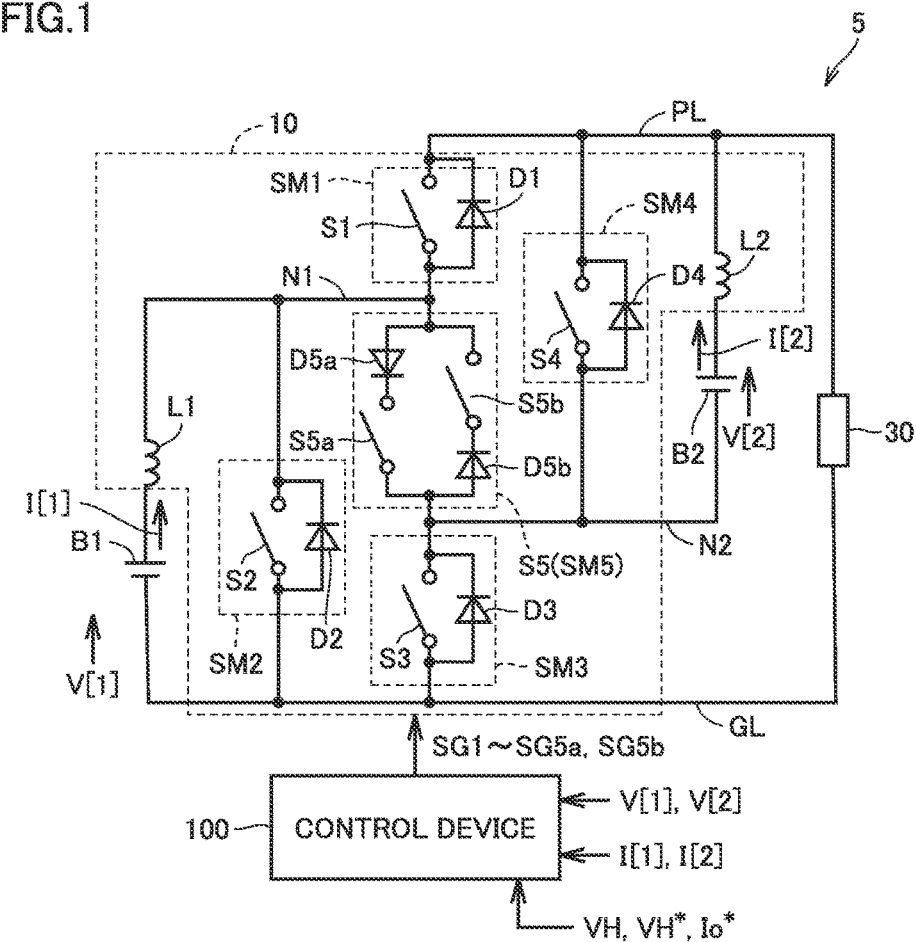
FIG. 1 is a circuit diagram showing a configuration of a power supply system according to a first embodiment of the present invention.

Embodiments of the present invention will be described below in detail with reference to the drawings. The same or corresponding elements in the drawings have the same reference characters allotted and description thereof will not be repeated in principle.

[First Embodiment]
(Circuit Configuration)

FIG. 1 is a circuit diagram showing a configuration of a power supply system according to an embodiment of the present invention.

Referring to FIG. 1, a power supply system 5 includes a DC power supply B1, a DC power supply B2, a power converter 10, and a control device 100.

In the present embodiment, DC power supplies B1 and B2 are implemented by such a power storage device as a secondary battery or an electric double layer capacitor.

For example, DC power supply B1 is implemented by such a secondary battery as a lithium ion secondary battery or a nickel metal hydride battery. DC power supply B2 is implemented by a DC voltage source element excellent in output characteristics, such as an electric double layer capacitor or a lithium ion capacitor. DC power supply B1 and DC power supply B2 correspond to the "first DC power supply" and the "second DC power supply," respectively.

DC power supplies B1 and B2 may also be implemented by power storage devices of the same type. A capacity of DC power supplies B1 and B2 is not particularly limited either. DC power supplies B1 and B2 may be implemented to be equal in capacity to each other, or one DC power supply may be higher in capacity than the other DC power supply.

Power converter 10 is configured to control a DC voltage VH (hereinafter also referred to as an output voltage VH) between a power line PL on a high voltage side and a power line GL on a low voltage side. Power line GL is representatively implemented by a ground line.

A load 30 operates as it receives output voltage VH from power converter 10. A voltage command value VH* of output voltage VH is set to a voltage suitable for an operation of load 30. Voltage command value VH* may variably be set depending on a state of load 30. Alternatively, load 30 may be configured to be able to generate charging power for DC power supply (power supplies) B1 and/or B2 through regenerative power generation.

Power converter 10 includes switching elements (power semiconductor switching elements) S1 to S5 and reactors L1 and L2. In the present embodiment, an insulated gate bipolar transistor (IGBT), a power metal oxide semiconductor (MOS) transistor, or a power bipolar transistor can be employed as the power semiconductor switching element (hereinafter simply also referred to as a "switching element").

Switching element S1 is electrically connected between power line PL and a node N1. Reactor L1 and DC power supply B1 are electrically connected in series between node N1 and power line GL. For example, reactor L1 is electrically connected between a positive electrode terminal of DC power supply B1 and node N1, and a negative electrode terminal of DC power supply B1 is electrically connected to power line GL. Switching element S2 is electrically connected between node N1 and power line GL. Even when an order of connection of reactor L1 and DC power supply B1 is interchanged, an electrically equivalent circuit configuration is maintained.

Switching element S3 is electrically connected between a node N2 and power line GL. Switching element S4 is electrically connected between power line PL and node N2. Switching element S5 is electrically connected between nodes N1 and N2. Reactor L2 and DC power supply B2 are electrically connected in series between power line PL and node N2. For example, reactor L2 is electrically connected between a positive electrode terminal of DC power supply B2 and power line PL and a negative electrode terminal of DC power supply B2 is electrically connected to node N2. Even when an order of connection of reactor L2 and DC power supply B2 is interchanged, an electrically equivalent circuit configuration is maintained.

Anti-parallel diodes D1 to D4 are arranged for switching elements S1 to S4, respectively. Diodes D1 to D4 are arranged to each form a current path in a direction from power line GL toward power line PL (in the drawings, a direction upward from below) during forward biasing. On the other hand, diodes D1 to D4 form no current path during reverse biasing. Specifically, diode D1 is connected to have a direction from node N1 toward power line PL as a forward direction, and diode D2 is connected to have a direction from power line GL toward node N1 as the forward direction. Similarly, diode D3 is connected to have a direction from power line GL toward node N2 as the forward direction, and diode D4 is connected to have a direction from node N2 toward power line PL as the forward direction.

In the configuration example in FIG. 1, switching element S5 is provided as a bidirectional switch which can separately control formation and cut-off of each of a current path from node N1 toward node N2 and a current path from node N2 toward node N1. The bidirectional switch (S5) has a diode D5$a$ and a switching element S5$a$ electrically connected in series between nodes N1 and N2. Diode D5$a$ is electrically connected between nodes N1 and N2 with a direction from node N1 toward node N2 being defined as a forward direction.

The bidirectional switch (S5) further has a diode D5$b$ and a switching element S5$b$ electrically connected in series between nodes N1 and N2. Diode D5$b$ and switching element S5$b$ are connected between nodes N1 and N2 in parallel to diode D5$a$ and switching element S5$a$. Diode D5$b$ is electrically connected between nodes N1 and N2 with a direction from node N2 toward node N1 being defined as the forward direction.

In the bidirectional switch, when switching element S5$a$ is turned on, a current path is formed in a direction from node N1 toward node N2 through diode D5$a$. When switching element S5$a$ is turned off, the current path is cut off. Switching element S5$a$ is arranged to control formation and cut-off of the current path from node N1 to node N2.

When switching element S5$b$ is turned on, a current path is formed in a direction from node N2 toward node N1 through diode D5$b$. When switching element S5$b$ is turned off, the current path is cut off. Switching element S5$b$ is arranged to control formation and cut-off of the current path from node N2 to node N1.

On and off of switching elements S1 to S5$a$ and S5$b$ can be controlled in response to control signals SG1 to SG4, SG5$a$, and SG5$b$ from control device 100, respectively. Specifically, switching elements S1 to S5 can form current paths as they are turned on when control signals SG1 to SG5 are at the logic high level (hereinafter also denoted as the "H level"). On the other hand, switching elements S1 to S5$a$ and S5$b$ cut off the current paths as they are turned off when control signals SG1 to SG4, SG5$a$, and SG5$b$ are at the logic low level (hereinafter also denoted as the "L level").

In the configuration example in FIG. 1, switching element S1 and diode D1 correspond to a "first semiconductor element SM1," switching element S2 and diode D2 correspond to a "second semiconductor element SM2," and switching element S3 and diode D3 correspond to a "third semiconductor element SM3." Switching element S4 and diode D4 correspond to a "fourth semiconductor element SM4" and switching elements S5$a$ and S5$b$ and diodes D5$a$ and D5$b$ correspond to a "fifth semiconductor element SM5." Reactors L1 and L2 correspond to the "first reactor" and the "second reactor", respectively. In the example in FIG. 1, by controlling on and off of switching elements S1 to S5$a$ and S5$b$, formation and cut-off of a current path can be controlled in each of first semiconductor element SM1 to fifth semiconductor element SM5.

Control device 100 is implemented, for example, by an electronic control unit (ECU) having a central processing unit (CPU) and a memory which are not shown. Control device 100 is configured to perform operation processing using a detection value from each sensor, based on a map and a program stored in the memory. Alternatively, at least a part of control device 100 may be configured to perform prescribed numeric and logical operation processing with such hardware as an electronic circuit.

Control device 100 generates control signals SG1 to SG5$a$ and SG5$b$ controlling on and off of switching elements S1 to S5 for controlling output voltage VH. Though illustration is not provided in FIG. 1, detectors (voltage sensors) for a voltage (denoted as V[1]) and a current (denoted as I[1]) of DC power supply B1, a voltage (denoted as V[2]) and a current (denoted as I[2]) of DC power supply B2, and output voltage VH are provided. Outputs from these detectors are provided to control device 100.

Figure 2:
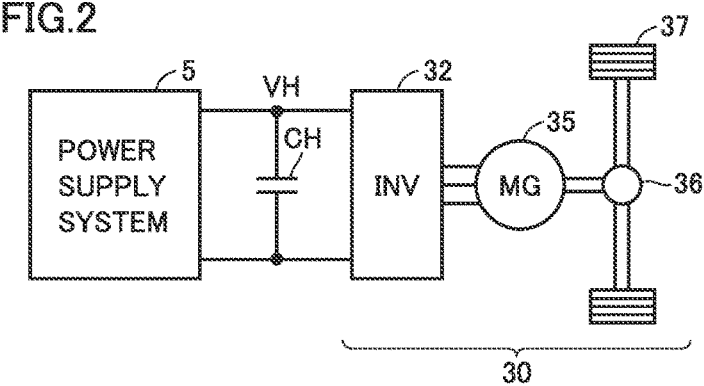
FIG. 2 is a schematic diagram showing a configuration example of a load shown in FIG. 1.

FIG. 2 is a schematic diagram showing a configuration example of load 30.

Referring to FIG. 2, load 30 is configured to include, for example, a traction motor of an electrically powered vehicle. Load 30 includes a smoothing capacitor CH, an inverter 32, a motor generator 35, a power train 36, and a drive wheel 37. Motor generator 35 is a traction motor, for generating vehicle driving force, and it is implemented, for example, by a multiple-phase permanent magnet type synchronous motor. Output torque from motor generator 35 is transmitted to drive wheel 37 through power train 36 constituted of a reduction gear and a power split device. The electrically powered vehicle runs with torque transmitted to drive wheel 37. Motor generator 35 generates power with rotational force from drive wheel 37 during regenerative braking of the electrically powered vehicle. This generated electric power is subjected to AC/DC conversion by inverter 32. This DC power can be used as charging power for DC power supplies B1 and B2 included in power supply system 5.

In a hybrid car on which an engine (not shown) is mounted in addition to the motor generator, this engine and motor generator 35 are operated in coordination so as to generate vehicle driving force necessary for the electrically powered vehicle. Here, DC power supplies B1 and B2 can also be charged with power generated through rotation of the engine.

Thus, the electrically powered vehicle comprehensively represents a vehicle on which a traction motor is mounted, and includes both of the hybrid car on which an engine and a motor are mounted and an electric car and a fuel cell car on which no engine is mounted.

(Operation of Power Converter)

Similarly to the power converter described in PTD 2, power converter 10 has a plurality of operation modes different in manner of DC power conversion (DC/DC conversion) between DC power supplies B1 and B2 and power lines PL and GL. These operation modes are selectively applied by switching a manner of on/off control of the switching elements.

The plurality of operation modes of power converter 10 include a "parallel boost mode" for DC/DC conversion in parallel between DC power supplies B1 and B2 and power lines PL and GL and a "series boost mode" for DC/DC conversion between DC power supplies B1 and B2 connected in series and power lines PL and GL. The parallel boost mode corresponds to the "parallel connection mode" in PTD 2 and the series boost mode corresponds to the "series connection mode" in PTD 2.

As will be clarified in the description below, the power supply system according to the present embodiment is characterized in switching control for suppressing unevenness in power loss among switching elements in the parallel boost mode of power converter 10. Therefore, an operation and control in the parallel boost mode which define the basis will initially be described.

As is understood from FIG. 1, power converter 10 has a circuit configuration including a boost chopper circuit formed between DC power supply B1 and power lines PL and GL and a boost chopper circuit formed between DC power supply B2 and power lines PL and GL as being combined. Therefore, an operation of a basic boost chopper circuit will initially be described in detail.

Figure 3:
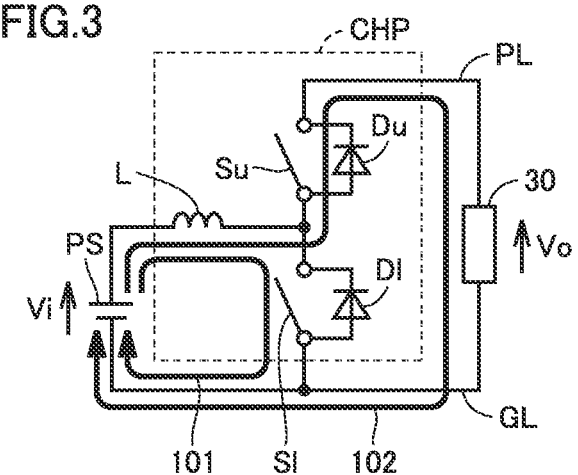
FIG. 3 is a circuit diagram showing a configuration of a basic boost chopper circuit.

FIG. 3 shows a circuit diagram showing a configuration of the basic boost chopper circuit.

Referring to FIG. 3, a boost chopper circuit CHP has a switching element Su implementing an upper arm, a switching element S1 implementing a lower arm, and a reactor L. Diodes Du and Dl are connected in anti-parallel to switching element Su in the upper arm and switching element S1 in the lower arm, respectively.

In boost chopper circuit CHP, an on period and an off period of the lower arm (switching element S1) are alternately provided. During the on period of the lower arm, a current path 101 through a DC power supply PS, a reactor L, and lower arm element S1 (*on*) is formed. Thus, energy is stored in reactor L.

During the off period of the lower arm, a current path 102 through DC power supply PS, reactor L, diode Du (or switching element Su), and load 30 is formed. Thus, energy stored in reactor L during the on period of lower arm element S1 and energy from DC power supply PS are supplied to load 30. Thus, an output voltage to load 30 is boosted as compared with an output voltage from DC power supply PS.

Switching element Su in the upper arm should be turned off during the on period of switching element S1 in the lower arm. During the off period of switching element S1 in the lower arm, switching element Su in the upper arm is turned on, so that power from load 30 can be regenerated to DC power supply PS. For example, by periodically and complementarily turning on and off switching element Su in the upper arm and switching element S1 in the lower arm, DC/DC conversion can be carried out for both of regeneration and power running while controlling output voltage VH, without switching a manner of switching control (on/off control) in accordance with a direction of a current.

When power regeneration to DC power supply PS is not carried out, a direction of a current is limited to one direction. Therefore, it is not necessary to arrange switching element Su in the upper arm, and the upper arm can be implemented only by diode Du. In addition, it is not necessary to arrange diode Dl in the lower arm.

Figure 4:
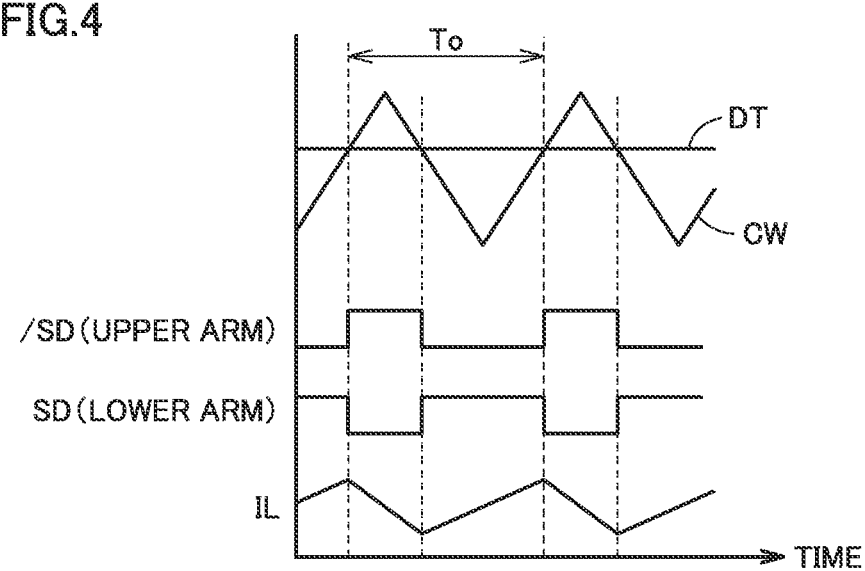
FIG. 4 is an operation waveform diagram of the boost chopper circuit shown in FIG. 3.

FIG. 4 shows an operation waveform example of the boost chopper circuit shown in FIG. 3.

Referring to FIG. 4, during the on period of the lower arm, a current which flows through reactor L and DC power supply PS (hereinafter referred to as a "reactor current") IL becomes higher and during the off period of the lower arm, reactor current IL is lowered. Therefore, by controlling a ratio between the on period and the off period of switching element S1 in the lower arm, output voltage VH can be controlled. Specifically, by raising a ratio of the on period, output voltage VH becomes higher. A voltage conversion ratio (a boost ratio) in boost chopper circuit CHP has been known to be expressed by an expression (1) below, by using a voltage Vi from DC power supply PS, output voltage VH, and a duty ratio DT (hereinafter also simply referred to as a duty ratio DT). Duty ratio DT is a parameter which represents a ratio of the on period and is defined by a ratio of the on period of the lower arm (a time ratio) to a switching period To (the on period+the off period).

$$VH=1/(1-DT) \cdot Vi \quad (1)$$

In boost chopper circuit CHP, on and off of the switching element (hereinafter switching control) can be controlled based on pulse width modulation (PWM) control. For example, a control pulse signal SD for turning on and off the lower arm is generated in accordance with voltage comparison between a carrier wave CW and duty ratio DT.

Carrier wave CW is equal in period to switching period To. For example, a triangular wave is employed for carrier wave CW. A frequency of carrier wave CW corresponds to a switching frequency of switching element S1 (Su). A voltage width (peak to peak) of carrier wave CW is set to a voltage corresponding to DT=1.0.

Control pulse signal SD is set to the H level when a voltage exhibiting duty ratio DT is higher than a voltage of carrier wave CW, and set to the L level when it is lower than a voltage of carrier wave CW. A control pulse signal /SD is an inverted signal of control pulse signal SD.

On and off of switching element S1 in the lower arm is controlled in response to control pulse signal SD. Namely, switching element S1 in the lower arm is controlled to on during the H level period of control pulse signal SD, while it is controlled to off during the L level period of control pulse signal SD. On and off of switching element Su in the upper arm can be controlled periodically and complementarily to switching element S1 in the lower arm, in response to control pulse signal /SD.

Reactor current IL increases during a period in which the lower arm is on and lowers during a period in which the upper arm is on under the switching control. At timing of transition from on of the upper arm to on of the lower arm, reactor current IL attains to a relative minimum point. In contrast, reactor current IL attains to a relative maximum point at timing of transition from on of the lower arm to on of the upper arm.

As duty ratio DT is higher, the on period of the lower arm is longer and hence the average value of current IL increases. Thus, with increase in output from DC power supply PS, output voltage VH increases.

In contrast, as duty ratio DT is lower, the on period of the upper arm is longer and hence the average value of current IL lowers. Thus, with lowering in output from DC power supply PS, output voltage VH lowers. Thus, in a chopper circuit, an output is controlled by providing a relative maximum point and a relative minimum point, that is, a plurality of inflection points, in reactor current IL under the switching control.

(Circuit Operation in Parallel Boost Mode)

An operation and control in the parallel boost mode of power converter 10 will now be described in detail. Power converter 10 operates in the parallel boost mode in such a manner that two boost chopper circuits are operated in parallel with respect to each of DC power supplies B1 and B2. Namely, power converter 10 controls output voltage VH in accordance with voltage command value VH* by carrying out DC/DC conversion in parallel between DC power supplies B1 and B2 and power lines PL and GL (load 30), as in the parallel connection mode in PTD 2.

Referring again to FIG. 1, power converter 10 is characterized by difference in boost chopper circuit formed for DC power supplies B1 and B2 between an example in which switching element S5 (S5a, S5b) is turned off and no current flows between nodes N1 and N2 and an example where it is not the case.

Figure 5:
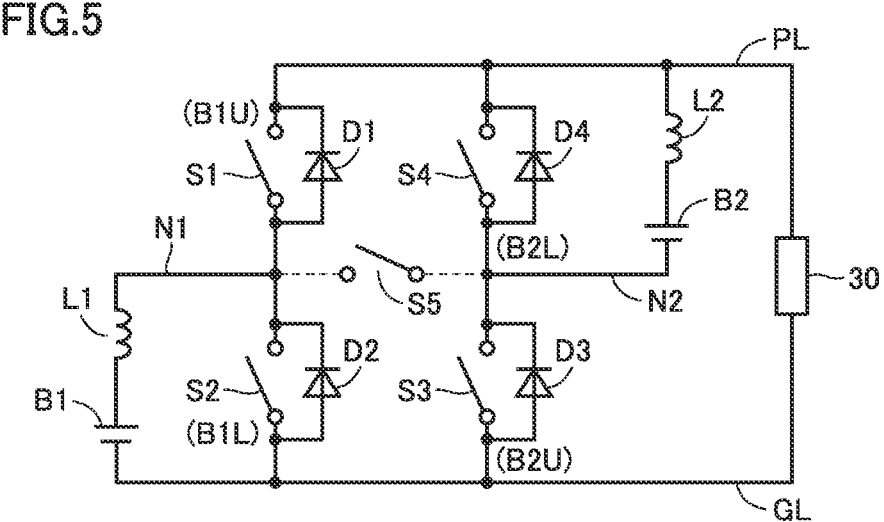
FIG. 5 is a first equivalent circuit diagram in a parallel boost mode of a power converter shown in FIG. 1.

FIG. 5 shows an equivalent circuit of power converter 10 when no current flows between nodes N1 and N2. A state that no current flows between nodes N1 and N2 as a result of turn-off of at least one of switching elements S5a and S5b is also referred to as off of switching element S5 below.

Referring to FIG. 5, while switching element S5 is off, for DC power supply B1, such a boost chopper circuit that switching element S2 and diode D2 implement the lower arm and switching element S1 and diode D1 implement the upper arm is formed. On the other hand, for DC power supply B2, such a boost chopper circuit that switching element S4 and diode D4 implement the lower arm and switching element S3 and diode D3 implement the upper arm is formed.

Therefore, power converter 10 has a circuit configuration in which boost chopper circuits are provided in parallel to DC power supplies B1 and B2 while switching element S5 is off as in PTD 1.

Figure 6:
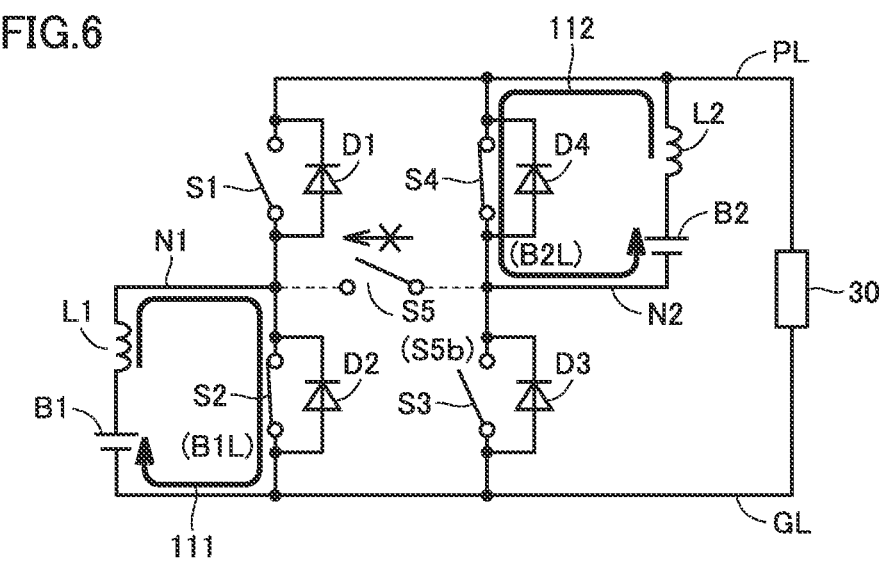
FIG. 6 is a circuit diagram showing a current path when a lower arm of each DC power supply is turned on in the equivalent circuit diagram shown in FIG. 5.

FIG. 6 shows a current path when the lower arms of DC power supplies B1 and B2 are turned on in the equivalent circuit diagram shown in FIG. 5.

Referring to FIG. 6, by turning on switching element S2, similarly to current path 101 in FIG. 3, a current path 111 for storing energy in reactor L1 with output from DC power supply B1 is formed. Namely, switching element S2 corresponds to the lower arm of the boost chopper circuit formed in correspondence with DC power supply B1.

Similarly, by turning on switching element S4, similarly to current path 101 in FIG. 3, a current path 112 for storing energy in reactor L2 with output from DC power supply B2 is formed. Namely, switching element S4 corresponds to the lower arm of the boost chopper circuit formed in correspondence with DC power supply B2.

Figure 7:
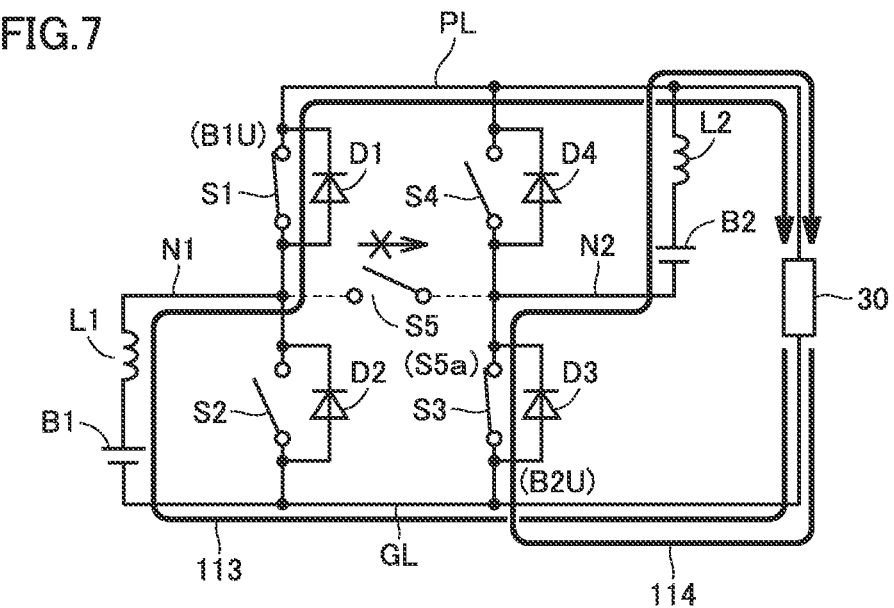
FIG. 7 is a circuit diagram showing a current path when an upper arm of each DC power supply is turned on in the equivalent circuit diagram shown in FIG. 5.

FIG. 7 shows a current path when upper arms of DC power supplies B1 and B2 are turned on in the equivalent circuit diagram shown in FIG. 5.

Referring to FIG. 7, by turning off switching element S2, a current path 113 for outputting energy stored in reactor L1 to power line PL together with energy from DC power supply B1 through switching element S1 or diode D1 is formed. In the present embodiment, by complementarily turning on and off switching elements S1 and S2, switching element S1 is turned on during the off period of switching element S2. Switching element S1 corresponds to the upper arm of the boost chopper circuit formed in correspondence with DC power supply B1.

Similarly, by turning off switching element S4, a current path 114 for outputting energy stored in reactor L2 to power line PL together with energy from DC power supply B2 through switching element S3 or diode D3 is formed. In the present embodiment, since switching elements S3 and S4 are complementarily turned on and off, switching element S3 is turned on during the off period of switching element S4. Switching element S3 corresponds to the upper arm of the boost chopper circuit formed in correspondence with DC power supply B2.

As is understood from FIGS. 6 and 7, by alternately forming current paths 111 and 113, DC/DC conversion between DC power supply B1 and power lines PL and GL is carried out. Similarly, by alternately forming current paths 112 and 114, DC/DC conversion between DC power supply B2 and power lines PL and GL is carried out.

In the following, the upper arm of the boost chopper circuit formed in correspondence with DC power supply B1 is also referred to as a "B1U arm" and the lower arm is referred to as a "B1L arm". Similarly, the upper arm of the boost chopper circuit formed in correspondence with DC power supply B2 is also referred to as a "B2U arm" and the lower arm is also referred to as a "B2L arm".

As is understood from FIG. 6, if a current path from node N2 toward node N1 is formed while the B1L arm and the B2L arm are formed, a short-circuiting path from power line PL to power line GL is formed and hence the current path should be cut off. Therefore, in this case, switching element S5b should be turned off. On the other hand, even though switching element S5a is turned on, the current path from node N2 toward node N1 can be cut off by using diode D5a.

Similarly, as is understood from FIG. 7, if a current path from node N1 toward node N2 is formed while the B1U arm and the B2U arm are formed, a short-circuiting path from power line PL to power line GL is formed and hence the current path should be cut off. Therefore, in this case, switching element S5a should be turned off. On the other hand, even though switching element S5b is turned on, the current path from node N1 toward node N2 can be cut off by using diode D5b.

When switching element S5 is thus configured as a bidirectional switch, switching elements S5a and S5b can separately be turned on and off.

Figure 8:
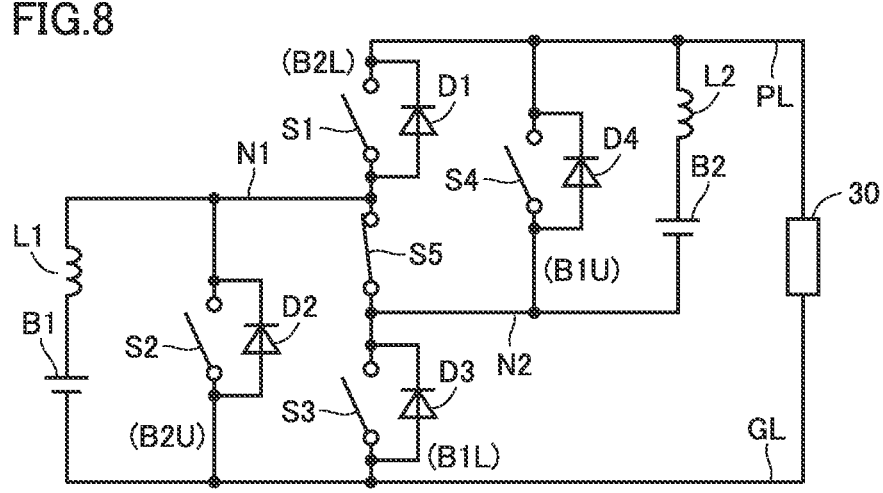
FIG. 8 is a second equivalent circuit diagram in the parallel boost mode of the power converter shown in FIG. 1.

FIG. 8 shows an equivalent circuit of power converter 10 when a current flows between nodes N1 and N2. A state that a current flows between nodes N1 and N2 as a result of turn-on of switching elements S5a and S5b is also referred to as on of switching element S5 below.

Referring to FIG. 8, in connection with DC power supply B1, while switching element S5 is turned on, switching element S3 connected between node N2 and power line GL can serve as the lower arm (the B1L arm) of DC power supply B1 and the boost chopper circuit can thus be formed. Similarly, switching element S4 electrically connected between node N2 and power line PL serves as the upper arm (the B1U arm) of DC power supply B1 and the boost chopper circuit can thus be formed.

For DC power supply B2, the boost chopper circuit can be formed, with switching element S1 connected between node N1 and power line PL serving as the lower arm (the B2L arm) and switching element S2 serving as the upper arm (the B2U arm).

FIG. 9 shows current paths when the lower arms of DC power supplies B1 and B2 are turned on in the equivalent circuit diagram shown in FIG. 8.

Referring to FIG. 9 (a), by turning on switching elements S3 and S5a, a current path 115 for storing energy in reactor L1 with output from DC power supply B1 is formed. As shown in FIG. 9 (b), by turning on switching elements S1 and S5a, a current path 116 for storing energy in reactor L2 with output from DC power supply B2 is formed.

FIG. 10 shows current paths when the upper arms of DC power supplies B1 and B2 are turned on in the equivalent circuit diagram shown in FIG. 8.

Referring to FIG. 10 (a), in connection with DC power supply B1, by turning off switching element S3 while switching element S5 (S5a) is on, a current path 117 for outputting energy stored in reactor L1 to power line PL together with energy from DC power supply B1 through switching element S4 or diode D4 is formed. As described above, since switching elements S3 and S4 are complementarily turned on and off, switching element S3 can form the B1L arm and switching element S4 can form the B1U arm.

Referring to FIG. 10 (b), in connection with DC power supply B2, by turning off switching element S1 while switching element S5 (S5a) is on, a current path 118 for outputting energy stored in reactor L2 to power line PL together with energy from DC power supply B2 through switching element S2 or diode D2 is formed. As described above, since switching elements S1 and S2 are complementarily turned on and off, switching element S1 can form the B2L arm and switching element S2 can form the B2U arm. In FIGS. 10 (a) and (b), as switching element S5b is turned on, a regenerative current from load 30 which flows in a direction reverse to current paths 117 and 118 can be accepted to charge DC power supplies B1 and B2.

FIG. 11 shows correspondence between each arm of the boost chopper circuit formed in each case of off and on of switching element S5 and on and off of the switching elements.

Referring to FIG. 11, each arm in the boost chopper circuit formed while switching element S5 is off (FIGS. 5 to 7) is referred to as a "first arm" and each arm of the boost chopper circuit formed while switching element S5 is on (FIGS. 8 to 10) is referred to as a "second arm".

While switching element S5 is off, that is, while the first arm is formed, for DC power supply B1, as described above, the B1L arm is turned on by turning on switching element S2 and the B1U arm is turned on by turning on switching element S1 (turning off of switching element S2). For DC power supply B2, the B2L arm is turned on by turning on switching element S4, and the B2U arm is turned on by turning on switching element S3 (turning off of switching element S4).

While switching element S5 is on, that is, while the second arm is formed, for DC power supply B1, as described above, the B1L arm is turned on by turning on switching element S3, and the B1U arm is turned on by turning on switching element S4 (turning off of switching element S3). For DC power supply B2, the B2L arm is turned on by turning on switching element S1, and the B2U arm is turned on by turning on switching element S2 (turning off of switching element S1).

Thus, in any of the first arm and the second arm, switching elements S1 and S2 are complementarily turned on and off and switching elements S3 and S4 are complementarily turned on and off, so that each of DC power supplies B1 and B2 can be controlled such that the upper arm and the lower arm are alternately turned on and off.

In the parallel boost mode of power converter 10 according to the first embodiment, DC/DC conversion is carried out by selectively using the first arm and the second arm shown in FIG. 11. As shown in FIG. 11, however, switching elements S1 to S4 operate as the first arm for one of DC power supplies B1 and B2, while they operate as the second arm for the other of DC power supplies B1 and B2. Attention should be paid to such a fact that interference between the first arm and the second arm will limit a period during which the second arm can be applied.

Specifically, when the second arm is turned on for one of DC power supplies B1 and B2, the first arm on a side opposite in terms of upper and lower is turned on for the other of DC power supplies B1 and B2. For example, when switching elements S3 and S5 are turned on to thereby turn on the B1L arm of the second arm (FIG. 9 (a)), in response to on of switching element S3, as in FIG. 7, the B2U arm of the first arm is turned on for DC power supply B2. In contrast, when switching elements S4 and S5 are turned on to thereby turn on the B1U arm of the second arm (FIG. 10 (a)), as in FIG. 6, the B2L arm of the first arm is turned on for DC power supply B2.

As is understood also from FIGS. 9 (a) and (b), when both of the B1L arm and the B2L arm are turned on while the second arm is formed, a short-circuiting path is formed between power lines PL and GL through switching elements S1, S3, and S5a in the on state. Therefore, when both of the B1L arm and the B2L arm are turned on as described above, the first arm (FIG. 6) should be applied by turning off switching element S5 (at least S5a).

Similarly, as is understood also from FIGS. 10 (a) and (b), when both of the B1U arm and the B2U arm are turned on while the second arm is formed, a short-circuiting path is formed between power lines PL and GL through switching elements S4, S5b, and S2 in the on state. Therefore, when both of the B1L arm and the B2L arm are turned on as described above, the first arm (FIG. 6) should be applied by turning off switching element S5 (at least S5b).

Therefore, a period during which the second arm can be used is limited to a period during which a command (on/off) to the upper arm and a command (on/off) to the lower arm are different between DC power supplies B1 and B2. Namely, the second arm can be used only during a period in which on of the upper arm is indicated to DC power supply B1 and on of the lower arm is indicated to DC power supply B2 or during a period in which on of the lower arm is indicated to DC power supply B1 and on of the upper arm is indicated to DC power supply B2.

FIG. 12 shows gate Boolean expressions for controlling on and off of each of switching elements S1 to S5 in the parallel boost mode.

Referring to FIG. 12, a control pulse signal SD1 corresponds to control pulse signal SD (FIG. 4) in the boost chopper circuit corresponding to DC power supply B1. Namely, while control pulse signal SD1 is at the H level, on of the lower arm is instructed to DC power supply B1. As the H level period of control pulse signal SD1 is longer, output from DC power supply B1 increases.

A control pulse signal /SD1 is an inverted signal of control pulse signal SD1. Namely, while control pulse signal /SD1 is at the H level, on of the upper arm is instructed to DC power supply B1. As the H level period of control pulse signal /SD1 (that is, the L level period of control pulse signal SD1) is longer, output from DC power supply B1 decreases.

Similarly, a control pulse signal SD2 corresponds to control pulse signal SD (FIG. 4) in the boost chopper circuit corresponding to DC power supply B2, and a control pulse signal /SD2 is an inverted signal of control pulse signal SD2. As the H level period of control pulse signal SD2 is longer, output from DC power supply B2 increases, and as the H level period of control pulse signal /SD1 (that is, the L level period of control pulse signal SD1) is longer, output from DC power supply B1 decreases.

In the parallel boost mode of power converter 10, on and off of switching element S2 is controlled in correspondence with control pulse signal SD1, and switching element S1 is turned on and off in response to control pulse signal /SD1. On and off of switching element S4 is controlled in response to control pulse signal SD2, and switching element S3 is turned on and off in response to control pulse signal /SD2.

On and off of switching element S5 can basically be controlled in accordance with an exclusive OR (XOR) of control pulse signals SD1 and SD2. Thus, when control pulse signals SD1 and SD2 are identical to each other in logic level (that is, SD1=SD2=H or SD1=SD2=L), switching element S5 is turned off. Consequently, formation of a short-circuiting path between power lines PL and GL can be avoided by electrically disconnecting nodes N1 and N2 from each other in the circuit state shown in FIG. 6 or 7.

In order to avoid formation of a short-circuiting path in each of the circuit states in FIGS. 6 and 7 as described above, cut-off of a current path in one direction suffices. Specifically, in the circuit state in FIG. 6, formation of the short-circuiting path can be avoided simply by cutting off only the current path in the direction from node N2 toward node N1. Similarly, in the circuit state in FIG. 7, the current path in the direction from node N1 toward node N2 should only be cut off.

Therefore, during a period in which both of the B1L arm (switching element S2) and the B2L arm (switching element S4) are turned on, that is, during a period in which a condition of SD1=SD2=the H level is satisfied, switching element S5$b$ should be turned off whereas switching element S5$a$ can be turned on. During a period in which both of the B1U arm (switching element S1) and the B2U arm (switching element S3) are turned on, that is, during a period in which a condition of SD1=SD2=the H level is satisfied, switching element S5$a$ should be turned off whereas switching element S5$b$ can be turned on.

Therefore, switching element S5$a$ can also be turned on and off in accordance with a logical sum (OR) of control pulse signals SD1 and SD2. Similarly, switching element S5$b$ can also be turned on and off in accordance with a logical sum (OR) of control pulse signals /SD1 and /SD2.

Since the number of times of turn-on and -off of each of switching elements S5$a$ and S5$b$ can be reduced as compared with an example in which switching elements S5$a$ and S5$b$ are turned on and off in common in accordance with an exclusive logical sum (XOR) of control pulse signals SD1 and SD2, a switching loss can be suppressed.

Thus, by controlling on and off of switching elements S1 to S5$a$ and S5$b$ in response to control pulse signals SD1 and SD2 in accordance with the Boolean expressions shown in FIG. 12, DC/DC conversion in the parallel boost mode can be carried out while automatic selection between the boost chopper circuit where the first arm is used and the boost chopper circuit using formation of the second arm is made. In particular, by controlling formation/cut-off of a current path between nodes N1 and N2 through switching element S5 (S5$a$, S5$b$), switching between the first arm and the second arm can be made while formation of a short-circuiting path between power lines PL and GL is avoided.

Figure 13:
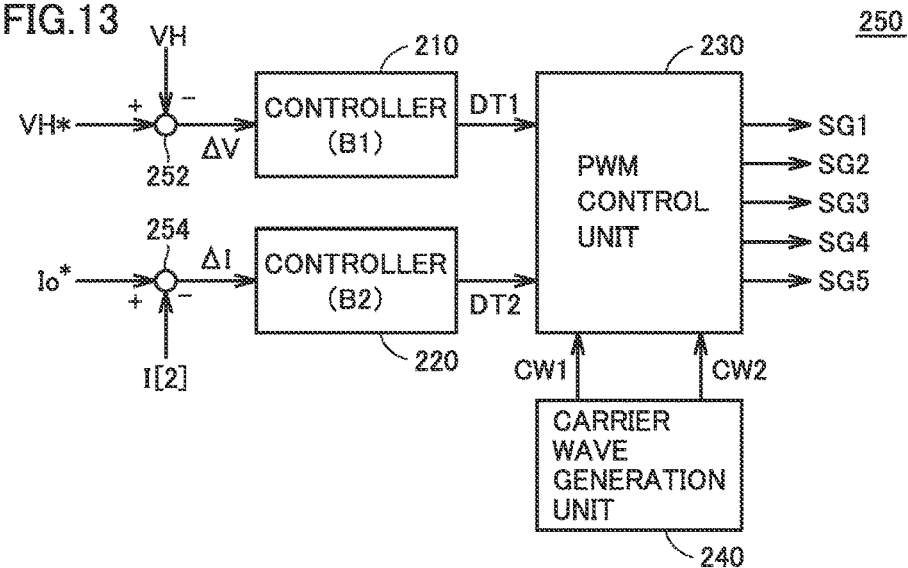
FIG. 13 is a functional block diagram for illustrating an example of control of outputs from the DC power supplies in the parallel boost mode of the power converter shown in FIG. 1.

FIG. 13 is a functional block diagram for illustrating an example of control of outputs from DC power supplies B1 and B2 in the parallel boost mode of power converter 10. In the following, a function of the functional block in each functional block diagram represented by FIG. 13 is implemented by software processing and/or hardware processing by control device 100.

Referring to FIG. 13, in the parallel boost mode, as in the parallel connection mode in PTD 2, output from one of DC power supplies B1 and B2 can be controlled so as to compensate for a voltage difference $\Delta V$ ($\Delta V=VH^*-VH$) in output voltage VH (voltage control), and output from the other of DC power supplies B1 and B2 can be controlled so as to compensate for a current difference of current I[1] or I[2] (current control). For example, a command value (Io*) for current control can be set in order to control output power from the power supply.

By way of example, a converter control unit 250 in the parallel boost mode controls power converter 10 so as to subject output from DC power supply B1 to voltage control and subject output from DC power supply B2 to current control. In this case, by using a power command value P[2]* and voltage V[2] of DC power supply B2 so as to set Io*=P[2]*/V[2], an input/output voltage of DC power supply B2 can be controlled in accordance with power command value P[2]*.

Converter control unit 250 includes subtraction units 252 and 254, a controller 210 for controlling output from DC power supply B1, a controller 220 for controlling output from DC power supply B2, a PWM control unit 230, and a carrier wave generation unit 240.

Subtraction unit 252 calculates voltage difference $\Delta V$ ($\Delta V=VH^*-VH$) for voltage control. Controller 210 operates a duty ratio DT1 of DC power supply B1 (hereinafter simply referred to as duty ratio DT1) through feedback control for compensating for voltage difference $\Delta V$ (for example, PI control). Duty ratio DT1 can also be operated, with a theoretical boost ratio found from a voltage ratio between voltage V[1] from DC power supply B1 and voltage command value VH* based on the expression (1) being further reflected.

Subtraction unit 254 calculates a current difference $\Delta I$ ($\Delta I=Io^*-I[2]$) for current control. Controller 220 operates a duty ratio DT2 of DC power supply B2 (hereinafter simply referred to as duty ratio DT2) through feedback control for compensating for current difference $\Delta I$ (for example, PI control). Duty ratio DT2 can also be operated, with a theoretical boost ratio found from a voltage ratio between voltage V[2] from DC power supply B2 and voltage command value VH* based on the expression (1) being further reflected.

Carrier wave generation unit 240 generates a carrier wave CW1 used for control of DC power supply B1 and CW2 used for control of DC power supply B2. PWM control unit 230 generates control signals SG1 to SG5 based on combination between PWM control based on comparison between duty ratio DT1 and carrier wave CW1 and PWM control based on comparison between carrier wave CW2 and duty ratio DT2. Carrier waves CW1 and CW2 have the same frequency corresponding to a switching frequency.

In the parallel boost mode, power converter 10 can be controlled such that one of DC power supplies B1 and B2 is subjected to voltage control (VH→VH*) and the other of DC power supplies B1 and B2 is subjected to current control (I[1] or I[2]→Io*) through control of outputs from DC power supplies B1 and B2 based on duty ratios DT1 and DT2. Thus, in the parallel boost mode, input/output power of the DC power supply subjected to voltage control can also indirectly be controlled by controlling input/output power of the DC power supply subjected to current control relative to input/output power PL (load power PL) of power converter 10 as a whole for load 30.

Control of outputs from DC power supplies B1 and B2 is not limited as exemplified in FIG. 13, and duty ratios DT1 and DT2 can be calculated in any manner so long as a function to control output voltage VH to voltage command value VH* is achieved.

By way of example of a variation, outputs from DC power supplies B1 and B2 can also be subjected to power control (current control) based on calculation of necessary power Pr input to and output from power converter 10 for control of output voltage VH to voltage command value VH*. Specifically, power outputs from DC power supplies B1 and B2 can be controlled in accordance with power command values P1* and P2* which represent allocation of necessary power Pr to DC power supplies B1 and B2 (Pr=P1*+P2*). In the parallel boost mode, allocation of power command values P1* and P2* can freely be set. In this case, duty ratios DT1 and DT2 can be calculated through feedback control of currents I[1] and I[2] with current command values I1* (I1*=P1*/V[1]) and I2* (I2*=P2*/V[2]) calculated from power command values P1* and P2* being defined as the reference value.

Figure 14:
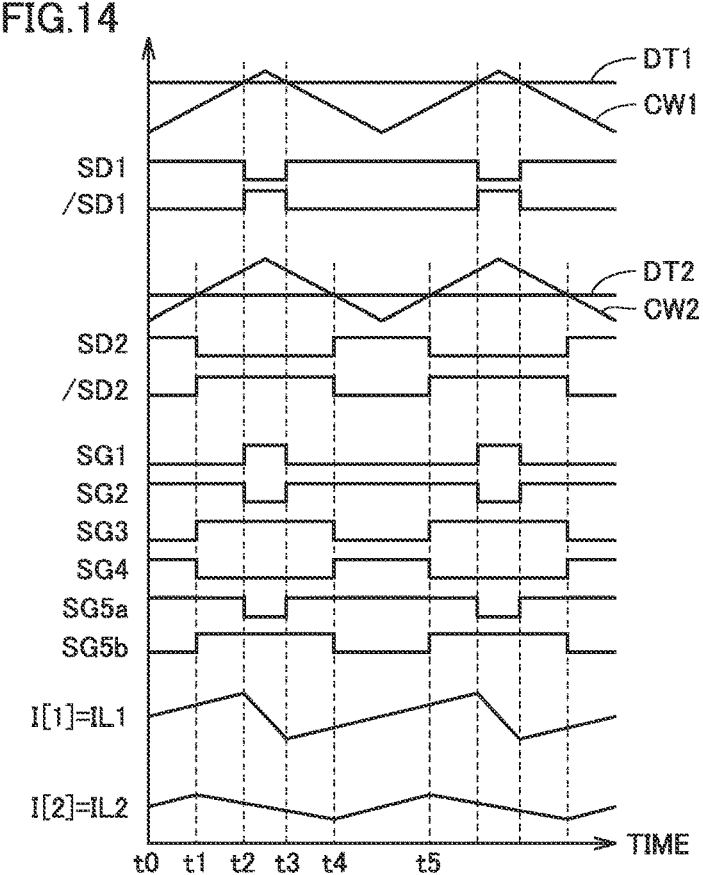
FIG. 14 is a waveform diagram for illustrating an operation in PWM control.

FIG. 14 shows a waveform diagram for illustrating an operation of PWM control unit 230 in the parallel connection mode.

Referring to FIG. 14, for DC power supply B1, control pulse signals SD1 and /SD1 are generated through PWM control based on voltage comparison between carrier wave CW1 and duty ratio DT1. During a period in which a condition of DT1>CW1 is satisfied, control pulse signal SD1 is set to the H level, and during a period in which a condition of CW1>DT1 is satisfied, control pulse signal SD1 is set to the L level. Therefore, with increase in duty ratio DT1, the H level period of control pulse signal SD1 is longer and the H level period of control pulse signal /SD1 is shorter. As described above, since on of the lower arm of DC power supply B1 is indicated during the H level period of control pulse signal SD1, output from DC power supply B1 increases with increase in duty ratio DT1.

Similarly, for DC power supply B2 as well, control pulse signals SD2 and /SD2 are generated through PWM control based on voltage comparison between duty ratio DT2 and carrier wave CW2. Similarly to control pulse signals SD1 and /SD1, during a period in which a condition of DT2>CW2 is satisfied, control pulse signal SD2 is set to the H level, and during a period in which a condition of CW2>DT2 is satisfied, control pulse signal SD2 is set to the L level. During the H level period of control pulse signal SD2, on of the lower arm of DC power supply B2 is indicated, and hence output from DC power supply B2 increases with increase in duty ratio DT2.

Control signals SG1 to SG5 are generated in response to control pulse signals SD1, /SD1, SD2, and /SD2 obtained through PWM control, in accordance with the Boolean expressions shown in FIG. 12. Here, in accordance with the Boolean expressions shown in FIG. 12, a switching pattern of switching elements S1 to S5 is limited to four shown in FIG. 15, depending on combination between the H/L level of control pulse signal SD1 and the H/L level of control pulse signal SD2.

Figures 15, 16:
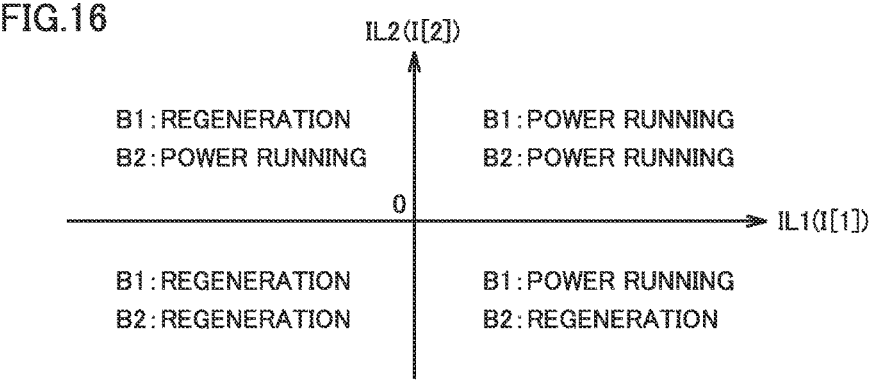
FIG. 15 is a chart showing a list of switching patterns in the parallel boost mode.
FIG. 16 is a conceptual diagram illustrating combination of orientations of reactor currents in the power converter according to the first embodiment.

FIG. 15 is a chart showing a list of on/off patterns (switching patterns) of switching elements S1 to S5 in the parallel boost mode.

Referring to FIG. 14, during a period from time t0 to t1, a condition of SD1=SD2=H is satisfied. Here, a condition of control signal SG1=SG3=SG5$b$=L is satisfied, while a condition of SG2=SG4=SG5$a$=H is satisfied. Therefore, as shown in a pattern II in FIG. 15, switching element S5$b$ is turned off and the first arm is formed. Switching elements S1 and S3 are turned off while switching elements S2 and S4 are turned on.

Here, as is understood from FIG. 11, on of the lower arm (the B1L arm and the B2L arm) is indicated to each of DC power supplies B1 and B2. Therefore, during the period from time t0 to t1, both of reactor currents IL1 and IL2 increase. As is clear from the circuit configuration in FIG. 1, reactor current IL1 corresponds to current I[1] from DC power supply B1, and reactor current IL2 corresponds to current I[2] from DC power supply B2.

Referring again to FIG. 14, since control pulse signal SD2 makes transition from the H level to the L level at time t1, during a period from time t1 to t2, a condition of SD1=H and SD2=L is satisfied. Here, a condition of control signal SG2=SG3=SG5$a$=SG5$b$=H is satisfied, while a condition of SG1=SG4=L is satisfied. Therefore, as shown in a pattern I in FIG. 15, under such a condition that switching elements S5$a$ and S5$b$ are turned on and the second arm is formed, switching elements S2 and S3 are turned on while switching elements S1 and S4 are turned off.

Here, as is understood from FIG. 11, on of the lower arm (the B1L arm) is indicated to DC power supply B1, while on of the upper arm (the B2U arm) is indicated to DC power supply B2. Therefore, during the period from time t1 to t2, reactor current IL1 increases while reactor current IL2 lowers. Consequently, at time t1, reactor current IL2 stops to increase and starts to lower and hence it has the relative maximum point.

Referring again to FIG. 14, since control pulse signal SD1 makes transition from the H level to the L level at time t2, during a period from time t2 to t3, a condition of SD1=SD2=L is satisfied. Here, a condition of control signal SG2=SG4=SG5$a$=L is satisfied, while a condition of SG1=SG3=SG5$b$=H is satisfied. Therefore, as shown in a pattern IV in FIG. 15, under such a condition that switching element S5$a$ is turned off and the boost chopper circuit where the first arm is used is formed, switching elements S1 and S3 are turned on and switching elements S2 and S4 are turned off Here, as is understood from FIG. 11, on of the upper arm (the B1U arm and the B2U arm) is indicated to each of DC power supplies B1 and B2. Therefore, during the period from time t2 to t3, both of reactor currents IL1 and IL2 lower. Consequently, at time t2, reactor current IL1 stops to increase and starts to lower and hence it has the relative maximum point.

Referring again to FIG. 14, since control pulse signal SD1 makes transition from the L level to the H level at time t3, during a period from time t3 to t4, a condition of SD1=H and SD2=L is satisfied. Therefore, as a switching pattern (pattern I in FIG. 15) during the period from time t0 to t1 is reproduced, under such a condition that the first arm is used, switching elements S1 to S5 are controlled such that reactor current IL1 increases while reactor current IL2 lowers. Consequently, at time t3, reactor current IL1 stops to lower and starts to increase and hence it has the relative minimum point.

In the operation example in FIG. 14, since a condition of DT1>DT2 is satisfied, in contrast to the period from time t0 to t1, there is no period during which a condition of SD1=L and SD2=H is satisfied. During that period, however, as shown in FIG. 15, a condition of control signal SG1=SG4=SG5$a$=SG5$b$=H is satisfied, while a condition of SG2=SG3=L is satisfied. Therefore, as shown in a pattern III in FIG. 15, under such a condition that switching elements SG5*a* and SG5*b* are turned on and the boost chopper circuit where the second arm is used is formed, switching elements S1 and S4 are turned on while switching elements S2 and S3 are turned off.

Here, as is understood from FIG. 11, on of the lower arm (the B2L arm) is indicated to DC power supply B2, while on of the upper arm (the B1U arm) is indicated to DC power supply B1. Therefore, it is understood that, during that period, switching elements S1 to S5*a* and S5*b* are controlled such that reactor current IL2 increases while reactor current IL1 lowers.

At time t4 or later in FIG. 14 as well, switching elements S1 to S5*a* and S5*b* can similarly be controlled in accordance with the switching pattern shown in FIG. 15 through PWM control in accordance with duty ratios DT1 and DT2.

Thus, in power converter 10 according to the first embodiment, in order to control outputs from DC power supplies B1 and B2 in accordance with duty ratios DT1 and DT2, switching among four switching patterns shown in FIG. 15 is made. Thus, in each control cycle corresponding to one cycle of carrier waves CW1 and CW2, two inflection points (a relative maximum point and a relative minimum point) are produced in each of reactor currents IL1 and IL2.

In the parallel boost mode, by switching among four switching patterns shown in FIG. 15, DC power supplies B1 and B2 can carry out DC/DC conversion in parallel to power lines PL and GL while switching between a period in which the boost chopper circuit where the first arm is used is formed (patterns II and IV) and a period in which the boost chopper circuit where the second arm is used is formed (patterns I and III) is automatically made.

(Power Loss in Power Converter in Parallel Boost Mode)

An effect of reduction in power loss in the parallel boost mode of power converter 10 according to the first embodiment will now be described in detail.

Power converter 10 carries out DC/DC conversion with the circuit configuration (PTD 1) in which two boost chopper circuits are connected in parallel as shown in FIG. 5 while the first arm set by turn-off of switching element S5 is applied.

On the other hand, in the parallel connection mode of the power converter shown in PTD 2, currents resulting from DC/DC conversion for two DC power supplies flow as being superimposed on each other through some switching elements and hence increase in conduction loss is a concern. Namely, in the parallel connection mode of the power converter in PTD 2, there is a concern that a power loss in the switching element is greater than in the circuit configuration in PTD 1 and application of the first arm of power converter 10.

In contrast, in power converter 10 according to the first embodiment, as will be described below, a conduction loss in the switching element can be reduced by providing a period during which the second arm is formed described above.

Referring again to FIG. 15, during a period in which the boost chopper circuit where the second arm is used is formed in power converter 10, there are only two switching patterns of pattern I (FIG. 15) in which switching elements S2, S3, and S5 (S5*a* and S5*b*) are turned on (S1 and S4 are turned off) and pattern III in which switching elements S1, S4, and S5 (S5*a* and S5*b*) are turned on (S2 and S3 are turned off).

As is understood from FIG. 8, in pattern I (S2, S3, S5*a*, and S5*b* being turned on), switching elements S2 and S3 are electrically connected in parallel between node N2 and power line GL as the lower arm of DC power supply B1. Simultaneously, switching elements S2 and S3 are electrically connected in parallel between node N2 and power line GL as the upper arm of DC power supply B2.

In pattern III (S1, S4, S5*a*, and S5*b* being turned on), switching elements S1 and S4 are electrically connected in parallel between node N2 and power line PL as the lower arm of DC power supply B2. Simultaneously, switching elements S1 and S4 are electrically connected in parallel between node N1 and power line PL as the upper arm of DC power supply B1.

When the second arm is formed, a power loss in the switching element is suppressed owing to a branching effect resulting from connection in parallel of a plurality of switching elements as the upper arm or the lower arm of DC power supplies B1 and B2 and an effect of cancellation between reactor currents IL1 and IL2. The current cancellation effect is different in behavior depending on an orientation (positive/negative) of reactor currents IL1 and IL2.

FIG. 16 shows a conceptual diagram illustrating a combination of directions of reactor currents IL1 and IL2 in power converter 10.

Referring to FIG. 16, based on combination of positive/negative of reactor currents IL1 and IL2, an operation region of power converter 10 is divided into a region where both of DC power supplies B1 and B2 perform a power running operation (IL1>0, IL2>0), a region where DC power supply B1 performs a regeneration operation while DC power supply B2 performs a power running operation (IL1<0, IL2>0), a region where both of DC power supplies B1 and B2 perform a regeneration operation (IL1<0, IL2<0), and a region where DC power supply B1 performs a power running operation while DC power supply B2 performs a regeneration operation (IL1>0, IL2<0).

A behavior of a current when the second arm is formed will now be described with reference to FIG. 17. FIG. 17 (*a*) shows a behavior of a current in pattern I (the B1L arm and the B2U arm being turned on). FIG. 17 (*b*) shows a behavior of a current in pattern III (the B1U arm and the B2L arm being turned on).

FIG. 17 (*a*) shows a behavior of a current in an example where the condition of IL1>0 and IL2>0 is satisfied and both of DC power supplies B1 and B2 perform a power running operation. In pattern I, switching elements S2, S3, and S5 (S5*a* and S5*b*) in the on state are connected in a form of a loop between nodes N1 and N2 and power line GL. Since diodes are connected bidirectionally in parallel in each of switching elements S2, S4, and S5 in this state, paths for reactor currents IL1 and IL2 are varied in accordance with relation in potential between nodes N1 and N2. Reactor current IL2 may form a current path 118*d* which goes through switching element S2 and switching element S5*a* as a result of branching, in addition to current path 118. Similarly, reactor current IL1 may form a current path 115*d* which goes through switching element S2 as a result of branching, in addition to current path 115.

A forward voltage substantially the same in magnitude is generated in each conducting diode through which a current flows. Therefore, such a state that a current flows through all of switching elements S2, S3, and S5 connected in a form of a loop (a conducting state) does not take place, because, if three substantially comparable voltages form a closed path in a loop, the Kirchhoff's voltage law does not hold whichever orientation each voltage may be in. Therefore, any of switching elements S2, S3, and S5 is naturally rendered non-conducting and a current does not pass therethrough.

As shown in FIG. 17 (*a*), when the condition of IL1>0 and IL2>0 is satisfied, IL1 flows into node N1 whereas IL2 flows in from node N2. In connection with this direction of the current, when a condition of IL2>IL1 is satisfied, switching element S2 is rendered non-conducting (current=0) and switching elements S3 and S5 are rendered conducting.

Initially, when S2 and S3 are conducting (S5 is not conducting), such a state is inconsistent with the Kirchhoff's voltage law and hence such a circuit state does not take place. Specifically, when S2 and S3 are conducting (S5 is not conducting), a total amount of IL1 passes through S2 via current path 115*d* and a total amount of IL2 passes through S3 via current path 118. In this direction of the current, however, the sum of forward voltage drops caused in switching elements S2 and S3 is applied to switching element S5, and hence switching element S5 cannot be rendered non-conducting.

Similarly, when S2 and S5 are conducting (S3 is not conducting) as well, such a circuit state is inconsistent with the Kirchhoff's voltage law and hence such a circuit state does not take place. Specifically, when S2 and S5 are conducting (S3 is not conducting), a total amount of IL2 passes through S2 via current path 115 and 115*d*. Consequently, IL2 passes through S5 and a differential current (IL1−IL2) passes through S2. When the condition of IL2>IL1 is satisfied, however, the sum of forward voltage drop in S2 and forward voltage drop in S5 is applied to switching element S3 and switching element S3 cannot be rendered non-conducting.

In contrast, when S3 and S5 are conducting (S2 is not conducting), a total amount of IL1 passes through S5 via current path 115 and IL2 is branched to current paths 118 and 118*d*. Consequently, IL1 passes through S5 and a differential current (IL1−IL2) passes through S3. When the condition of IL2>IL1 is satisfied, a difference between forward voltage drop in S5 and forward voltage drop in S3 is applied to switching element S2 and hence switching element S2 is rendered non-conducting.

Therefore, when the condition of IL2>IL1 is satisfied in FIG. 17 (*a*), a current through switching element S2 is 0 whereas a differential current (IL1−IL2) passes through switching element S3 and IL1 passes through switching element S5*a*.

When a condition of IL1>IL2 is satisfied in FIG. 17 (*a*), a direction of the differential current (IL1−IL2) is reverse, and hence switching element S3 is rendered non-conducting (current=0) and switching elements S2 and S5 are rendered conducting. A current through switching element S3 is 0, whereas a differential current (IL2−IL1) passes through switching element S2 and IL2 passes through switching element S5*a*.

FIG. 17 (*b*) shows a behavior of a current when the condition of IL1>0 and IL2>0 is satisfied in which both of DC power supplies B1 and B2 perform the power running operation in pattern III (the B1U arm and the B2L arm being turned on).

In pattern III, switching elements S1, S4, and S5 (S5*a* and S5*b*) in the on state are connected in the form of the loop between nodes N1 and N2 and power line PL. In this state, each of switching elements S1, S4, and S5 is in such a state that diodes are bidirectionally connected in parallel. Therefore, the paths for reactor currents IL1 and IL2 are varied in accordance with relation in potential between nodes N1 and N2. Reactor current IL2 may form a current path 116*d* which goes through switching elements S1 and S5*a* as a result of branching, in addition to current path 116. Similarly, reactor current IL1 may form a current path 117*d* which goes through switching element S1 (diode D1) as a result of branching, in addition to current path 117.

When the condition of IL2>IL1 is satisfied in FIG. 17 (*b*), based on the discussion as presented with reference to FIG. 17 (*a*), switching element S1 is rendered non-conducting (current=0) and switching elements S4 and S5 are rendered conducting. A current through switching element S1 is 0, whereas a differential current (IL2−IL1) passes through switching element S4 and IL1 passes through switching element S5*a*.

Similarly, when the condition of IL1>IL2 is satisfied in FIG. 17 (*b*), a direction of the differential current (IL1−IL2) is reverse, and hence switching element S4 is rendered non-conducting (current=0) and switching elements S1 and S5 are rendered conducting. A current through switching element S4 is 0, whereas a differential current (IL1−IL2) passes through switching element S1 and IL2 passes through switching element S5*a*.

Thus, when both of DC power supplies B1 and B2 perform the power running operation while the second arm is formed in the parallel boost mode of power converter 10, three switching elements are turned on and currents therethrough are set to 0, IL1 or IL2, and a differential current ΔI (IL1−IL2), respectively. When IL1 and IL2 are identical in sign, a condition of |IL1−IL2|<IL1 and |IL1−IL2|<IL2 is satisfied. Therefore, while the second arm is formed, a power loss (a conduction loss and a switching loss) in switching elements S1 to S5 (S5*a* and S5*b*) can be less than in the example of formation of the first arm in which IL1 and IL2 pass through respective switching elements.

When both of DC power supplies B1 and B2 perform the regeneration operation, current directions of IL1 and IL2 are each opposite, and hence the current paths in the first pattern and the second pattern are opposite to the current directions in FIGS. 17 (*a*) and (*b*). Since the condition of |IL1−IL2|<|IL1| and |IL1−IL2|<|IL2| is satisfied again, a power loss in switching elements S1 to S5 (S5*a* and S5*b*) while the second arm is formed is the same as in the example in which both of DC power supplies B1 and B2 perform the power running operation.

Therefore, in power converter 10, when both of DC power supplies B1 and B2 perform the power running operation or the regeneration operation, owing to an effect that a current through a switching element is set to the differential current |IL1−IL2| while the second arm is formed, a power loss in switching elements S1 to S5 (S5*a* and S5*b*) can be lessened.

When DC power supply B1 performs the power running operation (IL1>0) whereas DC power supply B2 performs the regeneration operation (IL2<0) in the circuit state (the first pattern) in FIG. 17 (*a*), currents flow in from both of nodes N1 and N2 into switching elements S2, S3, and S5 in the on state. Here, switching element S5 is rendered non-conducting, and IL1 totally passes through switching element S2 and IL2 passes through switching element S3. This is because such a circuit state that switching element S2 or S3 is rendered non-conducting in a loop path formed by switching elements S2, S3, and S5 is inconsistent with the Kirchhoff's voltage law in consideration of the direction of forward voltage drop.

Similarly, when the condition of IL1>0 and IL2<0 is satisfied as above in the circuit state (the second pattern) in FIG. 17 (*b*), currents flow in from both of nodes N1 and N2 into switching elements S1, S4, and S5 in the on state. Here again, switching element S5 is rendered non-conducting, and IL1 totally passes through switching element S1 and IL2 passes through switching element S4. This is because such a circuit state that switching element S1 or S4 is rendered non-conducting in the loop path formed by switching elements S1, S4, and S5 is inconsistent with the Kirchhoff's voltage law in consideration of the direction of forward voltage drop.

It is understood that the current cancellation effect producing a differential current is not obtained in such a case and therefore a power loss in switching elements S1 to S5 (S5a and S5b) is comparable to that in formation of the first arm in which switching element S5 is turned off, that is, the circuit configuration in PTD 1.

When DC power supply B1 performs the regeneration operation (IL1<0) whereas DC power supply B2 performs the power running operation (IL2>0), current paths in the first pattern and the second pattern are opposite in current direction to the case of IL1>0 and IL2<0 described above. In this case as well, a power loss in switching elements S1 to S5 (S5a and S5b) is comparable to that in formation of the first arm, that is, the circuit configuration in PTD 1.

A power loss in switching elements in the parallel boost mode of power converter 10 described above is summarized. When any one of DC power supplies B1 and B2 performs the power running operation and the other performs the regeneration operation while the first arm is formed and while the second arm is formed (IL1>0 and IL2<0 or IL1<0 and IL2>0), a power loss in switching elements is comparable to that in PTD 1 in which two boost chopper circuits operate in parallel.

When DC power supplies B1 and B2 are identical in power running/regeneration operation while the second arm is formed (IL1>0 and IL2>0 or IL1<0 and IL2<0), a power loss in switching elements S1 to S5a and S5b is less than in formation of the first arm and PTD 1, owing to the current cancellation effect producing a differential current.

Therefore, even when DC power supplies B1 and B2 are different in operation between power running and regeneration throughout a period during which the second arm is formed, a conduction loss in switching elements is comparable to a conduction loss in the boost chopper circuit where the first arm is used (that is, a conduction loss in the power converter in PTD 1). If there is at least a period during which both of DC power supplies B1 and B2 perform the power running operation or the regeneration operation, a conduction loss in switching elements is less than in formation of the first arm.

By providing a period during which the second arm is formed (the on period of switching element S5), a power loss in switching elements S1 to S5a and S5b (a conduction loss and a switching loss) can be less than a power loss in the boost chopper circuit where the first arm is used.

(Current Phase Control)

In the power supply system according to the first embodiment, a loss in power converter 10 is further reduced by control of phases of reactor currents IL1 and IL2 (hereinafter also referred to as "current phase control") based on adjustment of a phase difference between carrier waves used for control of outputs from DC power supplies B1 and B2.

Figure 18:
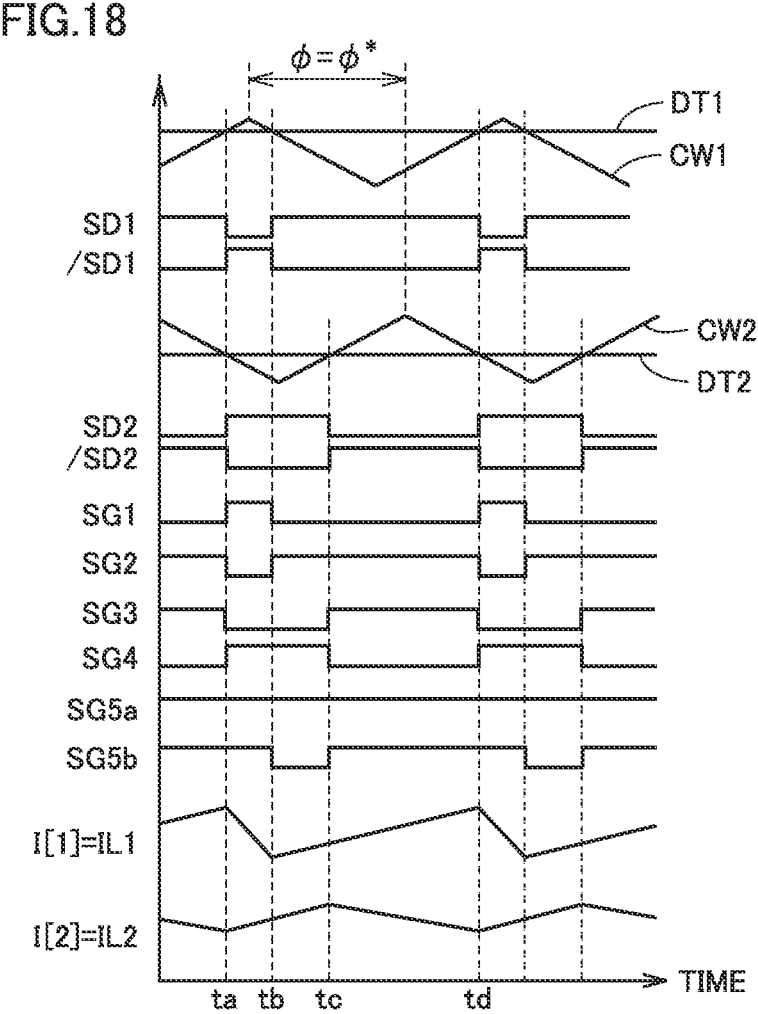
FIG. 18 is a waveform diagram for illustrating an operation in PWM control to which current phase control is applied.

FIG. 18 is a waveform diagram for illustrating application of a current phase to power converter 10 according to the first embodiment.

Referring to FIG. 18, in application of current phase control, carrier wave generation portion 240 (FIG. 13) provides a phase difference $\phi$ between carrier wave CW1 used for PWM control of DC power supply B1 and carrier wave CW2 used for PWM control of DC power supply B2.

In contrast, in the operation waveform exemplified in FIG. 14, carrier waves CW1 and CW2 are identical in frequency and phase. In other words, in FIG. 14, a condition of $\phi=0$ is set.

With phase difference $\phi$, control pulse signals SD1 and /SD1 are generated in PWM control based on voltage comparison between carrier wave CW1 and duty ratio DT1. Similarly, control pulse signals SD2 and /SD2 are generated in PWM control based on voltage comparison between carrier wave CW2 and duty ratio DT2.

In FIG. 18, duty ratios DT1 and DT2 are identical in value to those in FIG. 14. Therefore, control pulse signal SD1 in FIG. 18 is identical in duration of the H level period to control pulse signal SD1 in FIG. 14, although it is different in phase. Similarly, control pulse signal SD2 in FIG. 18 is identical in duration of the H level period to control pulse signal SD2 in FIG. 14, although it is different in phase.

By providing a phase difference between carrier waves CW1 and CW2, control signals SG1 to SG5a and SG5b in FIG. 18 are different in waveform from control signals SG1 to SG5a and SG5b in FIG. 14. It is understood based on comparison between FIGS. 14 and 18 that phase relation (current phase) between reactor currents IL1 and IL2 is also changed with change in phase difference $\phi$ between carrier waves CW1 and CW2.

It is understood on the other hand that an average value of currents IL1 and IL2 for the same duty ratios DT1 and DT2 is equivalent between FIGS. 14 and 18. Outputs from DC power supplies B1 and B2 are controlled based on duty ratios DT1 and DT2 and are not affected by change in phase difference $\phi$ between carrier waves CW1 and CW2.

Therefore, in current phase control, a conduction loss in switching elements in the parallel connection mode of power converter 10 is lessened by carrier phase control for appropriately adjusting phase difference $\phi$ between carrier waves CW1 and CW2.

Specifically, phase difference $\phi$ is adjusted such that inflection points in reactor currents IL1 and IL2 appear at the same timing. In the example in FIG. 18, a condition of phase difference $\phi=\phi^*$ can be set such that the timing of transition of control pulse signal SD1 from the H level to the L level and the timing of transition of control pulse signal SD2 from the L level to the H level are the same (time ta). Since reactor current IL1 thus stops to increase and starts to lower at time ta, it has a relative maximum point. In contrast, since reactor current IL2 stops to lower and starts to increase, it has a relative minimum point.

With such a current phase, as is understood from comparison between FIGS. 14 and 18, the number of times of turn-on and -off (a total value) of switching elements S5a and S5b for each control cycle (corresponding to one cycle of carrier waves CW1 and CW2) can be reduced. Furthermore, a longer period during which control pulse signals SD1 and SD2 are different from each other in logic level, that is, a period during which the second arm is used, can be ensured. Phase difference $\phi^*$ which brings about such phase relation is hereinafter also referred to as an optimal phase difference $\phi^*$.

As described above, in the parallel boost mode of power converter 10, a power loss (a conduction loss and a switching loss) in switching elements is less during application of the second arm than during application of the first arm. As is understood from the gate Boolean expressions shown in FIG. 12, the period during which the second arm can be used is limited to the period during which control pulse signals SD1 and SD2 are different from each other in logic level. Therefore, under such a condition that a duration of the H level period of control pulse signals SD1 and SD2 is defined by duty ratios DT1 and DT2, by adjusting a pulse phase such that the period during which the control pulse signals are different from each other in logic level is longer, the period during which the second arm is used can be longer in the parallel boost mode of power converter 10. A conduction loss in the parallel boost mode of power converter 10 can thus further be lessened.

In contrast to the example in FIG. 18, when phase difference φ is set such that the timing of transition of control pulse signal SD1 from the L level to the H level (time tb) and timing of transition of control pulse signal SD2 from the H level to the L level (time tc) are the same as well, as in FIG. 18, the number of times of turn-on and -off (a total value) of switching elements S5a and S5b can be reduced and a longer period during which the second arm is applied can be ensured. Phase difference φ at this time can also be defined as optimal phase difference φ*.

By setting phase difference φ=φ* such that control pulse signals SD1 and SD2 are the same in timing of transition of the logic level and the period during which the second arm is used is maximized as described above, the inflection points of reactor currents IL1 and IL2 appear at the same timing.

As is understood from FIGS. 14 and 18, waveforms of control pulse signals SD1 and SD2 are determined by duty ratios DT1 and DT2. Therefore, it is understood that optimal phase difference φ* with which relation between control pulses SD1 and SD2 and current phases of IL1 and IL2 as in FIG. 18 can be realized is also varied in accordance with duty ratios DT1 and DT2.

Therefore, relation between duty ratios DT1 and DT2 and optimal phase difference φ* is found in advance and correspondence can be stored in advance as a map (hereinafter also referred to as a "phase difference map") or a function expression (hereinafter also referred to as a "phase difference calculation expression") in control device 100.

Therefore, when the parallel boost mode of power converter 10 is selected, carrier wave generation portion 240 (FIG. 13) can set optimal phase difference φ* by referring to the phase difference map or the phase difference calculation expression based on duty ratios DT1 and DT2 calculated by controllers 210 and 220 (FIG. 13). Furthermore, carrier wave generation portion 240 generates carrier waves CW1 and CW2 identical in frequency in order to provide set optimal phase difference φ* therebetween.

PWM control unit 230 (FIG. 13) generates control pulse signals SD1 and SD2 in such phase relation that the period during which control pulse signals SD1 and SD2 are different from each other in logic level (H/L level) is maximized as shown in FIG. 18. Control signals SG1 to SG4, SG5a, and SG5b are generated in accordance with the Boolean expressions shown in FIG. 12.

Consequently, in power converter 10, as a result of application of current phase control, DC/DC conversion can further be efficient owing to reduction in switching loss by switching elements S5a and S5b and reduction in loss in switching elements based on extension of the period during which the second arm is applied.

(Switching Control According to Present Embodiment)

As described so far, in power converter 10, PWM control in accordance with duty ratios DT1 and DT2 is carried out. Thus, outputs from DC power supplies B1 and B2 are controlled by providing inflection points (a relative maximum point and a relative minimum point) in reactor currents IL1 and IL2 in each control cycle (one cycle of carrier waves CW1 and CW2). As a differential current flows through a specific switching element as a result of current phase control, a total value of power losses in switching elements S1 to S5a and S5b can be reduced.

In consideration of manufacturing cost, however, preferably, not only a total value for power losses in switching elements is suppressed but also unevenness in power loss among the switching elements is lessened. Therefore, in the power supply system according to the present first embodiment, switching control in DC/DC conversion for suppressing unevenness in power loss among the switching elements is carried out.

Figure 19:
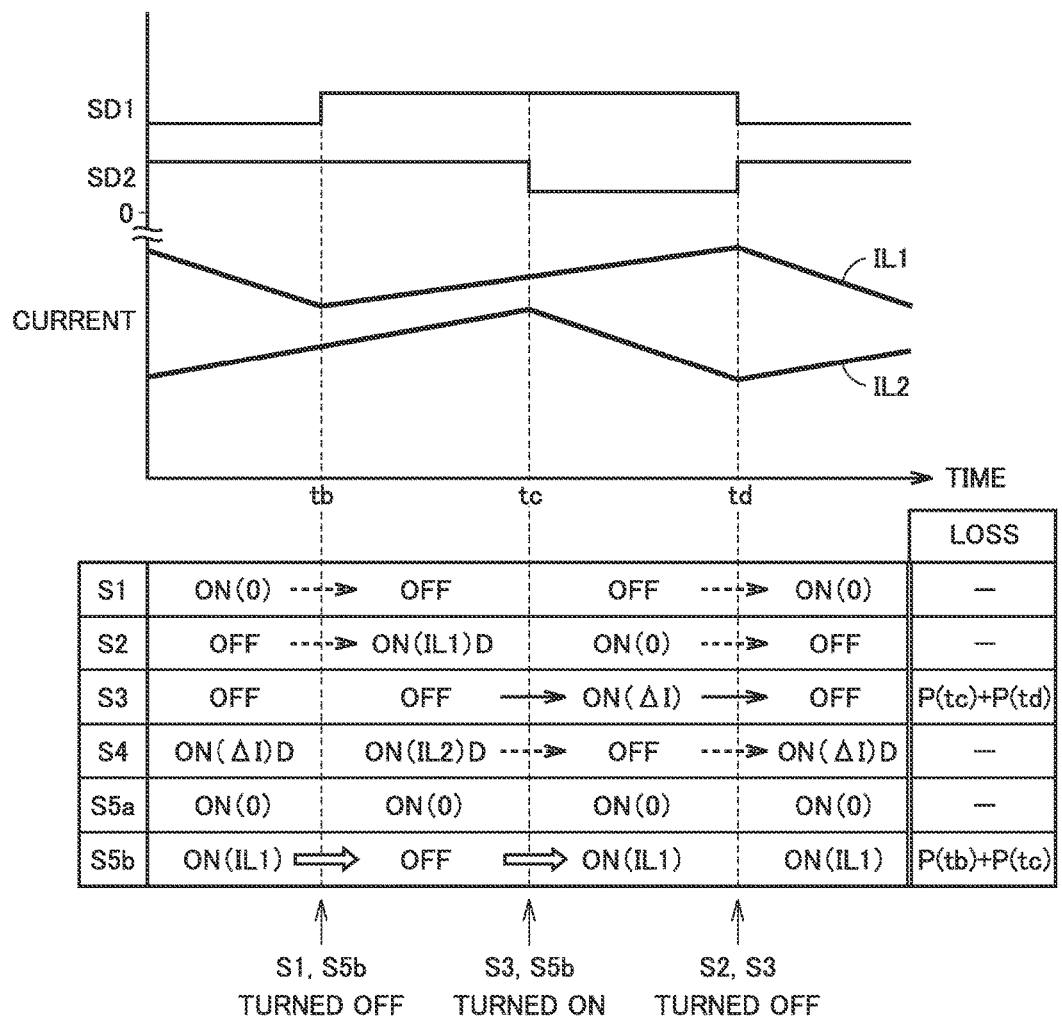
FIG. 19 is a waveform diagram (in regeneration) for illustrating a power loss in each switching element when current phase control is applied.

FIG. 19 is a waveform diagram for illustrating a power loss in each switching element when current phase control is applied, which is shown as a comparative example. FIG. 19 shows a waveform diagram in an example in which both of DC power supplies B1 and B2 perform the regeneration operation (IL1<0 and IL2<0). FIG. 20 shows a circuit diagram illustrating a behavior of a current when the second arm is formed in power converter 10 in the regeneration operation.

FIG. 19 shows a waveform of a current when a condition of |IL2|>|IL1| is satisfied. A reactor current smaller in absolute value is also referred to as a "low current" and a reactor current greater in absolute value is also referred to as a "high current" below.

Referring to FIG. 19, since a condition of SD1=L and SD2=H is satisfied for a period until time tb, the second arm is applied. Reactor current IL1 lowers due to turn-on of the B1U arm whereas reactor current IL2 increases due to turn-on of the B2L arm.

Switching elements S1, S4, S5a, and S5b are turned on in accordance with pattern III shown in FIG. 15. FIG. 20 (b) shows a current path in power converter 10 during this period.

Referring to FIG. 20 (b), during regeneration of DC power supplies B1 and B2, a current in a direction reverse to the direction in FIG. 17 (b) is generated. DC power supply B1 is charged with IL1 which flows through a current path 117# (IL1<0). IL1 may form a current path 117d# which goes through switching element S1 as a result of branching. Similarly, DC power supply B2 is charged with IL2 which flows through a current path 116# (IL2<0). IL2 may form a current path 116d# which goes through diode D1 and switching element S5b as a result of branching.

When the condition of |IL2|>|IL1| is satisfied, IL1 and IL2 flow through current paths 117# and 116#, respectively. Therefore, the current through switching element S1 is 0 and differential current ΔI (IL2−IL1) flows through diode D4. Current IL1 flows through switching element S5b, whereas the current through switching element S5a is 0.

Therefore, a power loss (a conduction loss) is produced only in diode D4 and switching element S5b. A conduction loss in accordance with ΔI=(IL2−IL1) is produced in diode D4, whereas a conduction loss in accordance with IL1 is produced in switching element S5b. Therefore, it is understood that only a conduction loss in accordance with IL2 is produced in total. Since IL1 and IL2 pass through separate switching elements in the circuit configuration in PTD 1, a conduction loss in accordance with (IL1+IL2) is produced.

At time tb, control pulse signal SD1 in accordance with duty ratio DT1 makes transition from the L level to the H level. In response, the B1U arm is turned off and the B1L arm is turned on, and hence reactor current IL1 attains to the relative minimum point.

At time tb, the switching pattern is changed from pattern III to pattern II. Therefore, switching element S2 is turned on and switching elements S1 and S5b are turned off.

Consequently, during the period from time tb to tc, switching elements S2, S4, and S5a are turned on and currents in opposite directions flow through current paths 111 and 112 in FIG. 6. Therefore, IL1 flows through diode D2, IL2 flows through diode D4, and no current is produced in switching elements S2 and S4. A current through switching element S5a is 0. In hereafter including FIG. 19, a current which flows through a diode is denoted with a suffix "D".

Though switching element S2 is turned on at time tb as described above, a current flows through diode D2 and hence no switching loss is produced. Of a plurality of switching elements S1 and S5b to simultaneously be turned off, in switching element S5b, a power loss (turn-off) due to hard switching of IL1 is produced, whereas in switching element S1, a current before turn-off is 0, and hence no switching loss is produced.

In hereafter including FIG. 19, turn-on or turn-off due to hard switching is denoted with a "bold arrow (hollow)." Turn-on and turn-off without a switching loss is denoted with a "dotted arrow."

When control pulse signal SD2 in accordance with duty ratio DT2 makes transition from the H level to the L level at time tc, reactor current IL2 attains to the relative maximum point. In response, the B2L arm is turned off and the B2U arm is turned on. Therefore, the switching pattern makes transition from pattern II to pattern I. Therefore, switching element S4 is turned off and switching elements S3 and S5b are turned on.

Consequently, during the period from time tc to td, switching elements S2, S3, S5a, and S5b are turned on. FIG. 20 (a) shows a current path in power converter 10 during this period.

Referring to FIG. 20 (a), during regeneration by DC power supplies B1 and B2, a current in a direction reverse to the direction in FIG. 17 (b) is generated. DC power supply B1 is charged with IL1 which flows through current path 115# (IL1<0). IL1 may form current path 115d# which goes through diode D2 as a result of branching. Similarly, DC power supply B2 is charged with IL2 which flows through a current path 118# (IL2<0). IL2 may form a current path 118d# which goes through switching elements S2 and S5b as a result of branching.

When the condition of |IL2|>|IL1| is satisfied, IL1 and IL2 flow through current paths 115# and 118#, respectively. Therefore, during the period from time tc to td, differential current ΔI (|IL2−IL1|) flows through switching element S3, whereas a current through switching element S2 is 0. IL1 flows through switching element S5b, whereas a current through switching element S5a is 0.

Therefore, at time tc, of a plurality of switching elements S3 and S5b to simultaneously be turned on, in switching element S5b, a power loss (turn-on) due to hard switching of IL1 is produced, whereas in switching element S3, a power loss (turn-on) due to switching of differential current ΔI is produced. In switching element S4 which is turned off, diode D4 is turned off owing to arc extinguishing by itself and hence no power loss is produced.

At time td, control pulse signal SD1 makes transition from the H level to the L level and control pulse signal SD2 makes transition from the L level to the H level as a result of current phase control. Thus, reactor current IL1 attains to the relative maximum point and reactor current IL2 attains to the relative minimum point at the same timing. In response, the B1L arm is turned off and the B1U arm is turned on. Furthermore, the B2U arm is turned off and the B2L arm is turned on. Therefore, the switching pattern makes transition from pattern I to pattern III. In response, at time td, switching elements S1 and S4 are turned on and switching elements S2 and S3 are turned off.

After time td, again, as shown in FIG. 20 (b), switching elements S1, S4, S5a, and S5b are turned on and a current similar to the current before time tb flows through each element.

Therefore, of switching elements S1 and S4 to simultaneously be turned on, in switching element S1, a current after turn-on is 0 and hence no switching loss is produced. Since the path for differential current ΔI is changed to a path through diode D4, a turn-on loss in switching element S4 is not produced either.

Of switching elements S2 and S3 to simultaneously be turned off, in switching element S3, a power loss (turn-off) due to switching of differential current ΔI is produced. In switching element S2, however, a current before turn-on is 0 and hence no switching loss is produced.

As is understood from FIG. 19, in power converter 10, only switching in accordance with differential current ΔI is made without hard switching of IL1 and IL2 at time td at which inflection points (the relative maximum point and the relative minimum point) of reactor currents IL1 and IL2 appear at the same timing owing to current phase control. Consequently, owing to the effect of current phase control, a total value of switching losses (on and off losses) in the switching elements can be reduced. Furthermore, during the period in which the second arm is applied (a period except for the period from time tb to tc) as described above, a conduction loss can be reduced by generation of differential current ΔI.

Thus, in the circuit state exemplified in FIG. 19 (IL1<0, IL2<0, and |IL2|>|IL1|), a switching loss is produced only in switching elements S3 and S5b. Therefore, increase in difference in amount of heat generation among switching elements due to concentration of the power loss only in switching elements S3 and S5b with a continued circuit operation in FIG. 19 for a long period of time is a concern.

Figure 21:
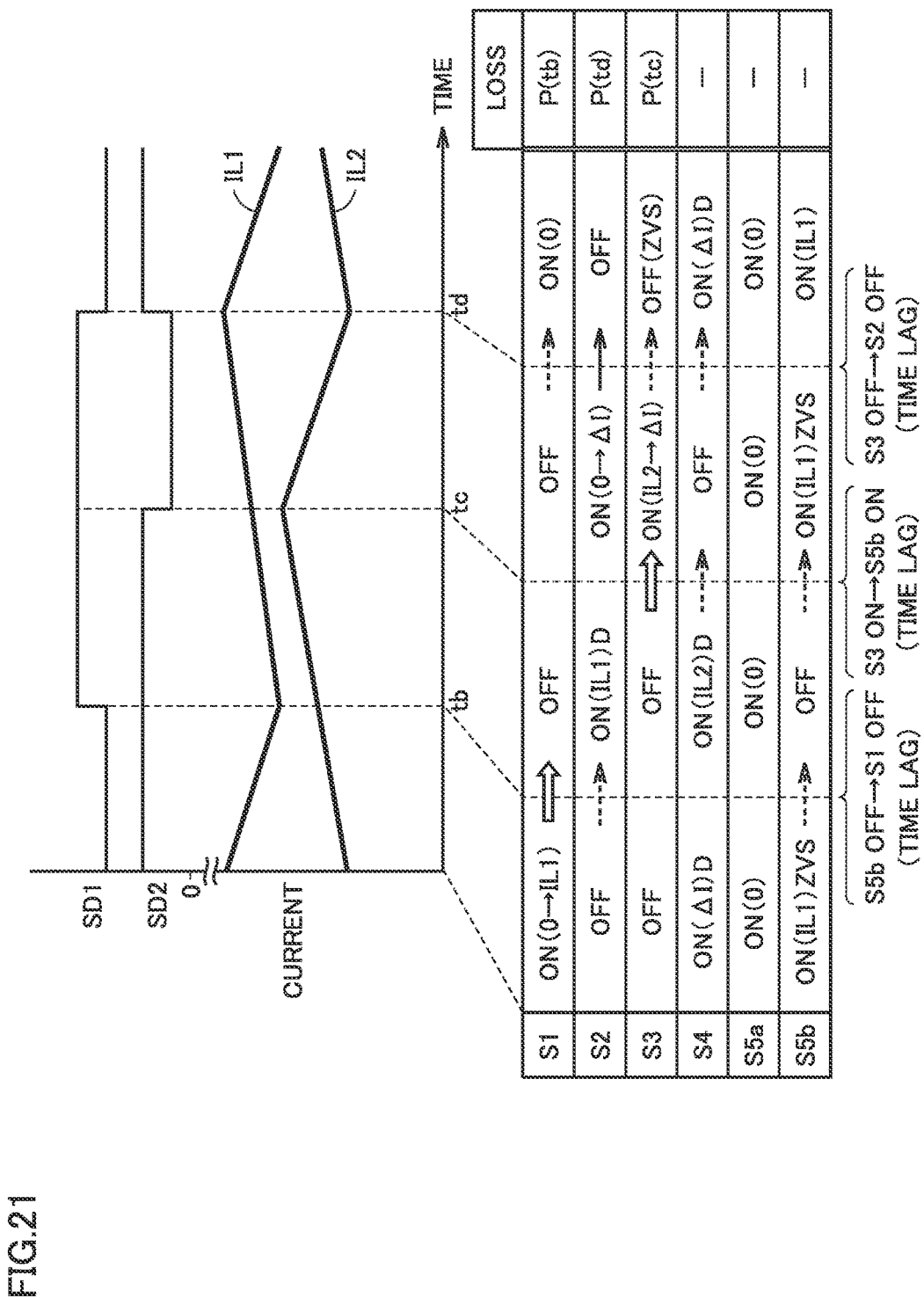
FIG. 21 is a waveform diagram (in regeneration) for illustrating a power loss in each switching element when switching control according to the first embodiment is applied.

FIG. 21 shows a waveform diagram for illustrating a power loss in each switching element when switching control according to the first embodiment is applied. FIG. 21 shows a waveform diagram when switching control according to the first embodiment is applied to the circuit state same as in FIG. 19. In FIG. 21, the condition of IL1<0 and IL2<0 and |IL2|>|IL1| again satisfied.

Referring to FIG. 21, in switching control according to the present embodiment, at times tb, tc, and td when inflection points appear in reactor currents IL1 and IL2, a plurality of switching elements to simultaneously be turned on or off are controlled to be turned on or off in a prescribed order with a time lag being set. Since on and off of and a current path in each switching element during the period until time tb, during the period from time tb to tc, during the period from time tc to td, and during a period after period td are the same as in FIG. 19, detailed description will not be repeated.

At time tb when transition from pattern III to pattern II is made, a time lag in turn-off is set such that switching element S5b of a plurality of switching elements S1 and S5b to simultaneously be turned off is turned off and thereafter switching element S1 is turned off.

In the circuit state in FIG. 20 (b), nodes N1 and N2 are electrically connected to power line PL through switching elements S1 and S4. Therefore, when switching element S5b is turned off while switching element S1 remains on, switching element S5b is turned off while there is no difference in potential across opposing ends. Since turn-off of switching element S5b is zero volt switching (ZVS), no switching loss is produce.

In response to turn-off of switching element S5b, the path for reactor current IL1 is changed to a path through switching element S1. Therefore, when switching element S1 is turned off after switching element S5b is turned off, a power loss due to hard switching of IL1 is produced. Consequently, a switching loss at time tb is produced in switching element S1 instead of switching element S5b in FIG. 19, by delaying turn-off of switching element S1.

At time tc when transition from pattern II to pattern I is made, a time lag in turn-on is set such that switching element S3 of a plurality of switching elements S3 and S5b to simultaneously be turned on is turned on and thereafter switching element S5b is turned on.

When switching element S3 is turned on from the circuit state in which currents in opposite directions flow through current paths 111 and 112 in FIG. 6 while switching element S5b remains off, the path for reactor current IL2 is changed to a path through switching element S3. Therefore, a power loss due to hard switching of IL2 is produced in turn-on of switching element S3.

When switching element S3 is turned on, nodes N1 and N2 are electrically connected to power line GL through switching elements S2 and S3. Therefore, when switching element S5b is turned on, turn-on of switching element S5b is ZVS and hence no switching loss is produced. Consequently, a switching loss at time tc is produced only in switching element S3 instead of switching elements S3 and S5b in FIG. 19 by advancing turn-on of switching element S3.

At time td when transition from pattern I to pattern III is made, a time lag in turn-off is set such that switching element S3 of a plurality of switching elements S2 and S3 to simultaneously be turned off is turned off and thereafter switching element S2 is turned off.

In the circuit state in FIG. 20 (a), opposing ends of switching element S3 are electrically connected to power line GL as switching elements S2, S5a, and S5b are turned on. Therefore, since switching element S3 makes ZVS when switching element S3 is turned off while switching element S2 remains on, no switching loss (turn-off) is produced.

In response to turn-off of switching element S3, the path for differential current ΔI is changed to a path through switching element S2. Therefore, when switching element S2 is turned off, a power loss due to switching of differential current ΔI is produced. Consequently, a switching loss at time td is produced in switching element S2 instead of switching element S3 in FIG. 19, by delaying turn-off of switching element S2.

As described with reference to FIG. 19, a power loss at the time of turn-on of switching elements S1 and S4 at time td is 0. Therefore, no power loss is produced in switching elements S1 and S4 even when a time lag is set in turn-on of both of the switching elements or even when they are simultaneously turned on.

FIG. 22 shows a conceptual diagram for comparing a switching loss between an example in which the switching element according to the first embodiment is not applied (FIG. 19) and an example in which the switching element is applied (FIG. 21).

Referring to FIG. 22 (a), in switching control without a time lag shown in FIG. 19 (that is, without application of switching control according to the first embodiment), a switching loss is produced in switching elements S5 and S3. A switching loss Pl3 in switching element S3 consists of a loss P(tc) at time tc and a loss P(td) at time td. P(tc) represents a loss due to switching of a differential current ΔI(tc) and loss P(td) represents a loss due to switching of a differential current ΔI(td).

A switching loss Pl5 in switching element S5b consists of loss P(tb) at time tb and loss P(tc) at time tc. P(tb) represents a power loss due to hard switching of IL1(tb) and P(tc) represents a power loss due to hard switching of IL1(tc).

Referring to FIG. 22 (b), in switching control with a time lag shown in FIG. 21 (that is, with application of switching control according to the present embodiment), a switching loss is produced in switching elements S1, S2, and S3.

Since a switching loss Pl1 in switching element S1 is a loss due to hard switching of IL1(tb) at time tb, it is equivalent to P(tb) of Pl5 in FIG. 22 (a).

Similarly, since a switching loss Pl2 in switching element S2 is a loss due to switching of differential current ΔI at time td, it is equivalent to P(td) of Pl3 in FIG. 22 (a).

Switching loss Pl3 in switching element S3 is a loss due to hard switching of IL2 at time tc. In FIG. 19, at time tc, a loss due to switching of differential current ΔI(tc) (switching element S3) and a loss due to hard switching of IL1(tc) (switching element S5b) are produced. Here, a condition of ΔI+IL1 =(IL-IL1)+IL1 =IL2 is satisfied. Therefore, it is understood that a total switching loss at time tc corresponds to switching of IL2 and remains unchanged between FIGS. 19 and 21.

Thus, a total value for switching losses at times tb, tc, and td remains unchanged between the example in which switching control according to the first embodiment is not applied (FIG. 19) and the example in which such switching control is applied (FIG. 21). As is clear from comparison between FIGS. 22 (a) and (b), by applying switching control according to the present embodiment, a switching loss can be distributed to more switching elements. Consequently, concentration of a power loss to a specific switching element can be relaxed and unevenness in amount of heat generation among switching elements can be suppressed.

Pl5 in FIG. 22 (a) corresponds to hard switching twice at the relative minimum point of IL1 representing the low current (that is, a maximum point of a regenerative current) and the vicinity thereof, whereas Pl3 in FIG. 22 (b) corresponds to hard switching once at the relative maximum point of IL2 representing the high current (that is, a minimum value of the regenerative current). Therefore, Pl3 in FIG. 22 (b) may become lower than Pl5 in FIG. 22 (a).

A behavior in an example in which IL1 represents the high current (|IL1|>|IL2|) during the regeneration operation of DC power supplies B1 and B2 will now be described.

Figure 23:
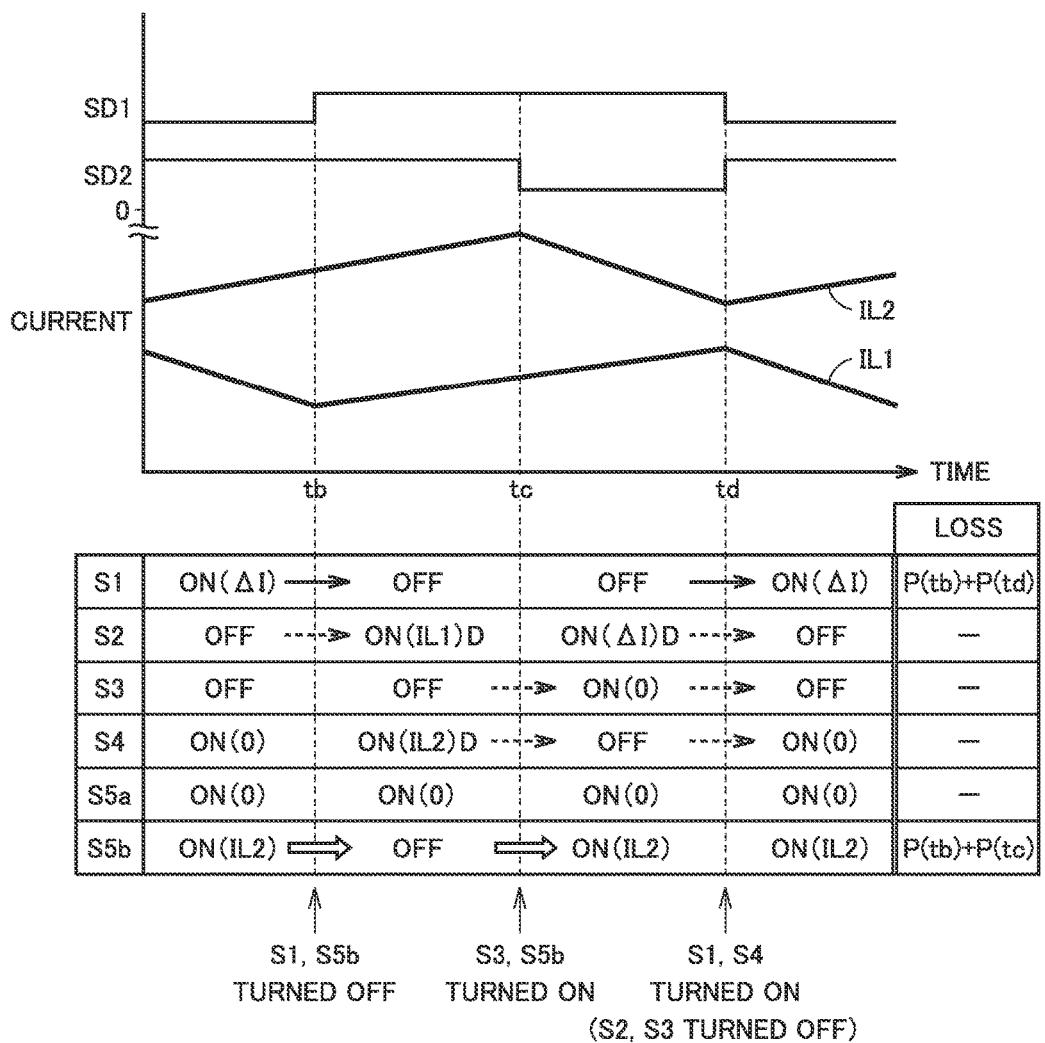
FIG. 23 is a waveform diagram when relation in magnitude between reactor currents is opposite to FIG. 19 (while switching control according to the first embodiment is not applied).

FIG. 23 shows a waveform diagram for illustrating a power loss in each switching element when switching control according to the present embodiment is not applied (only current phase control is applied) as in FIG. 19. FIG. 23 also shows a waveform diagram when both of DC power supplies B1 and B2 perform the regeneration operation (IL1<0 and IL2<0). Unlike FIG. 19, in FIG. 23, IL1 represents the high current (|IL1|>|IL2|).

Referring to FIG. 23, during the period until time tb, on and off of switching elements S1 to S5a and S5b is the same as in FIG. 19. The condition of |IL1|>|IL2|, however, is satisfied, and hence IL1 flows through current path 117d# and IL2 flows through current path 116d# in FIG. 20 (b). Consequently, differential current ΔI flows through switching element S1 in a direction opposite to that in FIG. 19. Not IL1 but IL2 flows through switching element S5b. Therefore, differential current ΔI is expressed as ΔI=IL1−IL2.

During the period from time tb to tc, on and off of switching elements S1 to S5a and S5b is the same as in FIG. 19. The paths for IL1 and IL2 are also the same as in FIG. 19.

At time tb, as in FIG. 19, switching element S2 is turned on and switching elements S1 and S5b are turned off. Since the current flows through diode D2 in switching element S2, no switching loss (turn-on) is produced therein. Of a plurality of switching elements S1 and S5b to simultaneously be turned off, in switching element S1, a power loss due to switching of differential current ΔI is produced, whereas in switching element S5b, a power loss due to hard switching of IL2 is produced.

On and off of switching elements S1 to S5a and S5b during the period from time tc to td is also the same as in FIG. 19. The condition of |IL1|>|IL2|, however, is satisfied, and hence IL1 flows through current path 115d# and IL2 flows through current path 118d# in the circuit state in FIG. 20 (a). Consequently, differential current ΔI (IL1−IL2) flows not through switching element S3 but through diode D2. Not IL1 but IL2 flows through switching element S5b.

At time tc, as in FIG. 19, switching element S4 is turned off and switching elements S3 and S5b are turned on. In switching element S4 which is turned off, diode D4 is turned off owing to arc extinguishing by itself and hence no power loss is produced therein. Of a plurality of switching elements S3 and S5b to simultaneously be turned on, in switching element S3, a current after turn-on is 0, and hence no switching loss is produced therein, whereas in switching element S5b, a power loss due to hard switching of IL2 is produced.

After time td, the circuit state the same as before time tb is set and a current the same as before time tb flows through each element. Therefore, at time td, as in FIG. 19, switching elements S1 and S4 are turned on and switching elements S2 and S3 are turned off.

Therefore, of switching elements S1 and S4 to simultaneously be turned on, in switching element S4, a current after turn-on is 0, and hence no switching loss is produced therein, whereas in switching element S1, a power loss (turn-on) due to switching of differential current ΔI is produced.

Of switching elements S2 and S3 to simultaneously be turned off, in switching element S3, a current before turn-on is 0, and hence no switching loss is produced therein, whereas in switching element S2, diode D2 is turned off owing to arc extinguishing by itself and hence no power loss is produced therein.

Thus, in the circuit state exemplified in FIG. 23 (IL1<0, IL2<0, and |IL1|>|IL2|), a switching loss is produced only in switching elements S1 and S5b.

It is understood based on comparison between FIGS. 19 and 23 that an element where a switching loss is produced is changed with change in magnitude of reactor currents IL1 and IL2 even though transition of the switching pattern is the same.

Figure 24:
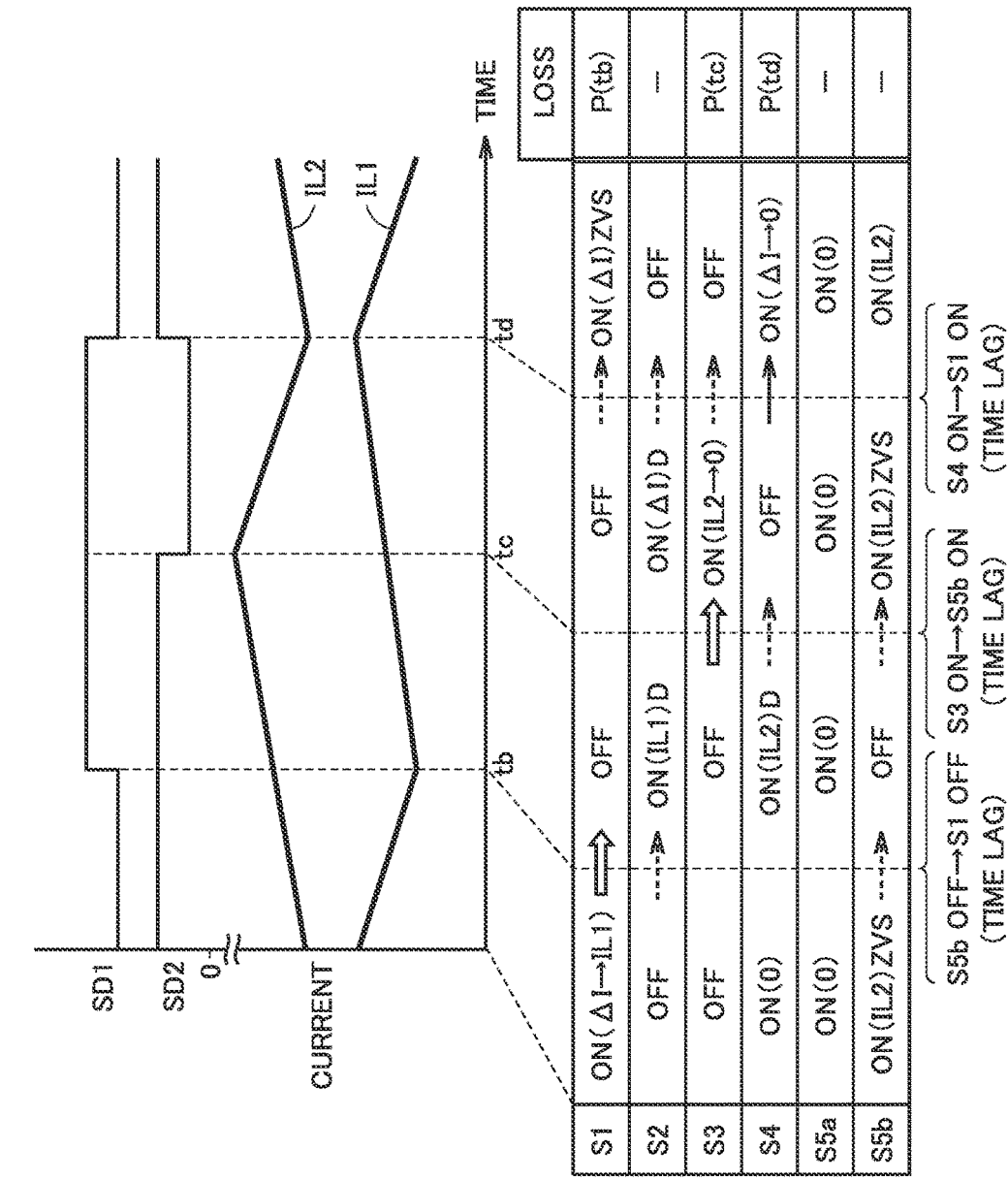
FIG. 24 is a waveform diagram when relation in magnitude between reactor currents is opposite to FIG. 21 (while switching control according to the first embodiment is applied).

FIG. 24 shows a waveform diagram when switching control according to the present embodiment is applied to the circuit state the same as in FIG. 23. The condition of IL1<0, IL2<0, and |IL1|>|IL2| is satisfied again in FIG. 24.

Referring to FIG. 24, as described with reference to FIG. 21, at times tb, tc, and td at which inflection points appear in reactor currents IL1 and IL2, a plurality of switching elements to simultaneously be turned on or off are controlled to be turned on or off in a prescribed order with a time lag being set. Since FIG. 24 is otherwise the same as FIG. 23, detailed description will not be repeated.

At time tb, turn-off with a time lag being set is carried out. Specifically, of a plurality of switching elements S1 and S5b to simultaneously be turned off, switching element S5b is turned off and thereafter switching element S1 is turned off as in FIG. 21.

As described with reference to FIG. 21, turn-off of switching element S5b from the circuit state in FIG. 20 (b) is ZVS, and hence no switching loss is produced. In response to turn-off of switching element S5b, the path for reactor current IL1 is changed to a path through switching element S1. Therefore, after a current through switching element S1 is changed from differential current ΔI to IL1, switching element S1 is turned off. Therefore, a power loss (turn-off) due to hard switching of IL1 is produced in switching element S1.

Consequently, a switching loss at time tb is produced only in switching element S1 instead of switching elements S1 and S5b in FIG. 23, by delaying turn-off of switching element S1.

At time tc, of a plurality of switching elements S3 and S5b to simultaneously be turned on, as in FIG. 21, a time lag is set such that switching element S3 is turned on and thereafter switching element S5b is turned on.

Therefore, as switching element S3 is turned on with switching element S5b remains off as in FIG. 21, a power loss due to hard switching of IL2 is produced at the time of turn-on of switching element S3. When switching element S5b is turned on after switching element S3 is turned on, turn-on of switching element S5b is ZVS and hence no switching loss (turn-on) is produced.

Consequently, a switching loss at time tc is produced in switching element S3 instead of switching element S5b in FIG. 23, by advancing turn-on of switching element S3.

At time td, of a plurality of switching elements S1 and S4 to simultaneously be turned on, a time lag is set such that switching element S4 is turned on and thereafter switching element S1 is turned on.

By delaying turn-on of switching element S1 in transition from the circuit state in FIG. 20 (a) to the circuit state in FIG. 20 (b), a circuit state in which switching element S1 is turned off can be set in FIG. 20 (b). Since differential current ΔI thus passes through switching element S4, a power loss (turn-on) due to switching of differential current ΔI is produced in switching element S4.

After switching element S4 is turned on, opposing ends of switching element S1 are electrically connected to power line PL. When switching element S1 is turned on from this state, turn-on of switching element S1 is ZVS and hence no power loss is produced.

As described with reference to FIG. 23, a power loss is 0 at the time of turn-off of switching elements S2 and S3. Therefore, no power loss is produced in switching elements S2 and S3 even when a time lag is set in turn-off of both of the switching elements or even when both of them are simultaneously turned on.

Consequently, a switching loss at time td is produced in switching element S4 instead of switching element S1 in FIG. 23, by advancing turn-on of switching element S4.

FIG. 25 shows a conceptual diagram for comparing a switching loss between an example in which switching element according to the first embodiment is not applied (FIG. 23) and an example in which such switching element is applied (FIG. 24).

Referring to FIG. 25 (a), in switching control without a time lag shown in FIG. 23 (that is, without application of switching control according to the first embodiment), a switching loss is produced in switching elements S1 and S5.

Switching loss Pl1 in switching element S1 consists of loss P(tb) at time tb and loss P(td) at time td. P(tb) represents a loss due to switching of differential current ΔI(tb) and loss P(td) represents a loss due to switching of differential current ΔI(td).

Switching loss Pl5 in switching element S5b consists of loss P(tb) at time tb and loss P(tc) at time tc. P(tb) represents a power loss due to hard switching of IL2(tb) and P(tc) represents a power loss due to hard switching of IL2(tc).

Referring to FIG. 25 (b), in switching control with a time lag shown in FIG. 24 (that is, with application of switching control according to the first embodiment), a switching loss is produced in switching elements S1, S3, and S4.

Since switching loss Pl3 in switching element S3 is a loss due to hard switching of IL2(tc) at time tc, it is equivalent to P(tc) of Pl5 in FIG. 25 (a).

Similarly, since a switching loss Pl4 in switching element S4 is a loss due to switching of differential current ΔI at time td, it is equivalent to P(td) of Pl1 in FIG. 25 (a).

Switching loss Pl1 in switching element S1 is a loss due to hard switching of high current IL1 at time tb. In FIG. 23 (in which switching control according to the first embodiment is not applied), at time tb, a loss (switching element S1) due to switching of differential current ΔI(tb) and a loss (switching element S5b) due to hard switching of IL2(tb) are produced. A condition of ΔI+IL2=(IL1−IL2)+IL2=IL1 is satisfied. Therefore, it is understood that a total switching loss at time tb corresponds to switching of IL1 and remains unchanged between FIGS. 23 and 24.

Thus, even when IL1 is defined as the high current (|IL1|>|IL2|), a switching loss can be distributed among more switching elements without change in total value for switching losses at times tb, tc, and td, by applying switching control according to the first embodiment. Consequently, concentration of a power loss to a specific switching element can be suppressed and unevenness in amount of heat generation among switching elements can be suppressed.

[Modification of First Embodiment]

A switching loss in an example in which both of DC power supplies B1 and B2 perform the regeneration operation is described in the first embodiment. An effect of application of switching control according to the first embodiment when both of DC power supplies B1 and B2 perform the power running operation is described for the confirmation purpose in a modification of the first embodiment.

Figure 26:
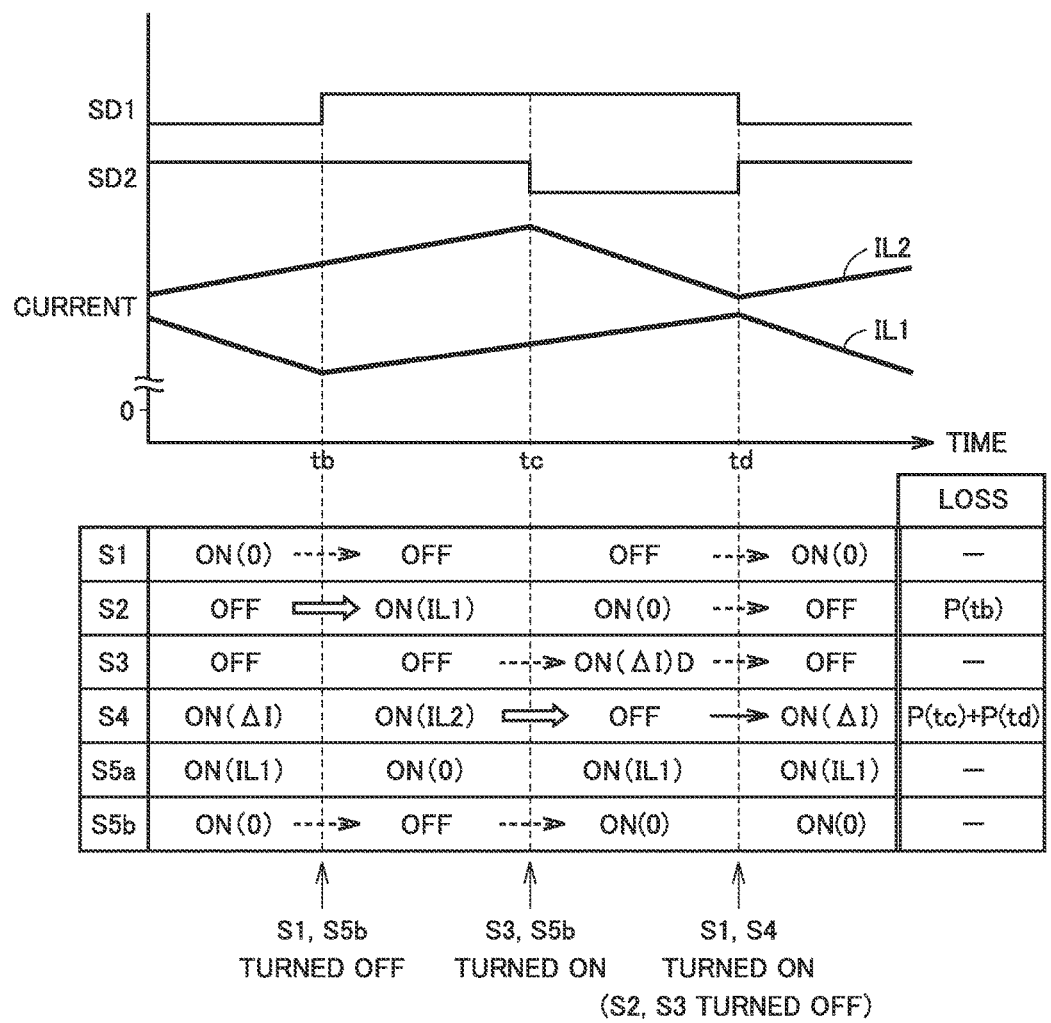
FIG. 26 is a waveform diagram (in power running) for illustrating a power loss in each switching element when current phase control as in FIG. 19 is applied.

FIG. 26 is a waveform diagram for illustrating a power loss in each switching element when current phase control without a time lag is applied, which is shown as a comparative example similarly to FIG. 19. FIG. 26 shows a waveform diagram when both of DC power supplies B1 and B2 perform the power running operation (IL1>0 and IL2>0). FIG. 26 also shows a waveform of a current when the condition of |IL2|>|IL1| is satisfied. The condition of differential current ΔI=IL2−IL1 is satisfied.

Referring to FIG. 26, since the condition of SD1=L and SD2=H is satisfied during the period until time tb, switching elements S1, S4, S5a, and S5b are turned on in accordance with pattern III shown in FIG. 15.

Therefore, before time tb, a current in a reverse direction flows through each element in accordance with the switching pattern the same as in FIG. 19. Since the condition of |IL2|>|IL1| satisfied in FIG. 17 (b), IL1 flows through current path 117 and IL2 flows through current path 116. Consequently, a current through switching element S1 is 0, whereas differential current ΔI (IL2−IL1) flows through switching element S4 not diode D4. Current IL1 flows through switching element S5a whereas a current through switching element S5b is 0.

Similarly, during the period from time tb to tc (the B1L arm and the B2L arm being on), while switching elements S2, S4, and S5a are turned on in accordance with pattern II shown in FIG. 15, a current flows through each element in a direction reverse to that in FIG. 19. Therefore, IL1 flows through switching element S2 and IL2 flows through switching element S4. A current through switching element S5a is 0.

At time tb, as in FIG. 19, switching element S2 is turned on and switching elements S1 and S5b are to simultaneously be turned off. A power loss (turn-off) due to hard switching of IL1 is produced in switching element S2. Since a current before turn-off is 0 in turn-off of switching elements S1 and S5b, no switching loss is produced.

During the period from time tc to td (the B1L arm and the B2U arm being on), switching elements S2, S3, S5a, and S5b are turned on in accordance with pattern I shown in FIG. 15. Therefore, during the period from time tc to td, a current flows through each element in a reverse direction in accordance with a switching pattern the same as in FIG. 19. Reactor current IL1 flows through switching element S5a, whereas a current through switching element S5b is 0 and differential current ΔI (|IL2−IL1|) flows through diode D3. A current through switching element S2 is 0 as in the regeneration operation.

At time tc, as in FIG. 19, switching elements S3 and S5b are to simultaneously be turned on and switching element S4 is turned off. A power loss (turn-off) due to hard switching of IL2 is produced in switching element S4. Since differential current ΔI flows through diode D3, no switching loss (turn-on) is produced in switching element S3. In switching element S5b, a current after turn-on is 0, and hence no switching loss is produced therein.

After time td, a current the same as before time tb flows through each element. At time td, as in FIG. 19, switching elements S1 and S4 are turned on and switching elements S2 and S3 are to simultaneously be turned off.

At time td, a power loss (turn-on) due to switching of differential current ΔI is produced in switching element S4. In switching element S1, on the other hand, a current after turn-on is 0 and hence no switching loss is produced therein. A current path for differential current ΔI is changed from a path through diode D4 to a path through switching element S4. Therefore, a turn-off loss in switching element S3 is not produced whereas a power loss (turn-on) due to switching of differential current ΔI is produced in switching element S4.

Consequently, in the circuit operation (IL1>0, IL2>0, and |IL2|>|IL1|) exemplified in FIG. 26, a switching loss is produced only in switching elements S2 and S4.

It is understood based on comparison between FIGS. 19 and 26 that an element in which a switching loss is produced changes between the power running operation (IL1>0 and IL2>0) and the regeneration operation (IL1<0 and IL2<0) even though transition of a switching pattern is the same.

Figure 27:
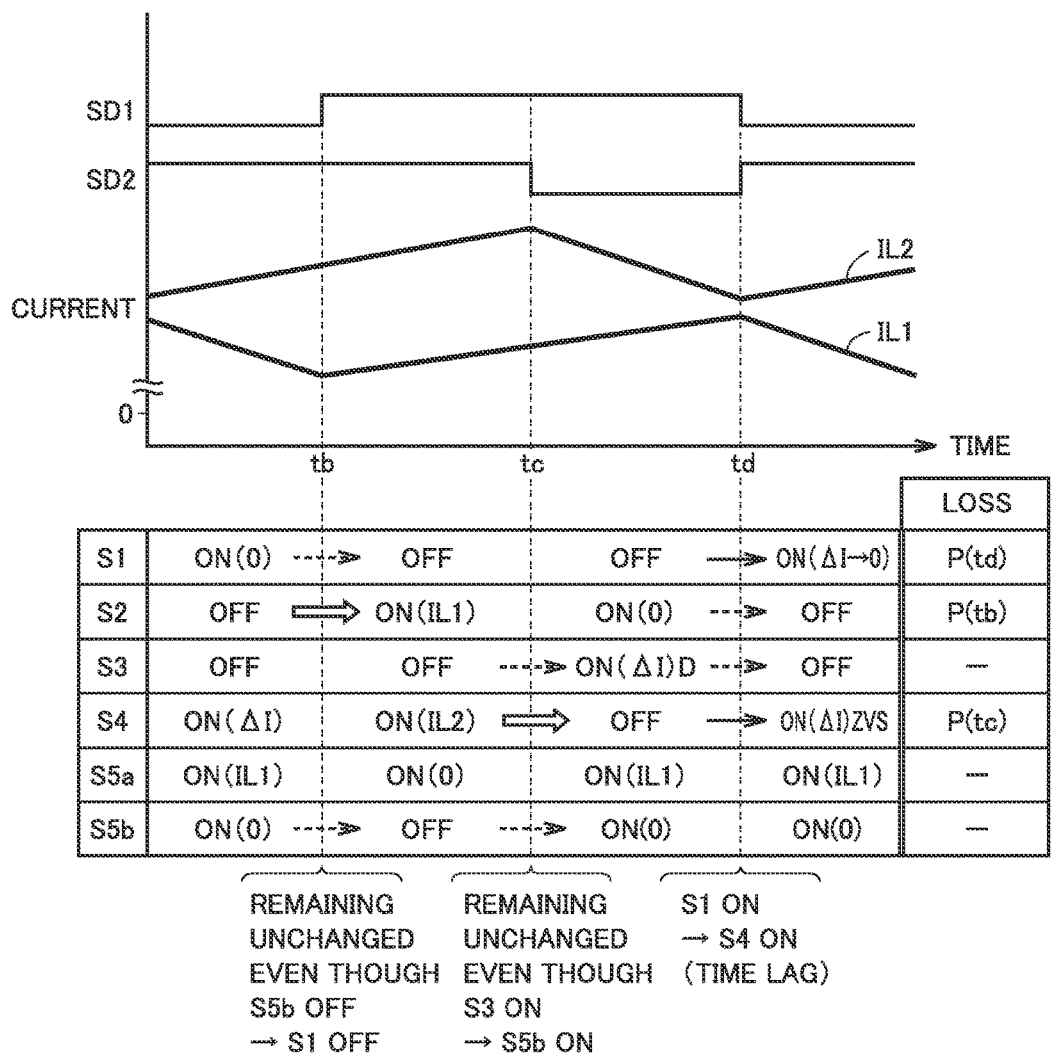
FIG. 27 is a waveform diagram (in power running) for illustrating a power loss in each switching element when switching control as in FIG. 21 is applied.

FIG. 27 shows a waveform diagram when switching control according to the present embodiment is applied to a circuit state the same as in FIG. 26. The condition of IL1>0, IL2>0, and |IL2|>|IL1| satisfied again in FIG. 27.

Referring to FIG. 27, at time tb, from the circuit state in FIG. 17 (b), switching elements S1 and S5b are to simultaneously be turned off. During the power running operation, however, in a state until time tb, no current flows through switching element S1 in the upper arm (the B1U arm) and no switching loss is produced in switching element S1.

Therefore, even though turn-off of switching element S1 is delayed, no switching loss is produced. Therefore, even though a time lag is set in turn-off of switching elements S1 and S5b, a manner of production of a switching loss is not changed.

Similarly, also at time tc, in switching elements S3 and S5b to simultaneously be turned on, in the upper arm (the B2U arm), a current path is formed not by switching element S3 but by diode D3. Therefore, even when turn-on of switching element S3 is advanced, no switching loss is produced. Therefore, even though a time lag is set in turn-on of switching elements S3 and S5b, a manner of production of a switching loss is not changed.

At time td, in a plurality of switching elements S1 and S4 to simultaneously be turned on, in contrast to FIG. 21 (in the regeneration operation), a time lag is set such that switching element S1 is turned on and thereafter switching element S4 is turned on.

In the circuit state during the period from time tc to td (the B1L arm being on and the B2U arm being on), that is, the circuit state in FIG. 17 (a), when switching element S1 is turned on while switching element S4 remains off, differential current $\Delta I$ flows through switching element S1. Thus, a power loss (turn-on) due to switching of differential current $\Delta I$ is produced in switching element S1.

When switching element S1 is turned on first, opposing ends of switching element S4 are electrically connected to power line PL as a result of turn-on of switching elements S1, S5a, and S5b. When switching element S4 is turned on from this state, such turn-on is ZVS and hence no power loss is produced. After switching element S4 is turned on, differential current $\Delta I$ flows through switching element S4 similarly to the state until time tb, whereas a current through switching element S1 is changed to 0.

Consequently, a switching loss at time td is produced in switching element S1 instead of switching element S4 in FIG. 26, by advancing turn-on of switching element S1.

At time td, as in FIG. 26, no switching loss is produced in switching elements S2 and S3 to be turned off. Therefore, no power loss is produced in switching elements S2 and S3 even when a time lag is set in turn-off of both of them or even when both of them are simultaneously turned off.

FIG. 28 shows a conceptual diagram for comparing a switching loss between switching element according to the present embodiment is not applied (FIG. 26) and such switching element is applied (FIG. 27).

Referring to FIG. 28 (a), in switching control without a time lag shown in FIG. 26 (that is, without application of switching control according to the first embodiment), a switching loss is produced in switching elements S2 and S4. Switching loss Pl2 in switching element S2 consists of loss P(tb) at time tb. P(tb) represents a loss due to hard switching of IL1.

Switching loss Pl4 in switching element S4 consists of loss P(tc) at time tc and loss P(td) at time td. P(tc) represents a power loss due to hard switching of IL2(tc) and P(td) represents a power loss due to switching of differential current $\Delta I$(td).

Referring to FIG. 28 (b), in switching control with a time lag shown in FIG. 27 (that is, with application of switching control according to the first embodiment), a switching loss is produced in switching elements S1, S2, and S4.

Since switching loss Pl1 in switching element S1 is a loss due to switching of differential current $\Delta I$(td) at time td, it is similar to P(td) of Pl4 in FIG. 28 (a).

Similarly, since switching loss Pl2 in switching element S2 is a loss due to hard switching of IL1(tb) at time tb, it is equivalent to Pl2 in FIG. 28 (a).

Since switching loss Pl4 in switching element S4 is a loss due to hard switching of high current IL2 at time tc, it is equivalent to P(tc) of Pl4 in FIG. 28 (a).

Therefore, when each of DC power supplies B1 and B2 performs the power running operation as well (IL1>0 and IL2>0), by applying switching control according to the first embodiment, a switching loss can be distributed among more switching elements without change in total value for switching losses at times tb, tc, and td. Consequently, concentration of a power loss to a specific switching element can be suppressed and unevenness in amount of heat generation among switching elements can be suppressed. As is understood from comparison of Pl4 between FIGS. 28 (a) and (b), a maximum loss among switching elements can also be reduced.

A behavior during the power running operation of DC power supplies B1 and B2 when IL1 is defined as the high current (|IL1|>|IL2|) will now be described.

Figure 29:
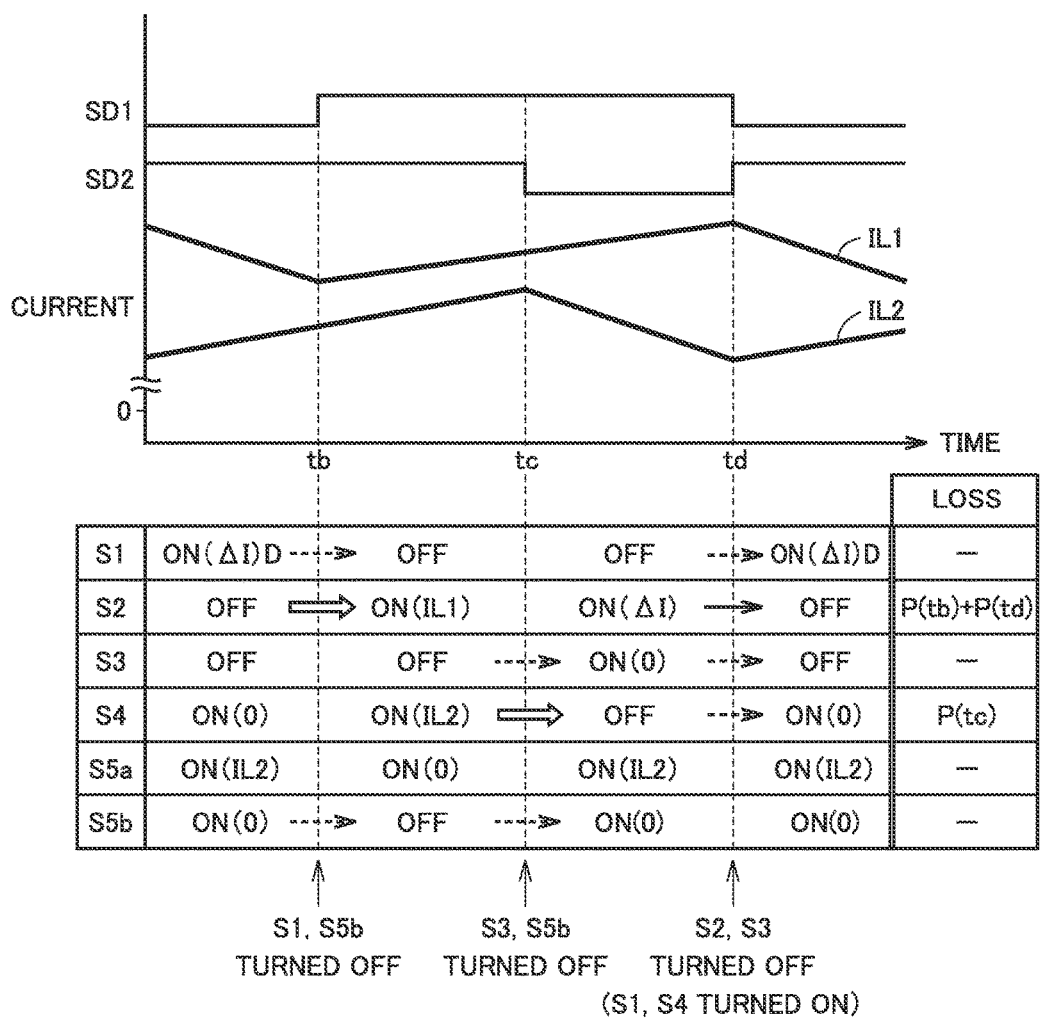
FIG. 29 is a waveform diagram when relation in magnitude between reactor currents is opposite to FIG. 26 (while switching control according to the first embodiment is not applied).

FIG. 29 shows a waveform diagram for illustrating a power loss in each switching element when switching control according to the first embodiment is not applied (only current phase control is applied) as in FIG. 26. FIG. 29 also shows a waveform diagram when both of DC power supplies B1 and B2 perform the power running operation (IL1>0 and IL2>0). Unlike FIG. 26, IL1 is defined as the high current (|IL1|>|IL2|) in FIG. 29. Differential current $\Delta I$ is expressed as $\Delta I = IL1 - IL2$.

Referring to FIG. 29, during the period until time tb, on and off of switching elements S1 to S5a and S5b is the same as in FIG. 26. The condition of |IL1|>|IL2|, however, is satisfied, and hence a direction of differential current $\Delta I$ is opposite to the direction in FIG. 26. Therefore, differential current $\Delta I$ flows through diode D1 not switching element S4. Not IL1 but IL2 flows through switching element S5a.

During the period from time tb to tc, on and off of switching elements S1 to S5a and S5b is the same as in FIG. 26. The paths for IL1 and IL2 are also the same as in FIG. 26.

At time tb, as in FIG. 26, switching element S2 is turned on and switching elements S1 and S5b are to simultaneously be turned off. A power loss due to hard switching of IL1 is produced in switching element S2. Since a current before turn-off is 0 in switching element S5b, no switching loss (turn-off) is produced therein. Similarly, in switching element S1 as well, diode D1 is turned off owing to arc extinguishing by itself, and hence no power loss (turn-off) is produced therein.

During the period from time tc to td as well, on and off of switching elements S1 to S5a and S5b is the same as in FIG. 26. The condition of |IL1|>|IL2|, however, is satisfied, and hence a direction of differential current $\Delta I$ is opposite to the direction in FIG. 26. Therefore, differential current $\Delta I$ flows through switching element S2 not through diode D3. Not IL1 but IL2 flows through switching element S5b.

At time tc, as in FIG. 26, switching element S4 is turned off and switching elements S3 and S5b are to simultaneously be turned on. A power loss due to hard switching of IL2 is produced in switching element S4 which is turned off. Of a plurality of switching elements S3 and S5b to simultaneously be turned on, since a current after turn-on is 0 in each of switching elements S3 and S5b, a switching loss is not produced therein.

After time td, the circuit state the same as before time tb is set and a current the same as before time tb flows through each element. Therefore, at time td, as in FIG. 26, switching elements S1 and S4 are turned on and switching elements S2 and S3 are to be turned off.

Therefore, of switching elements S1 and S4 to simultaneously be turned on, a current after turn-on is 0 in switching element S4 and hence no switching loss is produced therein. Since differential current ΔI flows through diode D1, a power loss (turn-on) is not produced in switching element S1.

Of switching elements S2 and S3 to simultaneously be turned off, a power loss (turn-off) due to switching of differential current ΔI is produced in switching element S2. Since a current before turn-on is 0 in switching element S3, no switching loss is produced therein.

Thus, in the circuit state exemplified in FIG. 29 (IL1>0, IL2>0, and |IL1|>|IL2|), a switching loss is produced only in switching elements S2 and S4 as in FIG. 26.

Figure 30:
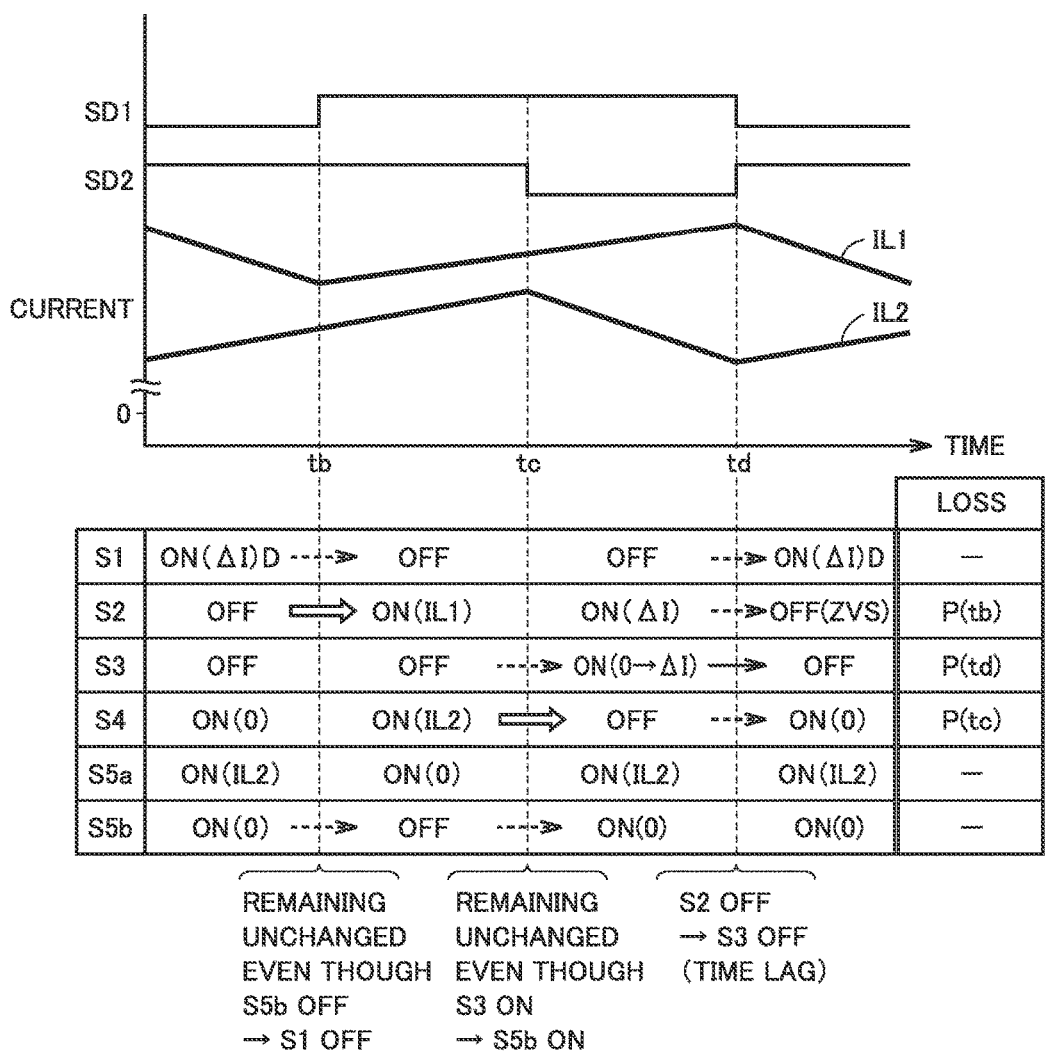
FIG. 30 is a waveform diagram when relation in magnitude between reactor currents is opposite to FIG. 27 (while switching control according to the first embodiment is applied).

FIG. 30 shows a waveform diagram when switching control according to the first embodiment is applied to a circuit state the same as in FIG. 29. The condition of IL1>0, IL2>0, and |IL1|>|IL2| is satisfied again in FIG. 30.

Referring to FIG. 30, as described with reference to FIG. 27, at times tb, tc, and td at which inflection points appear in reactor currents IL1 and IL2, a plurality of switching elements to simultaneously be turned on or off are controlled to be turned on or off in a prescribed order with a time lag being set. Since FIG. 30 is otherwise the same as FIG. 29, detailed description will not be repeated.

Referring to FIG. 30, at time tb, switching elements S1 and S5b are to simultaneously be turned off. Since a current flows through diode D1 in the upper arm (the B1U arm) during the power running operation as in FIG. 27, a manner of production of a switching loss remains unchanged even though a time lag is set in turn-off of switching elements S1 and S5b.

Similarly, at time tc as well, a current flows through diode D3 in the upper arm (the B2U arm) during the power running operation as in FIG. 27. Therefore, even though a time lag is set in turn-on of switching elements S3 and S5b, a manner of production of a switching loss remains unchanged.

At time td, for a plurality of switching elements S2 and S3 to simultaneously be turned off, in contrast to FIG. 21 (in the regeneration operation), a time lag is set such that switching element S2 is turned off and thereafter switching element S3 is turned off.

In the circuit state during the period from time tc to td (the B1L arm being on and the B2U arm being on), that is, the circuit state in FIG. 17 (a), no power loss is produced when switching element S2 is turned off while switching element S3 remains on. This is because switching element S2 is turned off with opposing ends thereof being electrically connected to power line GL and hence ZVS is made.

When switching element S2 is turned off, differential current ΔI flows through switching element S3. Since switching element S3 is turned off from this state with delay, a power loss (turn-on) due to switching of differential current ΔI is produced in switching element S3.

When switching elements S2 and S3 are turned off, the path for differential current ΔI is changed to a path through diode D1. Therefore, a switching loss (turn-on) is not produced in switching element S1. Similarly, since a current after turn-on is 0 also in switching element S4 under the condition of IL1>IL2, no power loss (turn-on) is produced in switching element S4.

Consequently, a switching loss at time td is produced in switching element S3 instead of switching element S2 in FIG. 29 by delaying turn-off of switching element S3. When switching elements S1 and S4 are turned on at time td, a power loss is 0 as described with reference to FIG. 29. Therefore, no power loss is produced in switching elements S1 and S4 even when a time lag is set in turn-on of both of them or even when both of them are simultaneously turned on.

FIG. 31 shows a conceptual diagram for comparing a switching loss between an example in which switching element according to the first embodiment is not applied (FIG. 29) and an example in which such switching element is applied (FIG. 30).

Referring to FIG. 31 (a), in switching control without a time lag shown in FIG. 29 (that is, without application of switching control according to the first embodiment), a switching loss is produced in switching elements S2 and S4. Switching loss Pl2 in switching element S2 consists of the sum of loss P(tb) at time tb and loss P(td) at time td. P(tb) represents a loss due to hard switching of IL1 and P(td) represents a loss due to switching of differential current ΔI(td).

Switching loss Pl4 in switching element S4 consists of loss P(tc) at time tc. P(tc) represents a loss due to hard switching of IL2(tc).

Referring to FIG. 31 (b), in switching control with a time lag shown in FIG. 30 (that is, with application of switching control according to the present embodiment), a switching loss is produced in switching elements S2, S3, and S4.

Since switching loss Pl2 in switching element S2 is a loss due to switching of IL1(tb) at time tb, it is equivalent to P(tb) of Pl2 in FIG. 31 (a).

Similarly, since switching loss Pl3 in switching element S3 is a loss due to switching of differential current ΔI at time td, it is equivalent to P(td) of Pl2 in FIG. 31 (a).

Since switching loss Pl4 in switching element S4 is a loss due to hard switching of low current IL2 at time tc, it is equivalent to Pl4 in FIG. 28 (a).

Therefore, even though IL1 is defined as the high current (|IL1|>|IL2|) in the power running operation of each of DC power supplies B1 and B2 (IL1>0 and IL2>0), a switching loss can be distributed among more switching elements without change in total value for switching losses at times tb, tc, and td, by application of switching control according to the first embodiment. Consequently, concentration of a power loss to a specific switching element can be suppressed and unevenness in amount of heat generation among switching elements can be suppressed. As is understood based on comparison of Pl2 between FIGS. 31 (a) and (b), a maximum loss among switching elements can also be reduced.

As described with reference to FIGS. 27 and 30, during the power running operation (IL1>0 and IL2>0), a switching loss remains the same at time tb and tc, regardless of a time lag. Therefore, a plurality of switching elements may be turned on or off at this timing without setting a time lag. Alternatively, in order to make control common among times tb and tc and time td, a time lag may be set.

FIG. 32 shows a chart for comparison of a switching loss in a pattern of combination of the power running operation and the regeneration operation and relation in magnitude between IL1 and IL2 described in the first embodiment and the modification thereof. In FIG. 32, "loss" represents a switching element where a switching loss is produced and a sign "—" represents a switching element where no switching loss is produced.

Referring to FIG. 32, in the regeneration operation (the first embodiment), a switching loss in an example in which IL2 is defined as the high current is produced in switching elements S3 and S5 when there is no time lag (FIG. 19) in which switching control according to the present embodiment is not applied as shown in FIG. 22. In contrast, in an example of setting a time lag (FIG. 21) in which switching control according to the present embodiment is applied, a switching loss can be distributed among switching elements S1, S2, and S3 without change in total value in switching elements as a whole.

Similarly, in the regeneration operation (the first embodiment), a switching loss in an example in which IL1 is defined as the high current is produced in switching elements S1 and S5 when there is no time lag (FIG. 23) as shown in FIG. 25. In contrast, in an example of setting a time lag (FIG. 24), a switching loss can be distributed among switching elements S1, S3, and S4 without change in total value in switching elements as a whole.

In the power running operation (the modification of the first embodiment), on the other hand, a switching loss in an example in which IL2 is defined as the high current is produced in switching elements S2 and S4 when there is no time lag (FIG. 26) as shown in FIG. 28. In contrast, in an example of setting a time lag (FIG. 27), a switching loss can be distributed among switching elements S1, S2, and S4 without change in total value in switching elements as a whole.

Similarly, in the power running operation (the modification of the first embodiment), a switching loss in an example in which IL1 is defined as the high current is produced in switching elements S2 and S4 when there is no time lag (FIG. 29) as shown in FIG. 31. In contrast, in an example of setting a time lag (FIG. 30), a switching loss can be distributed among switching elements S2, S3, and S4 without change in total value in switching elements as a whole.

As is understood from FIG. 32, a switching element where a switching loss is produced is different depending on combination of an operation state (power running/regeneration) and relation in magnitude between reactor currents IL1 and IL2. By applying switching control according to the present embodiment to a plurality of switching elements to simultaneously be turned on or off in any of four cases based on the combination, however, a switching loss can be distributed among more switching elements. Consequently, concentration of a power loss to a specific switching element can be suppressed and unevenness in amount of heat generation among switching elements can be suppressed.

FIG. 33 is a waveform diagram for illustrating PWM control in application of switching control according to the present first embodiment. FIG. 33 shows PWM control in the regeneration operation (IL1<0 and IL2<0).

Referring to FIG. 33, in PWM control for controlling an output from DC power supply B1, duty ratios DT1+α and DT1−α are further set in addition to original duty ratio DT1 resulting from feedback control (FIG. 13), by using a variable parameter value a in order to set an intentional time lag.

Based on voltage comparison between duty ratios DT1+α and DT1−α and carrier wave CW1, a forced pulse signal SDoff1 for setting a time lag can be generated in addition to control pulse signal SD1. The H level period (each pulse) of forced pulse signal SDoff1 is generated in correspondence with an inflection point (a relative maximum point and a relative minimum point) of reactor current IL1. A pulse width of forced pulse signal SDoff1 can be adjusted based on parameter value a.

Similarly, in PWM control for controlling an output from DC power supply B2, duty ratios DT2+α and DT2−α are further set in addition to original duty ratio DT2 resulting from feedback control (FIG. 13), by using variable parameter value a in order to set an intentional time lag.

Based on voltage comparison between duty ratios DT2+α and DT2−α and carrier wave CW2, a forced pulse signal SDoff2 for setting a time lag can be generated in addition to control pulse signal SD2. The H level period (each pulse) of forced pulse signal SDoff2 is generated in correspondence with an inflection point (a relative maximum point and a relative minimum point) of reactor current IL2. A pulse width of forced pulse signal SDoff2 can be adjusted based on parameter value a.

Optimal phase difference φ* described with reference to FIG. 18 is provided between carrier waves CW1 and CW2. Thus, at time td, transition of control pulse signal SD1 from the H level to the L level is identical in timing to transition of control pulse signal SD2 from the L level to the H level. Consequently, at time td, the relative maximum point of reactor current IL1 is identical in timing to the relative minimum point of reactor current IL2.

Switching element S5b is turned off during the H level period of forced pulse signal SDoff1 at time tb (that is, the relative minimum point of IL1), and turned off during the H level period of forced pulse signal SDoff2 at time tc (that is, the relative maximum point of IL2). To which of the relative maximum point and the relative minimum point of the reactor currents (IL1 and IL2) each of the H level periods of forced pulse signals SDoff1 and SDoff2 corresponds can be distinguished based on an inclination (positive/negative) of the carrier wave (CW1 and CW2).

Thus, as described with reference to FIGS. 21 and 24, at time tb, a time lag can be set for switching elements S1 and S5b to simultaneously be turned off such that switching element S5b is turned off and thereafter switching element S1 is turned off.

Similarly, as described with reference to FIGS. 21 and 24, at time tc, a time lag can be set for switching elements S3 and S5b to simultaneously be turned on such that switching element S3 is turned on and thereafter switching element S5b is turned on.

Switching element S1 is turned on during the H level period of forced pulse signal SDoff1 at time td (that is, the relative maximum point of IL1). In contrast, switching element S2 is maintained in the on state during that period. As compared with the timing in accordance with control pulse signal SD1, turn-on of switching element S1 and turn-off of switching element S2 are thus delayed.

Therefore, as described with reference to FIG. 21, at time td, a time lag can be set for switching elements S3 and S2 to simultaneously be turned off such that switching element S3 is turned off and thereafter switching element S2 is turned off. Simultaneously, as described with reference to FIG. 24, a time lag can be set for switching elements S1 and S4 to simultaneously be turned on such that switching elements S4 is turned on and thereafter switching element S1 is turned on.

Thus, as described in the first embodiment, switching control to set an intentional time lag in turn-on or turn-off for a plurality of switching elements to simultaneously be turned on or off can be realized in the regeneration operation (IL1<0 and IL2<0). The time lag can be adjusted based on a pulse width of forced pulse signals SDoff1 and SDoff2, that is, parameter value α.

FIG. 34 is a waveform diagram for illustrating PWM control in application of switching control according to the modification of the present first embodiment. FIG. 34 shows PWM control in the power running operation (IL1>0 and IL2>0).

Referring to FIG. 34, forced pulse signals SDoff1 and SDoff2 are generated as in FIG. 33.

During the power running operation, switching element S4 is turned off during the H level period of forced pulse signal SDoff2 at time td (that is, the relative minimum point of IL2). In correspondence therewith, switching element S3 is maintained in the on state during that period. Turn-on of switching element S4 and turn-off of switching element S3 are thus delayed as compared with the timing in accordance with control pulse signal SD2.

Therefore, at time td, as described with reference to FIG. 27, a time lag can be set for switching elements S1 and S4 to simultaneously be turned on such that switching element S1 is turned on and thereafter switching element S4 is turned on. Simultaneously, as described with reference to FIG. 30, a time lag can be set for switching elements S2 and S3 to simultaneously be turned off such that switching element S2 is turned off and thereafter switching element S3 is turned off.

Thus, as described in the modification of the first embodiment, switching control to set an intentional time lag in turn-on or turn-off for a plurality of switching elements to simultaneously be turned on or off can be realized in the power running operation (IL1>0 and IL2>0). The time lag can also be adjusted based on a pulse width of forced pulse signals SDoff1 and SDoff2, that is, parameter value a.

[Second Embodiment]

Switching control in which a plurality of switching elements to simultaneously be turned on or off in a prescribed order with a time lag being set at an inflection point of reactor currents IL1 and IL2 is described in the first embodiment and the modification thereof. Control in which application and non-application of switching control described in the first embodiment and the modification thereof are combined in a time division manner will be described in a second embodiment.

Figure 35:
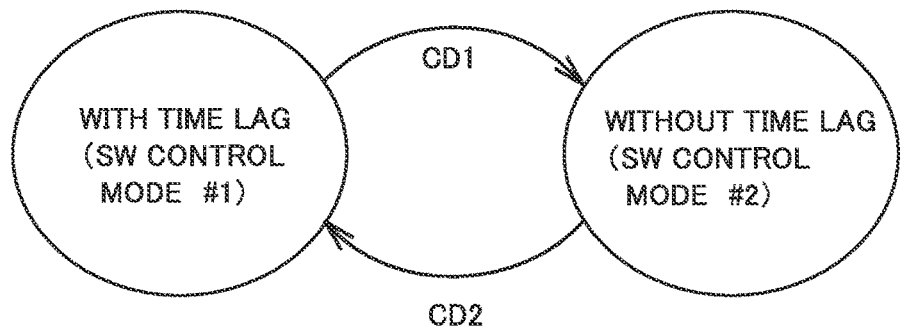
FIG. 35 is a conceptual diagram for illustrating switching control applied to the power supply system according to a second embodiment.

FIG. 35 is a conceptual diagram for illustrating switching control applied to the power supply system according to the second embodiment.

Referring to FIG. 35, in the second embodiment, on and off of switching elements S1 to S5a and S5b implementing power converter 10 is controlled by switching between a switching control mode 1 (an SW control mode #1) and a switching control mode 2 (an SW control mode #2).

SW control mode #1 refers, for example, to switching control (FIGS. 21, 24, 27, and 30) in which a time lag is set in turn-on or turn-off for a plurality of switching elements to simultaneously be turned on or off, described in the first embodiment and the modification thereof. SW control mode #2 refers, for example, to switching control (FIGS. 19, 23, 26, and 29) in which only current phase control is carried out without a time lag being set.

When a transition condition CD1 is satisfied during application of switching control mode 1, the control mode is switched and switching control mode 2 is newly applied. Similarly, when a transition condition CD2 is satisfied during application of switching control mode 2, the control mode is switched and switching control mode 1 is newly applied.

Referring again to FIG. 32, in power converter 10, no power loss is produced in switching element S5 during the regeneration operation of DC power supplies B1 and B2 while switching control with a time lag (switching control according to the first embodiment) is applied. Therefore, temperature increase of switching element S5 can be suppressed by alternately applying switching control without a time lag and switching control with a time lag.

Figure 36:
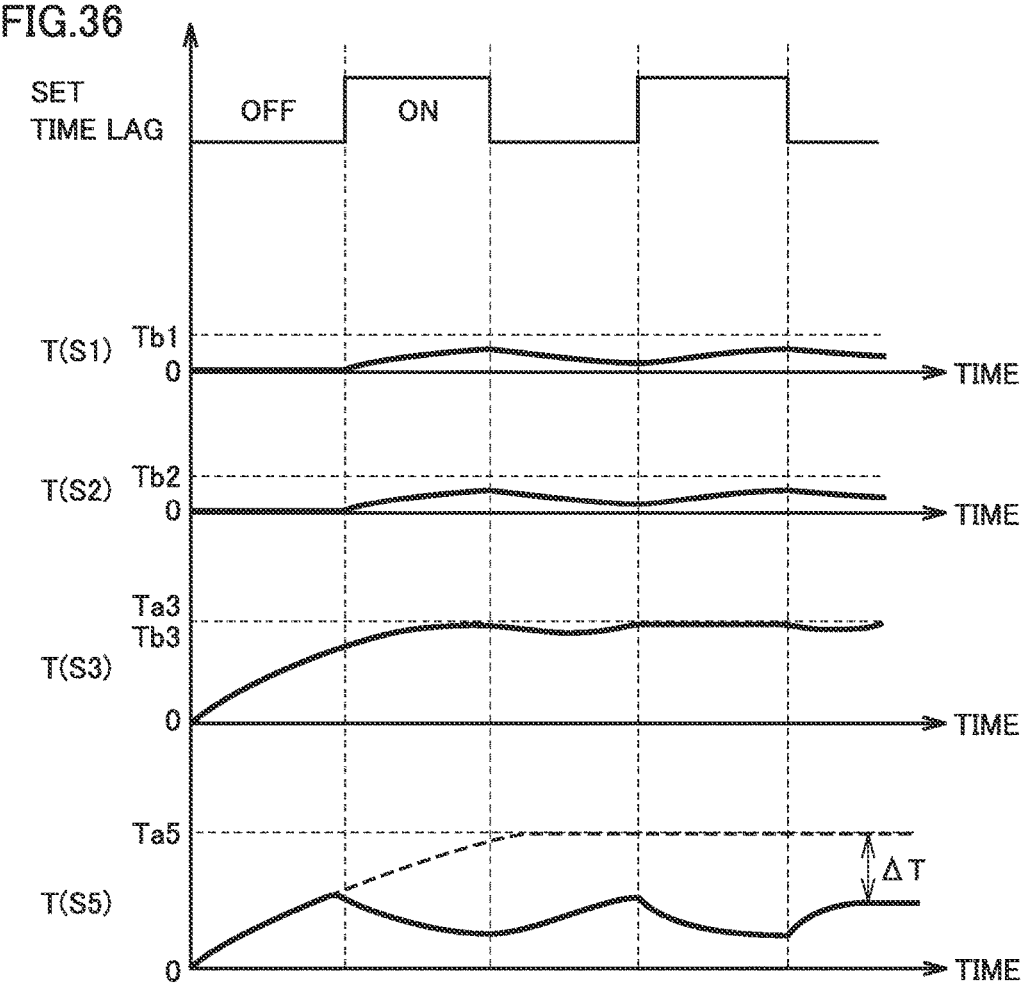
FIG. 36 is a conceptual waveform diagram showing one example of a history of change in temperature of a switching element when switching control according to the second embodiment is applied.

FIG. 36 shows one example of a history of change in temperature of a switching element when switching control according to the second embodiment is applied. FIG. 36 shows a waveform diagram when IL2 is defined as the high current during the power running operation.

Referring to FIG. 36, element temperatures T(S1), T(S2), T(S3), and T(S5) of respective switching elements S1, S2, S3, and S5 increase with heat generation resulting from switching losses in switching elements S1, S2, S3, and S5. Owing to a thermal capacity of a switching element, T(S1), T(S2), T(S3), and T(S5) increase with first-order lag response.

Each switching element is attached to a heat radiation mechanism represented by a heat sink. Therefore, element temperatures T(S1), T(S2), T(S3), and T(S5) do not continue to increase with production of a switching loss, and are stabilized at a rate of temperature increase in accordance with a difference between an amount of heat radiation by the heat radiation mechanism and an amount of heat generation from a switching element. There is a stabilization time period for each element temperature until saturation of temperature increase in response to a certain input of a switching loss.

In FIG. 36, Ta3 and Ta5 correspond to stabilization temperatures when T(S3) and T(S5) increase upon receiving switching losses Pl3 and Pl5 shown in FIG. 22 (a) as a result of application of switching control without a time lag, respectively. Similarly, Tb1 to Tb3 correspond to stabilization temperatures at the time when T(S1) to T(S3) increase upon receiving switching losses Pl1 to Pl3 shown in FIG. 22 (b) as a result of application of switching control with a time lag, respectively. In FIG. 36, it is assumed that Ta3 and T3b are substantially equal to each other.

During a period in which switching control without a time lag is applied, T(S3) and T(S5) increase toward stabilization temperatures Ta3 and Ta5, respectively. Since no switching loss is produced in switching elements S1 and S2, T(S1) and T(S2) are maintained or lowered.

During a period in which switching control with a time lag is applied, T(S1) and T(S2) increase toward stabilization temperatures Tb1 and Tb2, respectively. Element temperature T(S3) is varied toward stabilization temperature Tb3. In contrast, since no switching loss is produced in switching element S5b, T(S5) is lowered.

As shown in FIG. 36, T(S1) and T(S2) make transition in a temperature region lower than stabilization temperatures Ta1 and Ta2 by alternately applying switching control with a time lag and switching control without a time lag with lapse of a prescribed period of time. T(S3) makes transition to vary between stabilization temperatures Ta3 and Tb3. T(S5) makes transition in a temperature region lower than stabilization temperature Ta5.

Therefore, increase in temperature of T(S5) can significantly be suppressed as compared with continuous application of switching control without a time lag (shown with a dotted line in the figure). Consequently, since an amount of heat generation in switching element S5b to which a switching loss is concentrated during the regeneration operation can be suppressed, unevenness in amount of heat generation among switching elements S1 to S5a and S5b can further be suppressed.

According to switching control in the second embodiment, by thus alternately applying a plurality of switching control modes different in element where a switching loss is produced, a highest temperature of the switching element can be suppressed. An element rating of heat resistance is designed to ensure heat resistance against the highest temperature. Therefore, by applying switching control according to the second embodiment, heat resistant protection of each switching element is facilitated and cost can be reduced.

Transition conditions CD1 and CD2 shown in FIG. 35 can be set based on a duration of each switching control mode as described above. For example, when a duration of each switching control mode exceeds a threshold value, transition conditions CD1 and CD2 being satisfied can be determined. In this case, the threshold value for transition conditions CD1 and CD2 is preferably set to be shorter than the stabilization time period such that switching between the switching control modes is made at an interval shorter than the stabilization time period in temperature increase due to a switching loss at T(S1) to T(S5) described above.

Alternatively, transition conditions CD1 and CD2 can also be determined with attention being paid to a temperature of an element. As shown in FIG. 32, a switching element in which a switching loss is great is different for each pattern of combination of the power running operation and the regeneration operation and relation in magnitude between IL1 and IL2. Therefore, transition conditions CD1 and CD2 being satisfied can also be determined when a temperature of a switching element great in switching loss exceeds a prescribed temperature in each pattern.

[Third Embodiment]

A modification of the circuit configuration of power converter 10 described in the first and second embodiments will be described in a third embodiment.

Figures 37, 38:
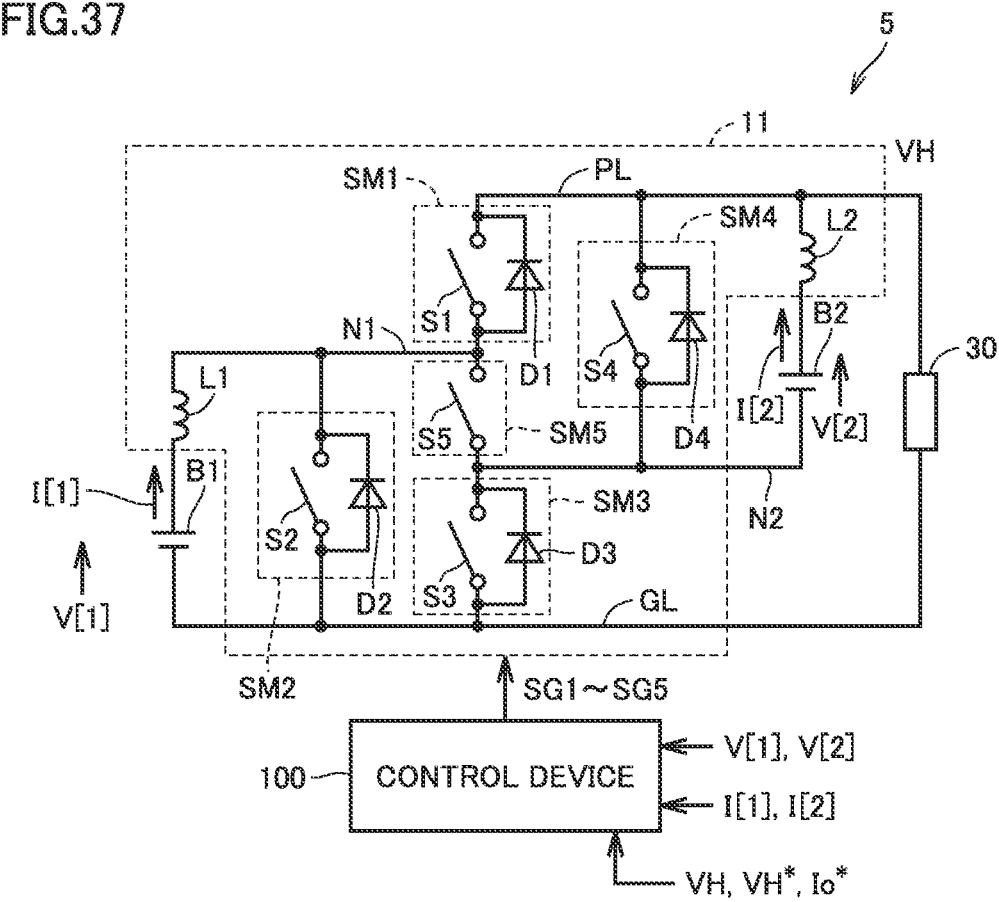
FIG. 37 is a circuit diagram for illustrating a configuration of a power converter according to a third embodiment.
FIG. 38 is a chart showing a list of gate Boolean expressions for controlling on and off of each switching element in the parallel boost mode of the power converter according to the third embodiment.

FIG. 37 is a circuit diagram for illustrating a configuration of a power converter 11 according to the third embodiment.

Referring to FIG. 37, power converter 11 is different from power converter 10 shown in FIG. 1 in that common switching element S5 is connected as a semiconductor element connected between nodes N1 and N2, instead of a bidirectional switch in FIG. 1. Switching element S5 corresponds to "fifth semiconductor element SM5." Since power converter 11 is otherwise the same in configuration as power converter 10, detailed description will not be repeated.

On and off of switching element S5 is controlled in accordance with control signal SG5 from control device 100 (FIG. 1). In power converter 11, the first arm is formed while switching element S5 is turned off and the second arm is formed while switching element S5 is turned on.

Switching element S5 should be turned off in both of the off period of switching element S5a and the off period of switching element S5b in power converter 10 shown in FIG. 1. Switching element S5 can be turned on during a period in which both of switching elements S5a and S5b are turned on.

Therefore, in power converter 11, in the parallel boost mode, on and off of switching elements S1 to S5 is controlled in accordance with Boolean expressions shown in FIG. 38.

FIG. 38 is a chart showing a list of Boolean expressions for controlling on and off of each switching element in the parallel boost mode of power converter 11. Referring to FIG. 38, on and off of switching elements S1 to S4 is controlled in accordance with the gate Boolean expressions the same as in FIG. 12, as in the parallel boost mode of power converter 10. Switching element S2 is turned on and off in response to control pulse signal SD1 whereas switching element S1 is turned on and off in response to control pulse signal /SD1. Similarly, switching element S4 is turned on and off in response to control pulse signal SD2 whereas switching element S3 is turned on and off in response to control pulse signal /SD2.

Switching element S5 is turned on and off in accordance with an exclusive logical sum (XOR) of control pulse signals SD1 and SD2.

Consequently, switching element S5 is turned off when the B1L arm and the B2L arm are turned on (FIG. 6) or when the B1U arm and the B2U arm are turned on (FIG. 7). Switching element S5 is turned on when the B1L arm and the B2U arm are turned on (FIG. 17 (a)) or when the B1U arm and the B2L arm are turned on (FIG. 17 (b)). Therefore, with power converter 11 as well, DC/DC conversion based on selective use of the first arm and the second arm as in power converter 10 can be carried out by switching among four switching patterns shown in FIG. 15.

Figure 39:
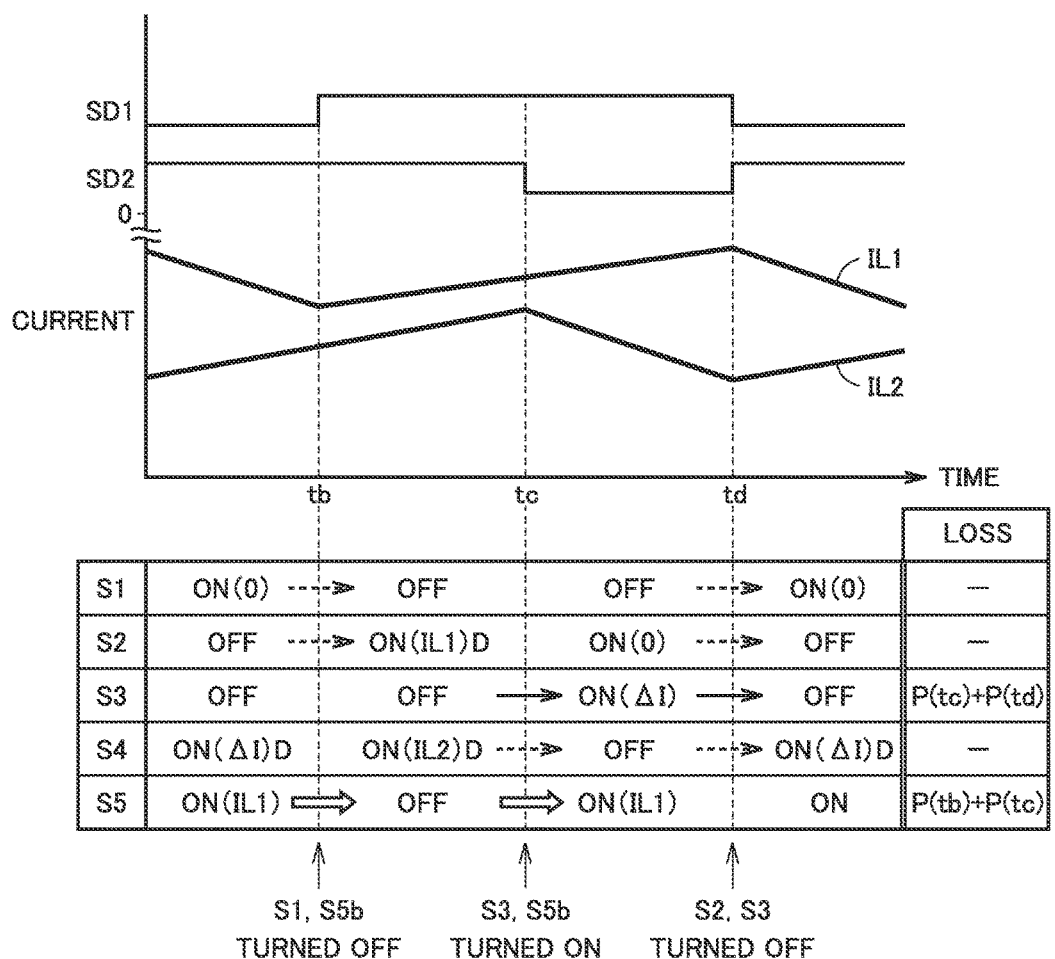
FIG. 39 is a waveform diagram (in regeneration) for illustrating a power loss in each switching element when current phase control as in FIG. 19 is applied to the power converter according to the third embodiment.

FIG. 39 shows a waveform diagram when current phase control as in FIG. 19 is applied to power converter 11. FIG. 39 also shows a current waveform when both of DC power supplies B1 and B2 perform the regeneration operation (IL1<0 and IL2<0) as in FIG. 19. Since the condition of |IL2|>|IL1| is satisfied, IL2 is defined as the high current and IL1 is defined as the low current. Differential current ΔI is represented as ΔI=IL2−IL1.

Referring to FIG. 39, waveforms of control pulse signals SD1 and SD2 and waveforms of reactor currents IL1 and IL2 are the same as in FIG. 19. Behaviors of currents through switching elements S1 to S4 and switching losses therein are also the same as in FIG. 19.

Switching element S5 is also turned off at time tb and turned on at time tc similarly to switching element S5b in FIG. 19. A switching loss equivalent to that in switching element S5b in power converter 10 is produced in switching element S5.

Figure 40:
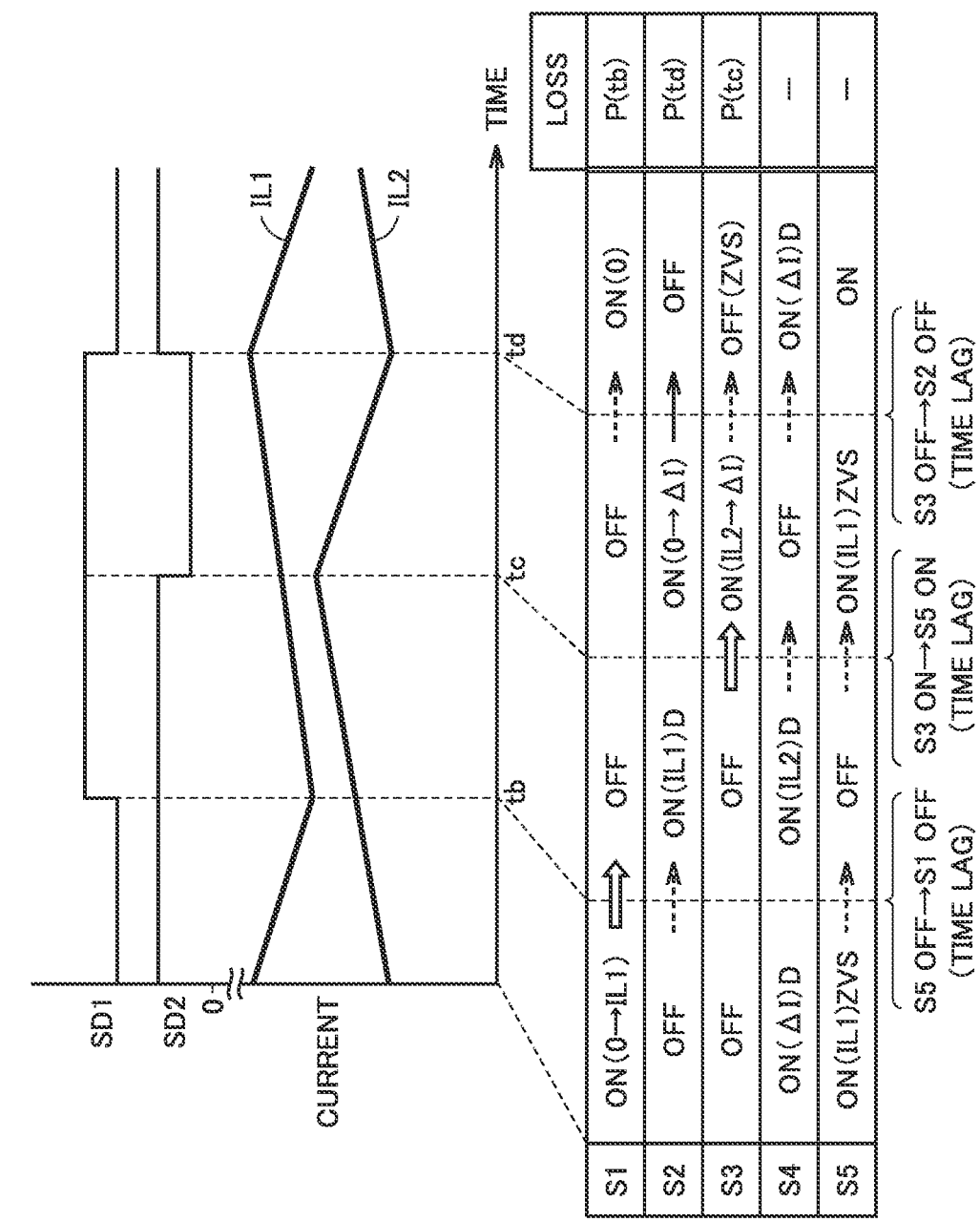
FIG. 40 is a waveform diagram (in regeneration) for illustrating a power loss in each switching element when switching control as in FIG. 21 is applied to the power converter according to the third embodiment.

FIG. 40 shows a waveform diagram when switching control to set a time lag in turn-on or turn-off as in FIG. 21 is applied to power converter 11. FIG. 40 shows a waveform diagram when switching control according to the first embodiment is applied to a circuit state the same as in FIG. 39. The condition of IL1<0, IL2<0, and |IL2|>|IL1| satisfied again in FIG. 40.

Referring to FIG. 40, at time tb, as in FIG. 21, a time lag is set in turn-off of switching elements S1 and S5 to simultaneously be turned off such that switching element S5 is turned off and thereafter switching element S1 is turned off.

By turning off switching element S5 while switching element S1 remains on, turn-off of switching element S5 is ZVS similarly to switching element S5b in FIG. 21.

As in FIG. 21, the path for reactor current IL1 is changed to a path through switching element S1 in response to turn-off of switching element S5. Therefore, when switching element S1 is turned off after switching element S5 is turned off, a power loss due to hard switching of IL1 is produced. Therefore, a switching loss at time tb is produced in switching element S1 as in FIG. 21, instead of switching element S5 in FIG. 39.

At time tc, as in FIG. 21, a time lag is set in turn-on of a plurality of switching elements S3 and S5 to simultaneously be turned on such that switching element S3 is turned on and thereafter switching element S5 is turned on.

When switching element S3 is turned on while switching element S5 remains off, the path for reactor current IL2 is changed to a path through switching element S3. Therefore, a power loss due to hard switching of IL2 is produced as in FIG. 21 in turn-on of switching element S3.

When switching element S5 is turned on after switching element S3 is turned on, turn-on of switching element S5 is ZVS and hence no switching loss is produced. Consequently, a switching loss at time tc is produced only in switching element S3 as in FIG. 21, instead of switching elements S3 and S5 in FIG. 39.

At time td, switching elements S5 is neither turned on nor off, and hence production of a switching loss is the same as in FIG. 21.

Therefore, in an example in which the regeneration operation (IL1<0 and IL2<0) is performed and IL2 is defined as the high current, a switching loss in switching element S5 is the same as in switching element S5b in FIGS. 20 and 21. Consequently, a switching loss can be distributed among more switching elements also in power converter 11 as a result of application of switching control according to the first embodiment.

Figure 41:
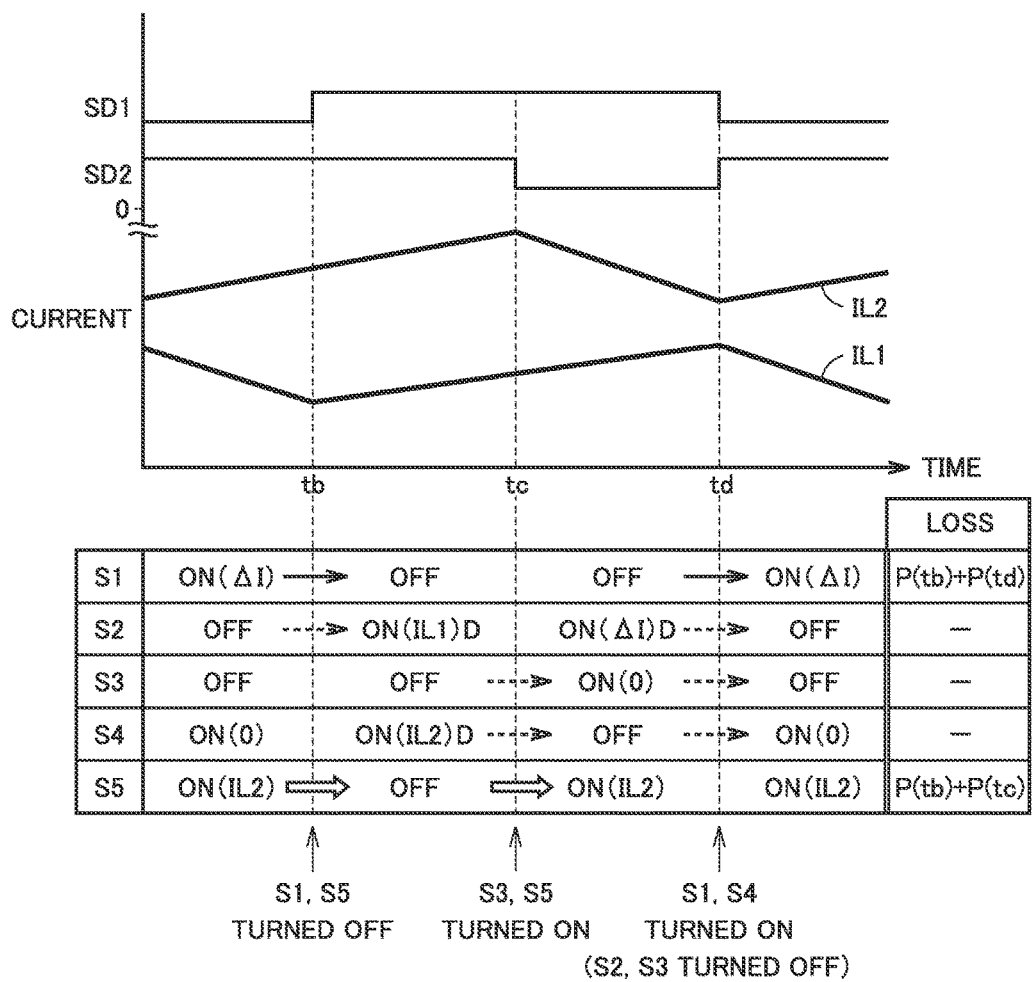
FIG. 41 is a waveform diagram when relation in magnitude between reactor currents is opposite to FIG. 39 (while switching control according to the first embodiment is not applied).

FIG. 41 shows a waveform diagram for illustrating a power loss in each switching element in power converter 11 when switching control according to the present embodiment is not applied (only current phase control is applied) as in FIG. 39. FIG. 23 also shows a waveform diagram of an example in which both of DC power supplies B1 and B2 perform the regeneration operation (IL1<0 and IL2<0). Unlike FIG. 39, IL1 is defined as the high current (|IL1|>|IL2|) in FIG. 41.

Referring to FIG. 41, waveforms of control pulse signals SD1 and SD2 and waveforms of reactor currents IL1 and IL2 are the same as in FIG. 23. Behaviors of currents and switching losses in switching elements S1 to S4 are also the same as in FIG. 23.

Switching element S5 is also turned off at time tb and turned on at time tc similarly to switching element S5b in FIG. 23. A switching loss equivalent to that in switching element S5b in power converter 10 is produced in switching element S5.

Figure 42:
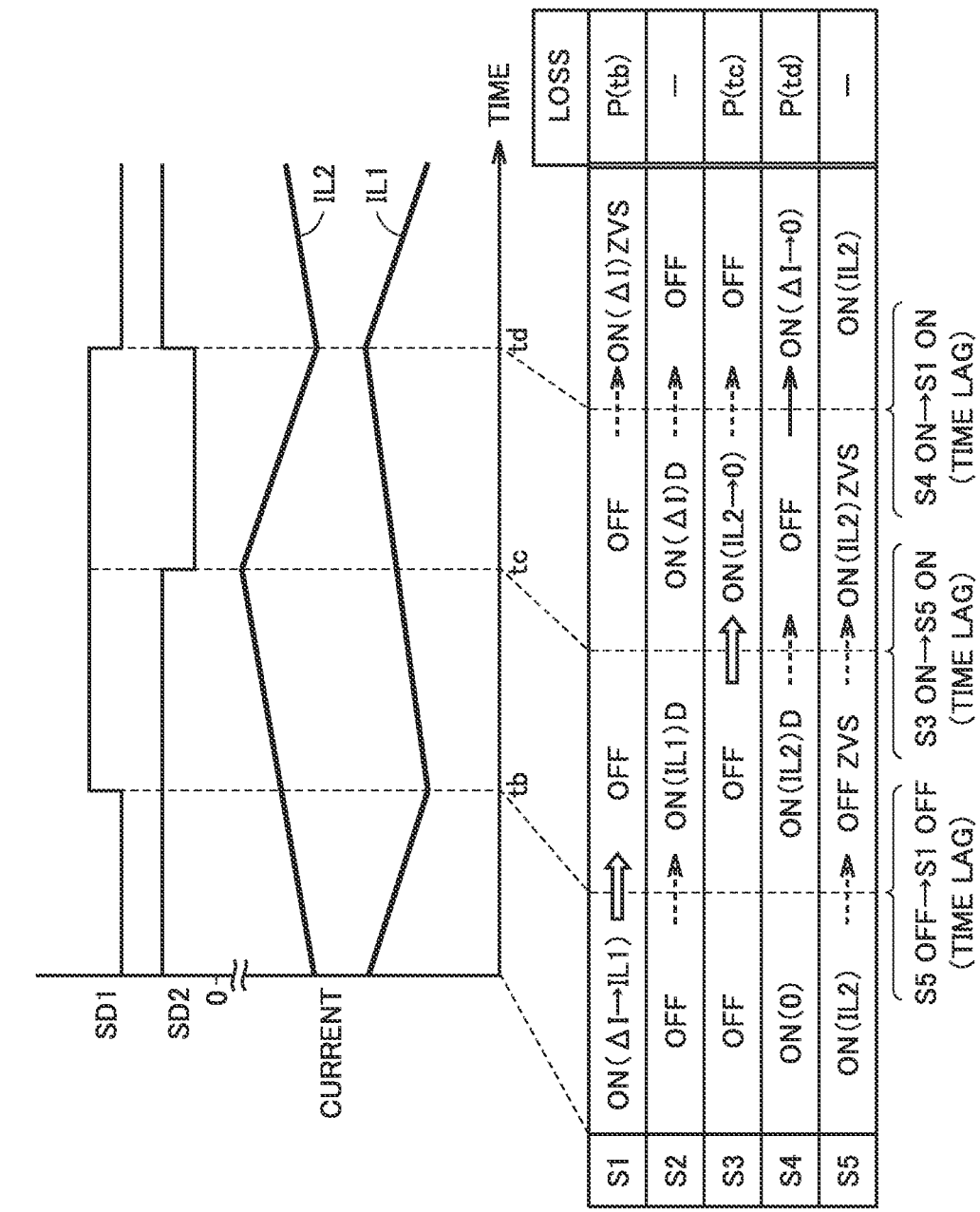
FIG. 42 is a waveform diagram when relation in magnitude between reactor currents is opposite to FIG. 40 (while switching control according to the first embodiment is applied).

FIG. 42 shows a waveform diagram when switching control to set a time lag in turn-on or turn-off as in FIG. 24 is applied to power converter 11. FIG. 42 shows a waveform diagram when switching control according to the first embodiment is applied to a circuit state the same as in FIG. 41. The condition of IL1<0, IL2<0, and |IL1|>|IL2| (that is, ΔI=IL1−IL2) is satisfied again in FIG. 42.

Referring to FIG. 42, at time tb, a time lag in turn-off is set for switching elements S1 and S5 to simultaneously be turned off such that switching element S5 is turned off and thereafter switching element S1 is turned off. Turn-off of switching element S5 is thus ZVS similarly to switching element S5b in FIG. 24. As in FIG. 24, when switching element S1 is turned off after switching element S5 is turned off, a power loss (turn-off) due to hard switching of IL1 is produced. Therefore, a switching loss at time tb is produced only in switching element S5 as in FIG. 24, instead of switching elements S1 and S5 in FIG. 41.

At time tc, a time lag in turn-on is set for a plurality of switching elements S3 and S5 to simultaneously be turned on such that switching element S3 is turned on and thereafter switching element S5 is turned on. Thus, when switching element S3 is turned on while switching element S5 remains off as in FIG. 24, the path for reactor current IL2 is changed to a path through switching element S3. Therefore, a power loss due to hard switching of IL2 is produced when switching element S3 is turned on.

When switching element S5 is turned on after switching element S3 is turned on, turn-on of switching element S5 is ZVS and hence no switching loss is produced.

Consequently, a switching loss at time tc is produced only in switching element S3 as in FIG. 24 instead of switching elements S3 and S5 in FIG. 39.

At time td, switching element S5 is neither turned on nor off and hence production of a switching loss is the same as in FIG. 21.

Therefore, in an example in which the regeneration operation (IL1<0 and IL2<0) is performed and IL1 is defined as the high current, a switching loss in switching element S5 is the same as in switching element S5b in FIGS. 23 and 41. Consequently, a switching loss can be distributed among more switching elements also in power converter 11 by applying switching control according to the first embodiment.

Switching control in which both of DC power supplies B1 and B2 perform the power running operation in power converter 11 will now be described for the confirmation purpose.

Figure 43:
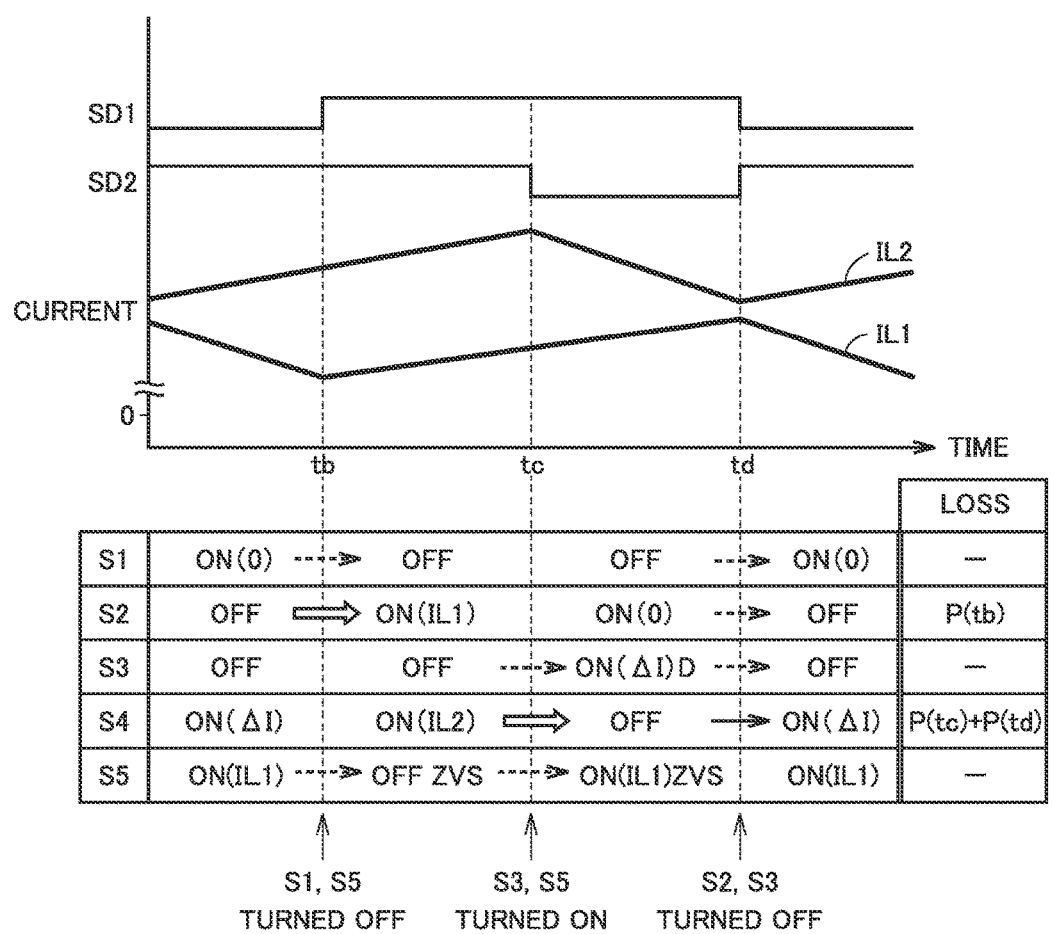
FIG. 43 is a waveform diagram (in power running) for illustrating a power loss in each switching element when switching control as in FIG. 26 is applied to the power converter according to the third embodiment.

FIG. 43 shows a waveform diagram when current phase control as in FIG. 26 is applied to power converter 11. FIG. 34 also shows a waveform of a current in an example in which both of DC power supplies B1 and B2 perform the power running operation (IL1>0 and IL2>0) as in FIG. 26. Since the condition of |IL2|>|IL1| satisfied, IL2 is defined as the high current and IL1 is defined as the low current (that is, ΔI=IL2−IL1).

Referring to FIG. 43, waveforms of control pulse signals SD1 and SD2 and waveforms of reactor currents IL1 and IL2 are the same as in FIG. 26. Behaviors of currents and switching losses in switching elements S1 to S4 are also the same as in FIG. 26.

Switching element S5 is turned off at time tb and turned on at time tc.

Before time tb, the path for IL1 can be secured by diode D1 and switching element S4 in the on state. Therefore, when switching element S5 is turned off with switching element S4 being maintained in the on state at time tb, switching element S5 is turned off without a potential difference across opposing ends, owing to diode D1 and switching element S4 (on). Therefore, since such turn-off is zero bolt switching (ZVS), no switching loss is produced.

Similarly, during the period from time tb to tc, in the power running operation, opposing ends of switching element S5 are set to the same potential through switching element S2 in the on state and diode D3. When switching element S5 is turned off from this state at time tc with switching element S2 being maintained in the on state, ZVS is made and hence no switching loss is produced.

Therefore, no switching loss is produced either in switching element S5 in power converter 11 during the power running operation, as in switching elements S5a and S5b in power converter 10. Consequently, as is understood from comparison between FIGS. 26 and 43, a switching loss equivalent to that in switching elements S2 and S4 in power converter 10 is produced in power converter 11.

Figure 44:
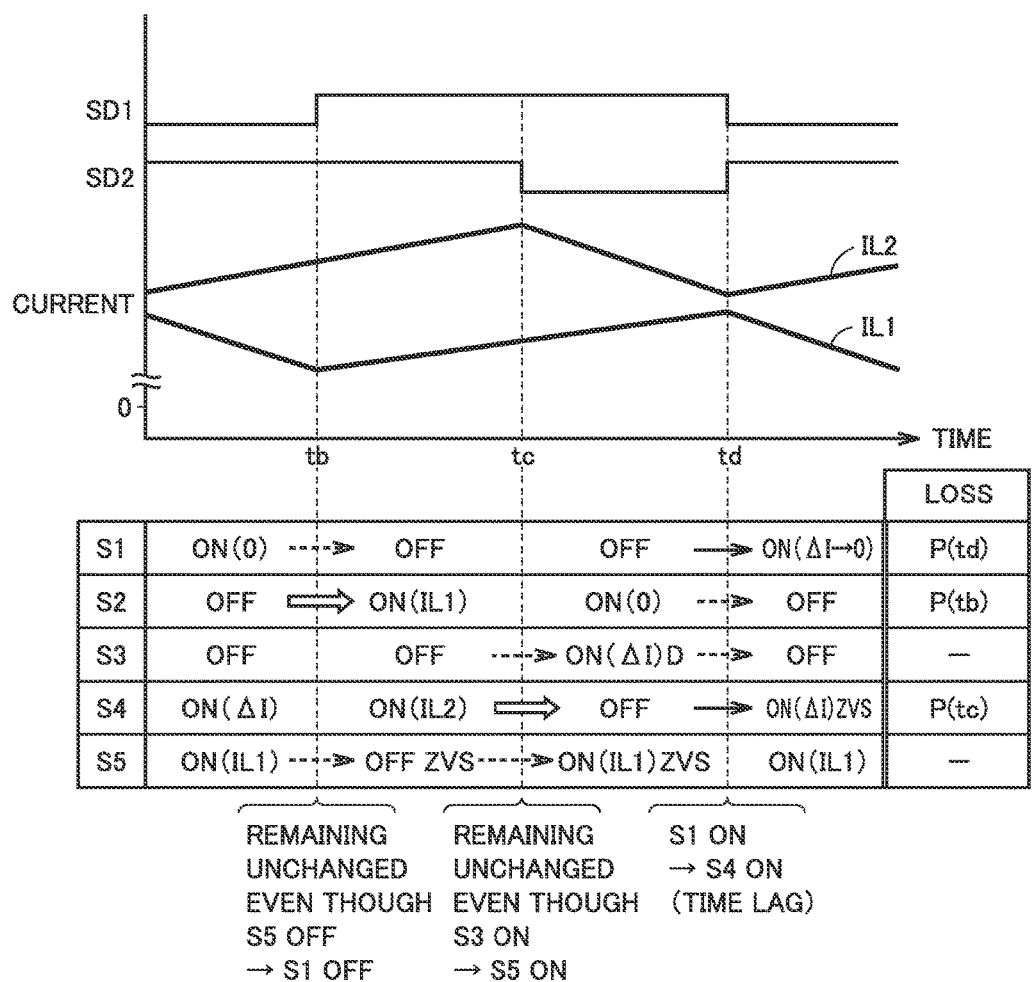
FIG. 44 is a waveform diagram (in power running) for illustrating a power loss in each switching element when switching control as in FIG. 27 is applied to the power converter according to the third embodiment.

FIG. 44 shows a waveform diagram when switching control to set a time lag in turn-on or turn-off as in FIG. 27 is applied to power converter 11. FIG. 44 shows a waveform diagram when switching control according to the modification of the first embodiment is applied to a circuit state the same as in FIG. 43. The condition of IL1>0, IL2>0, and |IL2|>|IL1| is satisfied again in FIG. 44.

Referring to FIG. 44, at time tb, as in FIG. 27, in a state until time tb, in the upper arm (the B1U arm), no current flows through switching element S1 and no switching loss is produced in switching element S1. Therefore, even though turn-off of switching element S1 is delayed, no switching loss is produced. Therefore, even though a time lag is set in turn-off of switching elements S1 and S5b, a manner of production of a switching loss is not changed.

Similarly, at time tc as well, in connection with switching elements S3 and S5b to simultaneously be turned on, a current path is formed not by switching element S3 but by diode D3 in the upper arm (the B2U arm). Therefore, even though turn-on of switching element S3 is advanced, no switching loss is produced. Therefore, even though a time lag is set in turn-on of switching elements S3 and S5b, a manner of production of a switching loss is not changed.

At time td, as in FIG. 27, a time lag is set for a plurality of switching elements S1 and S4 to simultaneously be turned on such that switching element S1 is turned on and thereafter switching element S4 is turned on. Thus, as in FIG. 27, a power loss (turn-on) due to switching of differential current $\Delta I$ is produced in switching element S1, whereas switching element S4 is turned on as ZVS. After switching element S4 is turned on, similarly to the period until time tb, differential current $\Delta I$ flows through switching element S4 whereas a current through switching element S1 makes transition to 0.

Therefore, also in the power running operation, as in FIG. 27, a switching loss in switching element S4 in FIG. 43 can be moved to switching element S1 by advancing turn-on of switching element S1 at time td.

Therefore, also in an example in which the power running operation (IL1>0 and IL2>0) is performed and IL2 is defined as the high current, some of a switching loss in switching element S4 can be moved to switching element S1 where no switching loss is produced when a time lag is not set (FIG. 43). Consequently, a switching loss can be distributed among more switching elements by applying switching control according to the first embodiment also to power converter 11.

Figure 45:
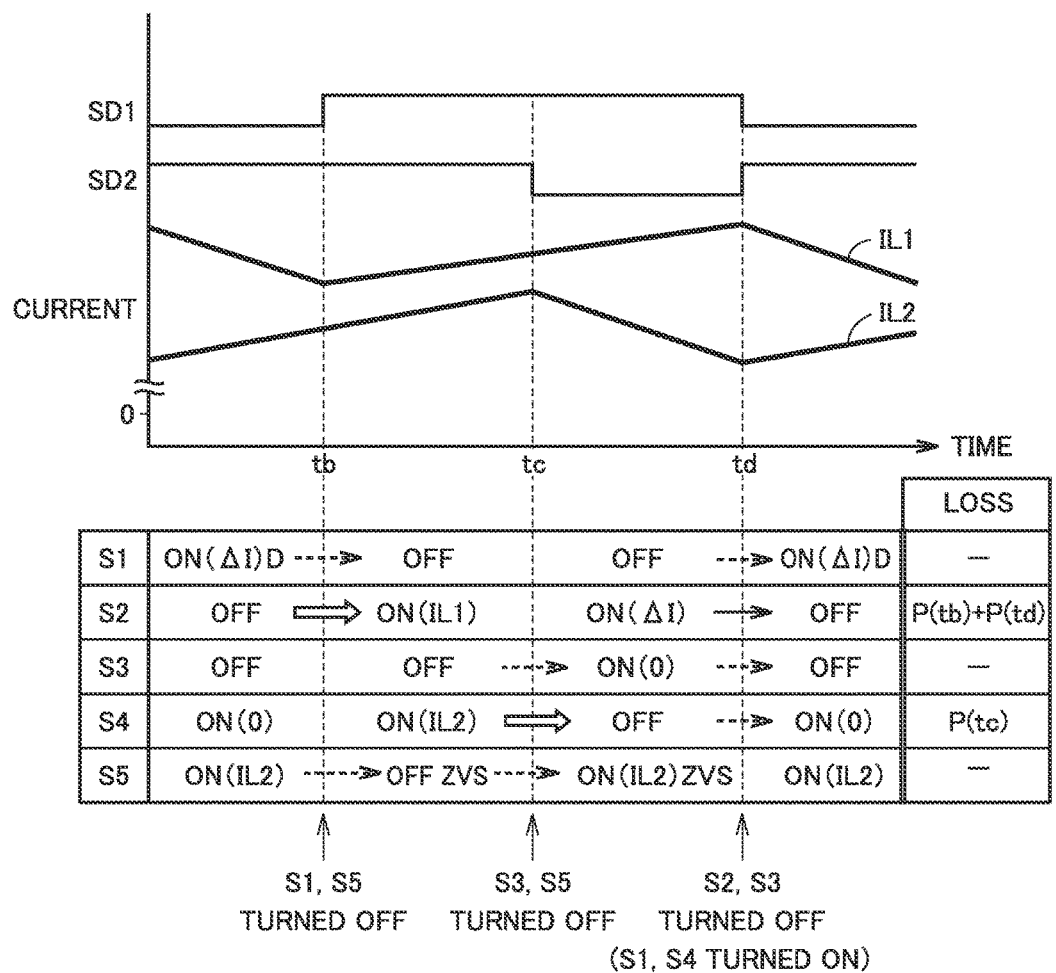
FIG. 45 is a waveform diagram when relation in magnitude between reactor currents is opposite to FIG. 43 (while switching control according to the first embodiment is not applied).

FIG. 45 shows a waveform diagram for illustrating a power loss in each switching element in power converter 11 when switching control according to the present embodiment is not applied (only current phase control is applied) as in FIG. 43. FIG. 45 also shows a waveform diagram when both of DC power supplies B1 and B2 perform the power running operation (IL1>0 and IL2>0). Unlike FIG. 43, IL1 is defined as the high current (|IL1|>|IL2|) in FIG. 45. Therefore, differential current $\Delta I$ is defined as $\Delta I = IL1 - IL2$.

Referring to FIG. 45, waveforms of control pulse signals SD1 and SD2 and waveforms of reactor currents IL1 and IL2 are the same as in FIG. 29. Behaviors of currents and switching losses in switching elements S1 to S4 are also the same as in FIG. 29.

Switching element S5 is turned off as in FIG. 43 at time tb without a difference in potential across opposing ends of switching element S5 owing to diode D1 and switching element S4 (on). Therefore, since such turn-off is zero volt switching (ZVS), no switching loss is produced.

As in FIG. 43, opposing ends of switching element S5 are at the same potential through switching element S2 in the on state and diode D3 also when switching element S5 is turned on at time tc. Therefore, when switching element S5 is turned off with switching element S2 being maintained in the on state at time tc, ZVS is made and hence no switching loss is produced.

Figure 46:
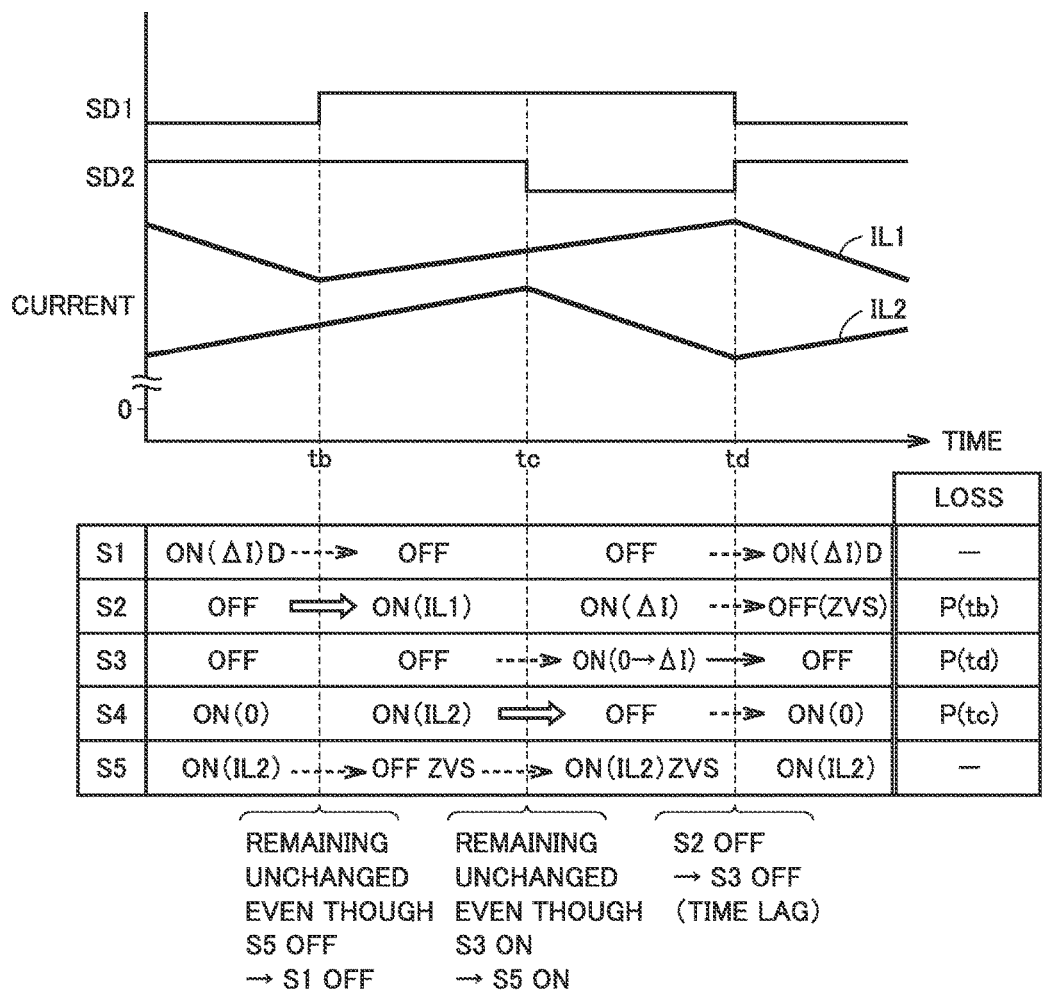
FIG. 46 is a waveform diagram when relation in magnitude between reactor currents is opposite to FIG. 44 (while switching control according to the first embodiment is applied).

FIG. 46 shows a waveform diagram when switching control to set a time lag in turn-on or turn-off as in FIG. 30 is applied to power converter 11. FIG. 46 shows a waveform diagram when switching control according to the modification of the first embodiment is applied to a circuit state the same as in FIG. 45. The condition of IL1>0, IL2>0, and |IL1|>|IL2| is satisfied again in FIG. 46.

Referring to FIG. 46, at time tb, a current flows through diode D1 in the upper arm during the power running operation as in FIG. 30. Therefore, even though a time lag is set in turn-off of switching elements S1 and S5, a manner of production of a switching loss is not changed.

At time tc as well, as in FIG. 30, a current flows through diode D3 in the upper arm during the power running operation. Therefore, even though a time lag is set in turn-off of switching elements S3 and S5, a manner of production of a switching loss is not changed.

At time td, as in FIG. 30, a time lag is set for a plurality of switching elements S2 and S3 to simultaneously be turned off such that switching element S2 is turned off and thereafter switching element S3 is turned off. Thus, as in FIG. 30, switching element S2 can be turned off as ZVS with switching element S3 remaining on. By turning off switching element S3 as being delayed after turn-off of switching element S2, a power loss due to switching of differential current $\Delta I$ is produced in switching element S3.

Therefore, some of a switching loss in switching element S2 at time td can be moved to switching element S3 by delaying turn-off of switching element S3 as in FIG. 30 also in the power running operation.

Therefore, in an example in which the power running operation (IL1>0 and IL2>0) is performed and IL1 is defined as the high current as well, a switching loss in switching element S2 can be moved to switching element S3 where no switching loss is produced when no time lag is set (FIG. 45). Consequently, a switching loss can be distributed among more switching elements by applying switching control according to the first embodiment also to power converter 11.

As described above, a switching loss can be distributed among more switching elements by applying switching control according to the present embodiment to a plurality of switching elements to simultaneously be turned on or off, whichever of IL1 and IL2 may be defined as the high current throughout the power running operation (IL1>0 and IL2>0) and the regeneration operation (IL1<0 and IL2<0) also in power converter 11. Consequently, as in the example in which switching control according to the present embodiment is applied to power converter 10, concentration of a power loss to a specific switching element can be suppressed and unevenness in amount of heat generation among switching elements can be suppressed.

Switching control to set a time lag in turn-on or turn-off among a plurality of switching elements to simultaneously be turned on or off described in the first to third embodiments can be applied also to an example in which any one and the other of DC power supplies B1 and B2 perform any one and the other of the regeneration operation and the power running operation, respectively (hereinafter also referred to as "during a circulating operation") in power converters 10 and 11.

Switching control described in the first to third embodiments creates, in summary, a period in which some of switching elements S1 to S4 are turned on or off with a time lag being set so that switching element S5 (S5a and S5b) and only one selected from among switching elements S1 to S4 are turned on. By selecting a switching element to be turned on simultaneously with switching element S5 (S5a and S5b) among switching elements S1 to S4 depending on a manner of setting of a time lag, a location of production of a power loss (heat generation) is selected. During such a period, IL1 or IL2 passes through switching element S5 (S5a and S5b) whereas a current resulting from IL1 and IL2 as being superimposed on each other passes through a switching element in the on state among S1 to S4. In each of the power running operation and the regeneration operation, as described with reference to FIGS. 17 (a) and (b), a power loss (heat generation) is relaxed by switching differential current ΔI with IL1 and IL2 opposite in orientation being superimposed on each other.

In the circulating operation, IL1 and IL2 in the same direction are superimposed on each other. Therefore, a power loss (heat generation) increases as compared with that in the power running operation and the regeneration operation. As a result of application of switching control described in the first to third embodiments, however, by setting a time lag under the control common between the power running operation and the regeneration operation, a switching element where a power loss (heat generation) is produced can be changed from a switching element when there is no time lag set.

[Fourth Embodiment]

An operation mode other than the parallel boost mode in power converters 10 and 11 will be described in a fourth embodiment. In particular, description will be given with a series boost mode effective for improvement in efficiency in a high-voltage region being focused on. Switching control described in the first to third embodiments is applied to the parallel boost mode. As will be clarified in the description below, however, energy stored in DC power supplies B1 and B2 can efficiently be made use of by further selectively using operation modes other than the parallel boost mode.

A circuit operation in the series boost mode of power converter 10 according to the first embodiment will initially be described in the fourth embodiment.

Referring again to FIG. 1, in power converter 10, switching elements S1 and S3 are turned off whereas switching element S5a or S5b is turned on, so that DC power supplies B1 and B2 connected in series can electrically be connected between power lines PL and GL.

In the series boost mode, DC/DC conversion between V[1]+V[2] (DC power supplies B1 and B2) and VH (power lines PL and GL) can be carried out by alternately forming a state that the lower arm is turned on for each of DC power supplies B1 and B2 and a state that the upper arm is turned on for DC power supplies B1 and B2 connected in series.

Figure 47:
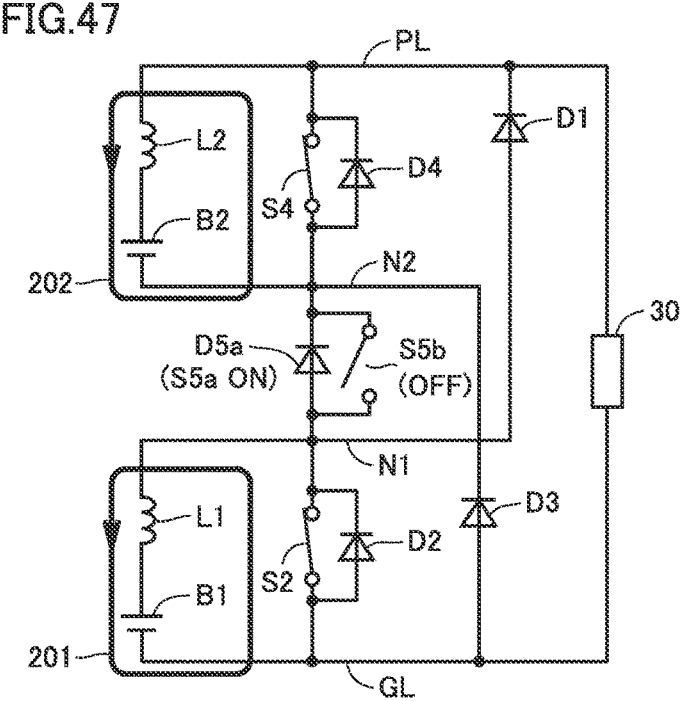
FIG. 47 is an equivalent circuit diagram (when the lower arm is on) of the power converter according to the first embodiment in a series boost mode according to a fourth embodiment.

FIG. 47 is an equivalent circuit diagram (when the lower arm is on) of power converter 10 in the series boost mode.

Referring to FIG. 47, a current path 201 and a current path 202 are formed by turning on switching elements S2 and S4 and turning off switching elements S1 and S3. Each equivalent circuit diagram in the fourth embodiment does not show switching elements S1 and S3 fixed to off in the series boost mode.

Energy is stored in reactor L1 with an output from DC power supply B1 through current path 201. Similarly, energy is stored in reactor L2 with an output from DC power supply B2 through current path 202. In FIG. 47, switching elements S2 and S4 in the on state correspond to the lower arm of the boost chopper circuit for both of DC power supplies B1 and B2 in the series boost mode.

In the circuit state in FIG. 47, when a current path in the direction from node N2 to node N1 is formed, a short-circuiting path from power line PL to power line GL is formed. Therefore, during the on period of the lower arm, switching element S5b should be turned off.

Figure 48:
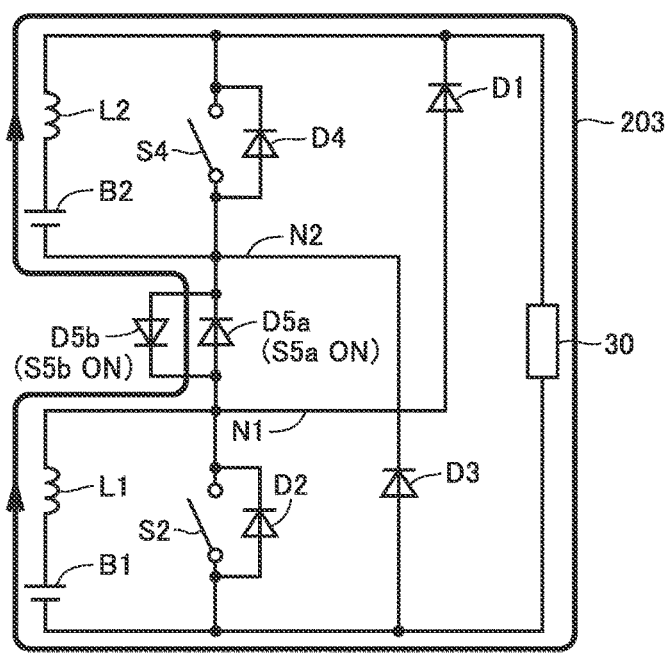
FIG. 48 is an equivalent circuit diagram (when the upper arm is on) of the power converter according to the first embodiment in the series boost mode according to the fourth embodiment.

FIG. 48 is an equivalent circuit diagram (when the upper arm is on) of power converter 10 in the series boost mode.

Referring to FIG. 48, a current path 203 is formed by turning off switching elements S1 to S4 and turning on switching element S5a. The sum of energy resulting from an output voltage from DC power supplies B1 and B2 connected in series and energy stored in reactors L1 and L2 is output across power lines PL and GL through current path 203. Consequently, a state that upper-arm elements in the boost chopper circuit are turned on is formed for DC power supplies B1 and B2 connected in series.

By turning on switching element S5b, DC power supplies B1 and B2 connected in series can be charged with a current in a direction opposite to current path 203. Therefore, adaptation to the regeneration operation of DC power supplies B1 and B2 can also be made. In the series boost mode, switching elements S5a and S5b correspond to the upper arm of the boost chopper circuit.

Figures 49, 50:
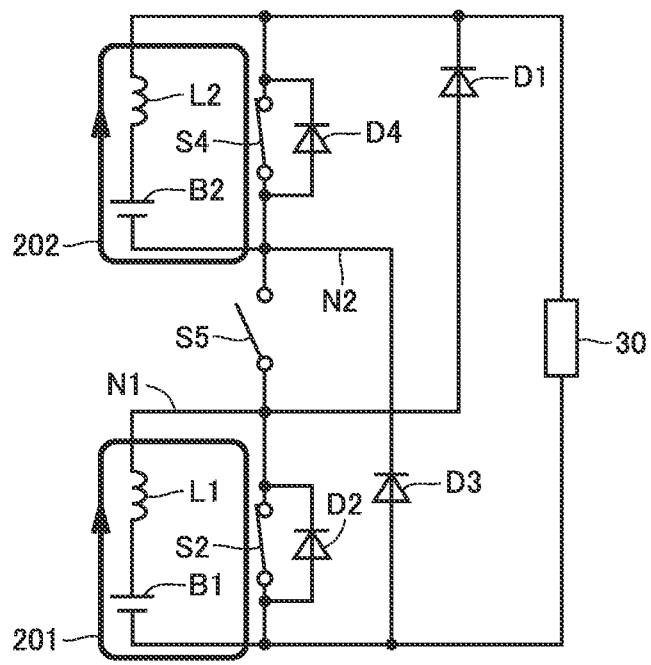
FIG. 49 is a chart showing a list of gate Boolean expressions for controlling on and off of each switching element in the series boost mode of the power converter according to the first embodiment.
FIG. 50 is an equivalent circuit diagram (when the lower arm is on) of the power converter according to the third embodiment in the series boost mode according to the fourth embodiment.

FIG. 49 shows gate Boolean expressions for controlling on and off of each of switching elements S1 to S5a and S5b in the series boost mode of power converter 10.

Referring to FIG. 49, in the series boost mode, a current which flows through DC power supplies B1 and B2 connected in series is common, and hence outputs from DC power supplies B1 and B2 cannot separately be controlled as in the parallel boost mode. Therefore, one boost chopper circuit is equivalently formed for a voltage V[1]+V[2]. Therefore, control pulse signal SD for duty control is common between DC power supplies B1 and B2.

In the series boost mode, switching elements S2 and S4 forming the lower arm are turned on and off in common in response to control pulse signal SD. Switching element S5b forming the upper arm is turned on and off in response to control pulse signal /SD (an inverted signal of SD). A pair of switching elements S2 and S4 forming the lower arm and switching element S5b forming the upper arm are complementarily turned on and off.

As shown in FIGS. 47 and 48, switching elements S1 and S3 are fixed to off in the series boost mode. Switching element S5a can be fixed to on throughout the on period of the lower arm and the on period of the upper arm.

Control pulse signal SD in FIG. 49 can be generated in PWM control in which duty ratio DT is compared with carrier wave CW1 or CW2 in the series boost mode. Duty ratio DT corresponds to a ratio of a period of on of the lower arm to a switching period (one cycle of a carrier wave) in the boost chopper circuit including switching elements S2 and S4 as the lower arm and including switching elements S5a and S5b as the upper arm.

In the boost chopper circuit in the series boost mode, in the expression (1), Vi is defined as Vi=V[1]+V[2]. In the series boost mode, an expression (2) below is satisfied among duty ratio DT, voltages V[1] and V[2] of DC power supplies B1 and B2, and output voltage VH.

$$VH=1/(1-DT) \cdot (V[1]+V[2]) \qquad (2)$$

Therefore, a theoretical value of duty ratio DT for voltage command value VH* is shown in an expression (3) below.

$$DT=1.0-(V[1]+V[2])/VH^* \qquad (3)$$

For example, duty ratio DT can be calculated by modifying the theoretical value in the expression (3) with feedback control of a voltage deviation ΔVH from voltage command value VH* as in FIG. 13.

By thus applying the series boost mode to power converter 10, output voltage VH can be controlled in accordance with voltage command value VH* through DC/DC conversion for boosting V[1]+V[2] to output voltage VH. Thus, a power loss mainly in reactors L1 and L2 can be suppressed as in the series connection mode in PTD 2 by suppressing a boost ratio (VH/(V[1]+V[2])). Specifically, as reactors L1 and L2 are connected in series and thus a gradient of variation in reactor currents IL1 and IL2 is suppressed, amplitude of ripples is smaller. Thus, an iron loss caused in cores (not shown) of reactors L1 and L2 and an AC loss caused in a coil winding (not shown) can be reduced. Consequently, DC/DC conversion in power converter 10 can be higher in efficiency in a high-voltage region (VH>V[1]+V[2]).

A circuit operation in the series boost mode of power converter 11 according to the third embodiment will now be described.

Figures 51, 52:
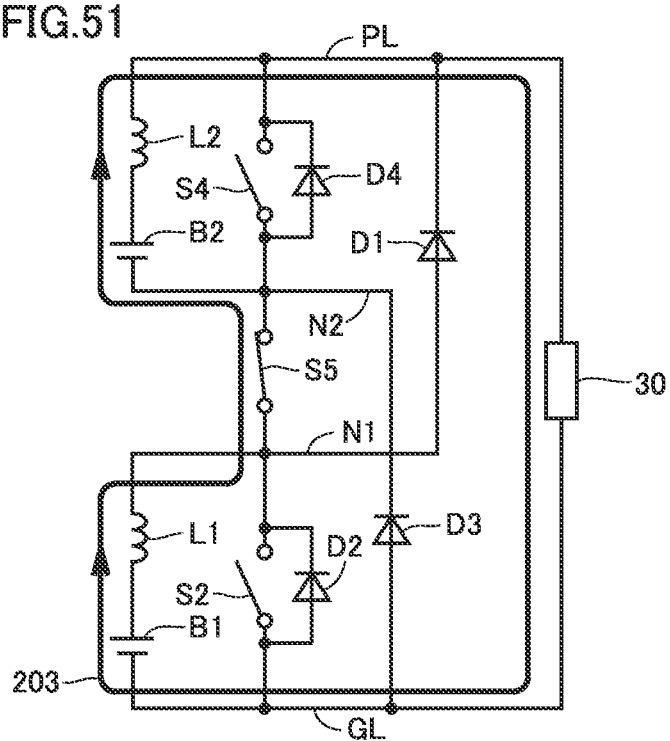
FIG. 51 is an equivalent circuit diagram (when the upper arm is on) of the power converter according to the third embodiment in the series boost mode according to the fourth embodiment.
FIG. 52 is a chart showing a list of gate Boolean expressions for controlling on and off of each switching element in the series boost mode of the power converter according to the third embodiment.

FIG. 50 is an equivalent circuit diagram (when the lower arm is on) of power converter 11 in the series boost mode and FIG. 51 is an equivalent circuit diagram (when the upper arm is on) of power converter 11 in the series boost mode.

Referring to FIG. 50, current path 201 and current path 202 as in FIG. 47 are formed by turning on switching elements S2 and S4 and turning off switching elements S1 and S3. Switching elements S2 and S4 correspond to the lower arm of the boost chopper circuit in the series boost mode also in power converter 11. During the on period of the lower arm, on the other hand, in order to cut off the current path from node N2 toward node N1, switching element S5 should be turned off.

Referring to FIG. 51, current path 203 as in FIG. 37 can be formed by turning off switching elements S1 to S4 and turning on switching element S5. By turning on switching element S5, a regenerative current in a direction opposite to current path 203 can also be addressed. Switching element S5 thus corresponds to the upper arm of the boost chopper circuit in the series boost mode.

FIG. 52 shows gate Boolean expressions for controlling on and off of each of switching elements S1 to S5 in the series boost mode of power converter 11.

Referring to FIG. 52, on and off of switching elements S1 to S4 is controlled in accordance with the gate Boolean expressions as in FIG. 49 as in the series boost mode of power converter 10. Switching elements S2 and S4 are turned on and off in response to control pulse signal SD whereas switching elements S1 and S3 are fixed to off throughout the on period of the lower arm and the on period of the upper arm. Switching element S5 is turned on and off in response to control pulse signal /SD (the inverted signal of SD) similarly to switching element S5b in FIG. 49. A pair of switching elements S2 and S4 forming the lower arm and switching element S5 forming the upper arm are thus complementarily turned on and off.

Therefore, the series boost mode can be applied also to power converter 11. Consequently, DC/DC conversion in power converter 11 can be higher in efficiency in the high-voltage region (VH>V[1]+V[2]).

An operation mode other than the parallel boost mode and the series boost mode in power converters 10 and 11 will further be described.

FIG. 53 is a chart showing a list of a plurality of operation modes applied to power converters 10 and 11.

Referring to FIG. 53, the plurality of operation modes are broadly categorized into a "boost mode" in which output voltage VH is controlled in accordance with voltage command value VH* and a "direct coupling mode" in which on and off of switching elements S1 to S5 (S5a and S5b) is fixed and DC power supply (power supplies) B1 and/or B2 are/is electrically connected to power lines PL and GL.

The boost mode includes the parallel boost mode and the series boost mode described above. In the parallel boost mode, by controlling on and off of switching elements S1 to S5a and S5b of power converter 10 in accordance with the gate Boolean expressions shown in FIG. 12, DC/DC conversion can be carried out in parallel between DC power supplies B1 and B2 and power lines PL and GL (load 30). Similarly, by controlling on and off of switching elements S1 to S5a and S5b of power converter 11 in accordance with the gate Boolean expressions shown in FIG. 38, DC/DC conversion can be carried out in parallel between DC power supplies B1 and B2 and power lines PL and GL (load 30). In the parallel boost mode, output voltage VH can be controlled in accordance with voltage command value VH* while a ratio of power allocation between DC power supplies B1 and B2 is controlled.

In the series boost mode, by controlling on and off of switching elements S1 to S5a and S5b of power converter 10 in accordance with the Boolean expressions shown in FIG. 49, DC/DC conversion can be carried out while DC power supplies B1 and B2 are connected in series. Similarly, by controlling on and off of switching elements S1 to S5 of power converter 11 in accordance with the Boolean expressions shown in FIG. 52, DC/DC conversion can be carried out while DC power supplies B1 and B2 are connected in series.

In the series boost mode, since a ratio of power allocation between DC power supplies B1 and B2 is automatically determined by a ratio between voltages V[1] and V[2] in control of output voltage VH in accordance with voltage command value VH*, direct control as in the parallel boost mode cannot be carried out. Though the series boost mode can be adapted only to a high-voltage range expressed as VH>(V[1]+V[2]), a boost ratio in the high-voltage range can be lowered and hence DC/DC conversion can be high in efficiency.

The parallel boost mode can be adapted also to a voltage range expressed as VH≤V[1]+V[2] and hence an output voltage range is wide. Furthermore, by applying switching control to add an inflection point to the reactor current on the side of the low current described in the first to third embodiments, a difference in amount of heat generation among switching elements, that is, a temperature difference, can be suppressed. Since a ratio of power allocation between DC power supplies B1 and B2 can be controlled, a state of charge (SOC) of each of DC power supplies B1 and B2 can also be controlled.

Furthermore, the boost mode includes a "mode of boost by DC power supply B1 (hereinafter a B1 boost mode)" in which only DC power supply B1 is used to carry out DC/DC conversion between the DC power supply and power lines PL and GL (load 30) and a "mode of boost by DC power supply B2 (hereinafter a B2 boost mode)" in which only DC power supply B2 is used to carry out DC/DC conversion between the DC power supply and power lines PL and GL (load 30). In an operation mode other than the parallel boost mode and the series boost mode, an operation for turning on and off each of switching elements S5a and S5b of power converter 10 is common to an operation for turning on and off switching element S5 of power converter 11.

In the B1 boost mode, so long as output voltage VH is controlled to be higher than V[2], DC power supply B2 is not used, with a state electrically disconnected from power line PL being maintained. In the B1 boost mode, only the boost chopper circuit (the first arm) for DC power supply B1 is implemented. Therefore, switching elements S3 and S4 are fixed to off while the current path between nodes N1 and N2 is cut off by fixing switching element S5 (S5a and S5b) to off, while on and off of switching elements S1 and S2 is controlled in response to respective control pulse signals /SD1 and SD1 based on duty ratio DT1 for controlling an output from DC power supply B1.

Similarly, in the B2 boost mode, so long as output voltage VH is controlled to be higher than V[1], DC power supply B1 is not used, with a state electrically disconnected from power line PL being maintained.

In the B2 boost mode, only the boost chopper circuit (the first arm) for DC power supply B2 is implemented. Therefore, switching elements S1 and S2 are fixed to off while the current path between nodes N1 and N2 is cut off by fixing switching element S5 (S5a and S5b) to off, while on and off of switching elements S3 and S4 is controlled in response to respective control pulse signals /SD2 and SD2 based on duty ratio DT2 for controlling an output from DC power supply B2. In the B1 boost mode and the B2 boost mode, duty ratio DT1 or DT2 is calculated so as to control output voltage VH in accordance with voltage command value VH* (voltage control). Thus, in each of the operation modes belonging to the boost mode, output voltage VH is controlled in accordance with voltage command value VH*.

On the other hand, the direct coupling mode includes a "mode of direct coupling of DC power supply B1 (hereinafter a B1 direct coupling mode)" in which a current path to power lines PL and GL is formed only for DC power supply B1 and a "mode of direct coupling of DC power supply B2 (hereinafter a B2 direct coupling mode)" in which a current path to power lines PL and GL is formed only for DC power supply B2.

In the B1 direct coupling mode, switching element S1 is fixed to on while a current path between nodes N1 and N2 is cut off by fixing switching element S5 (S5a and S5b) to off, while switching elements S2 to S4 are fixed to off. Thus, since DC power supply B2 is disconnected between power lines PL and GL, output voltage VH is comparable to voltage V[1] of DC power supply B1 (VH=V[1]). In the B1 direct coupling mode, DC power supply B2 is not used, with a state electrically disconnected between power lines PL and GL being maintained. If the B1 direct coupling mode is applied in the state of V[2]>V[1], a short-circuiting current is produced from DC power supply B2 to DC power supply B1 via switching element S1 and diode D3. Therefore, a condition of V[1]>V[2] is required for application of the B1 direct coupling mode.

Similarly, in the B2 direct coupling mode, switching element S3 is fixed to on while a current path between nodes N1 and N2 is cut off by fixing switching element S5 (S5a and S5b) to off, while switching elements S1, S2, and S4 are fixed to off. Thus, since DC power supply B1 is disconnected between power lines PL and GL, output voltage VH is comparable to voltage V[2] of DC power supply B2 (VH=V[2]). In the B2 direct coupling mode, DC power supply B1 is not used, with a state electrically disconnected between power lines PL and GL being maintained. If the B2 direct coupling mode is applied in the state of V[1]>V[2], a short-circuiting current will be produced from DC power supply B1 to DC power supply B2 via diode D1 and switching element S3. Therefore, a condition of V[2]>V[1] is required for application of the B2 direct coupling mode.

When V[1] and V[2] are comparable to each other, a "parallel direct coupling mode" in which a state that DC power supplies B1 and B2 are electrically connected in parallel between power lines PL and GL is maintained can also be selected. In the parallel direct coupling mode, switching elements S1 and S3 are fixed to on while the current path between nodes N1 and N2 is cut off by fixing switching element S5 (S5a and S5b) to off, while switching elements S2 and S4 are fixed to off. Thus, output voltage VH is comparable to V[1] and V[2]. Since a voltage difference between V[1] and V[2] produces a short-circuiting current between DC power supplies B1 and B2, the parallel direct coupling mode can be applied only when the voltage difference is small.

Furthermore, the direct coupling mode includes a "series direct coupling mode" in which a state that DC power supplies B1 and B2 are electrically connected in series between power lines PL and GL is maintained. In the series direct coupling mode, switching elements S1 to S4 are fixed to off while the current path between nodes N1 and N2 is formed by fixing switching element S5 (S5a and S5b) to on. Thus, output voltage VH is comparable to the sum of voltages V[1] and V[2] of DC power supplies B1 and B2 (VH=V[1]+V[2]).

Since output voltage VH is determined depending on voltages V[1] and V[2] of DC power supplies B1 and B2 in each of the operation modes included in the direct coupling mode, the output voltage cannot directly be controlled. Therefore, since output voltage VH cannot be set to a voltage suitable for an operation of load 30 in each operation mode included in the direct coupling mode, a power loss in load 30 may increase.

On the other hand, since each of switching elements S1 to S5 (S5a and S5b) is not turned on and off in the direct coupling mode, a power loss (a switching loss involved with turning on and off) in power converters 10 and 11 is suppressed. Therefore, depending on an operation state of load 30, a power loss in power supply system 5 as a whole may be suppressed by application of the direct coupling mode, because an amount of reduction in power loss in power converters 10 and 11 is greater than an amount of increase in power loss in load 30.

Thus, power converters 10 and 11 can control output voltage VH while a plurality of operation modes shown in FIG. 42 are selectively applied by switching a switching pattern of switching elements S1 to S5 (S5a and S5b). Switching control described in the first to third embodiments is applied to the parallel boost mode. By selectively using also operation modes other than the parallel boost mode depending on a state (SOC and a temperature) of DC power supplies B1 and B2 and a voltage region of voltage command value VH* (in particular, relation of magnitude as compared with V[1]+V[2]), however, energy stored in DC power supplies B1 and B2 can efficiently be made use of.

[Further Modification of Configuration of Power Converter]

In the present embodiment, an example in which "first semiconductor element SM1" to "fourth semiconductor element SM4" are implemented by pairs of switching elements S1 to S4 and anti-parallel diodes D1 to D4, respectively, has been described. In addition, an example in which "fifth semiconductor element SM5" is implemented by switching element S5 in which no anti-parallel diode is provided (the third embodiment) or by a pair of switching elements S5a and S5b for implementing a bidirectional switch (the first embodiment) has been shown. Namely, a configuration in which "first semiconductor element SM1" to "fifth semiconductor element SM5" each include a switching element which can control formation (on) and cut-off (off) of a current path has been exemplified. In such a configuration example, regenerative charging can be applied to both of DC power supplies B1 and B2.

In a configuration in which one or neither of DC power supplies B1 and B2 is regeneratively charged, however, some of "first semiconductor element SM1" to "fourth semiconductor element SM4" can be simplified in structure by omitting either a switching element or a diode. Namely, such a configuration that only some of "first semiconductor element SM1" to "fifth semiconductor element SM5" have switching elements is also possible in principle.

Figure 54:
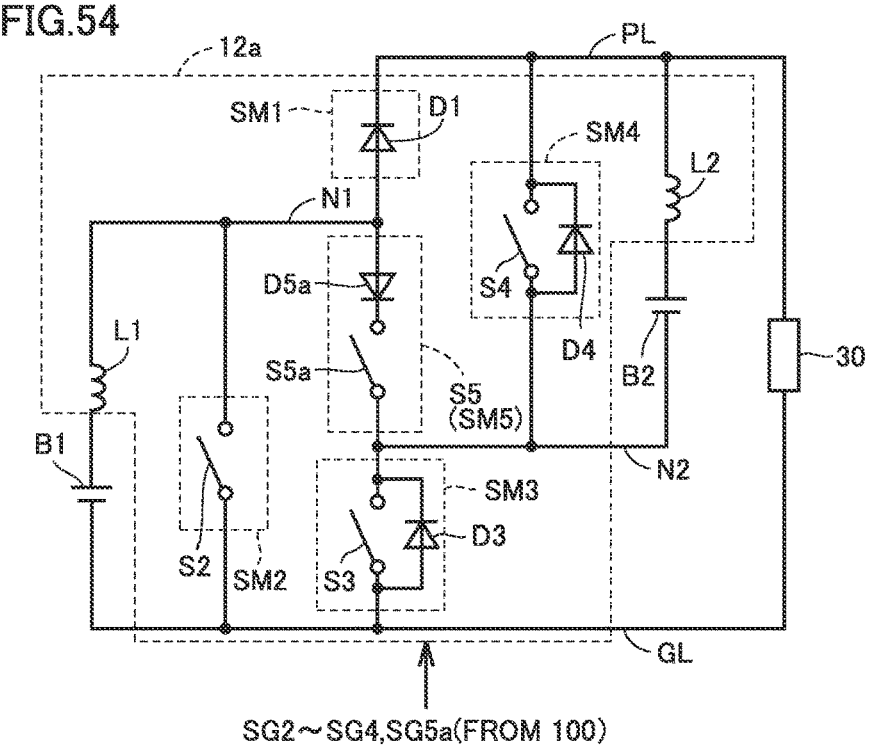
FIG. 54 is a circuit diagram showing modifications of the configuration of the power converter shown in FIG. 1 when a first DC power supply is not regeneratively charged.

For example, when DC power supply B1 is not regeneratively charged but used only for discharging (power running), a configuration of a power converter 12a shown in FIG. 54 can be employed instead of power converter 10 shown in FIG. 1.

Referring to FIG. 54, in power converter 12a, arrangement of switching element S1 for controlling regeneration to DC power supply B1 can be omitted as compared with power converter 10 shown in FIG. 1. Namely, "first semiconductor element SM1" between node N1 and power line PL can be implemented only by diode D1.

In power converter 10 in FIG. 1, in the series boost mode, if any one of DC power supplies B1 and B2 is unable to regenerate, the operation is limited to the power running operation and hence switching element S5b does not have to be provided. In the parallel boost mode as well, for example, if neither of DC power supplies B1 and B2 can regenerate and the operation is limited to the power running operation, a current is not generated in a direction of passage through switching element S5b. As shown in FIG. 53, a current flows through switching element S5 (switching elements S5a and S5b) in none of the B1 boost mode, the B2 boost mode, the B1 direct coupling mode, and the B2 direct coupling mode.

Therefore, when any one of DC power supplies B1 and B2 is incapable of regenerative charging in power converter 10 (FIG. 1) in the first embodiment, a current path from node N2 toward node N1 is unnecessary at all times and hence switching element S5b and diode D5b do not have to be provided. "Fifth semiconductor element SM5" can also be configured to have only a function to turn on and off a current path from node N1 toward node N2. Furthermore, in power converter 12a, diode D2 arranged mainly for securing a path for a regenerative current to DC power supply B1 can also be omitted.

Figure 55:
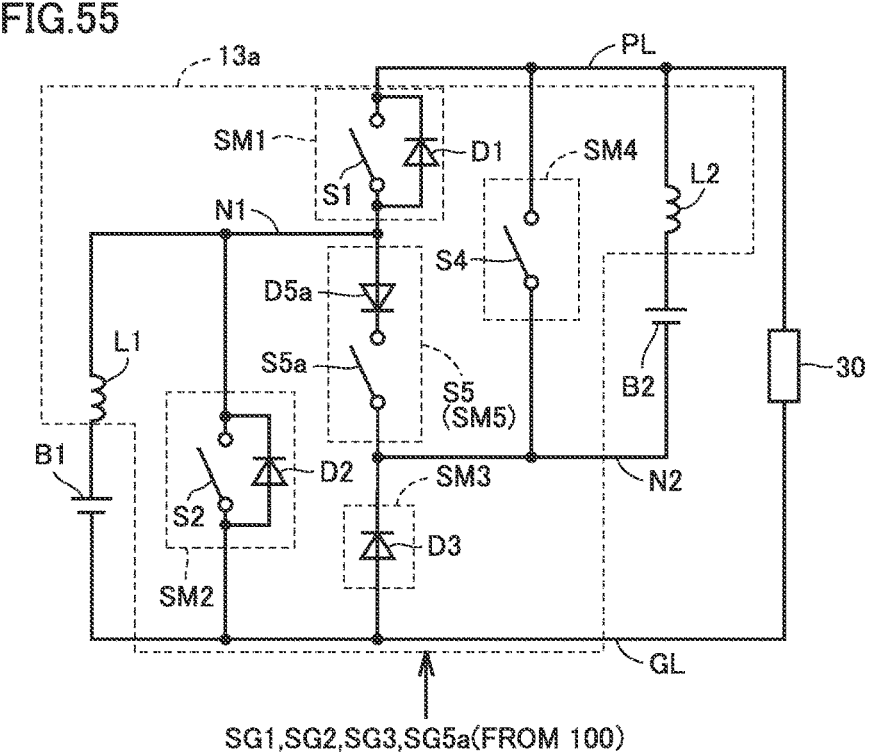
FIG. 55 is a circuit diagram showing a modification of the configuration of the power converter shown in FIG. 1 when a second DC power supply is not regeneratively charged.

Similarly, when DC power supply B2 is not regeneratively charged but used only for discharging (power running), a configuration of a power converter 13a shown in FIG. 55 can be employed.

Referring to FIG. 55, in power converter 13a, arrangement of switching element S3 for controlling regeneration to DC power supply B2 can be omitted as compared with power converter 10 shown in FIG. 1. Namely, "third semiconductor element SM3" between node N2 and power line GL can be implemented only by diode D3. Switching element S5b does not have to be arranged as in power converter 12a (FIG. 54). Furthermore, in power converter 13a, diode D4 arranged mainly for securing a path for a regenerative current to DC power supply B2 can also be omitted.

Figure 56:
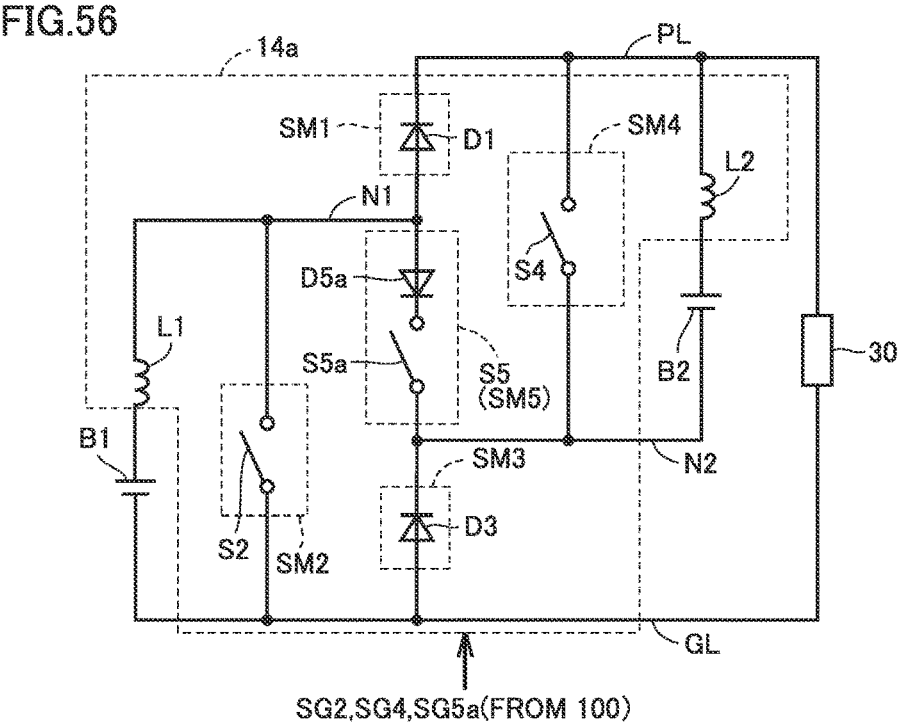
FIG. 56 is a circuit diagram showing a modification of the configuration of the power converter shown in FIG. 1 when the first and second DC power supplies are not regeneratively charged.

When neither of DC power supplies B1 and B2 is regeneratively charged but they are used only for discharging (power running), a configuration of a power converter 14a shown in FIG. 56 can be employed.

Referring to FIG. 56, in power converter 14a, arrangement of switching elements S1 and S3 for controlling regeneration to DC power supplies B1 and B2 can be omitted as compared with power converter 10 shown in FIG. 1. Namely, "first semiconductor element SM1" between node N1 and power line PL can be implemented only by diode D1 and "third semiconductor element SM3" between node N2 and power line GL can be implemented only by diode D3. Switching element S5b does not have to be arranged as in power converters 12a (FIG. 54) and 13a (FIG. 55). In power converter 14a, diodes D2 and D4 arranged mainly for securing a path for a regenerative current to DC power supplies B1 and B2 can also be omitted.

In each of power converters 12a to 14a as well, on and off of switching elements S2 to S5a is controlled in accordance with FIG. 12 (the parallel boost mode), FIG. 49 (the series boost mode), or FIG. 53 (other modes).

Similar modification to the circuit configuration is also applicable to power converter 11 according to the third embodiment. For example, when DC power supply B1 is not regeneratively charged but used only for discharging (power running), a configuration of a power converter 12b shown in FIG. 57 can be employed instead of power converter 11 shown in FIG. 37.

Figure 57:
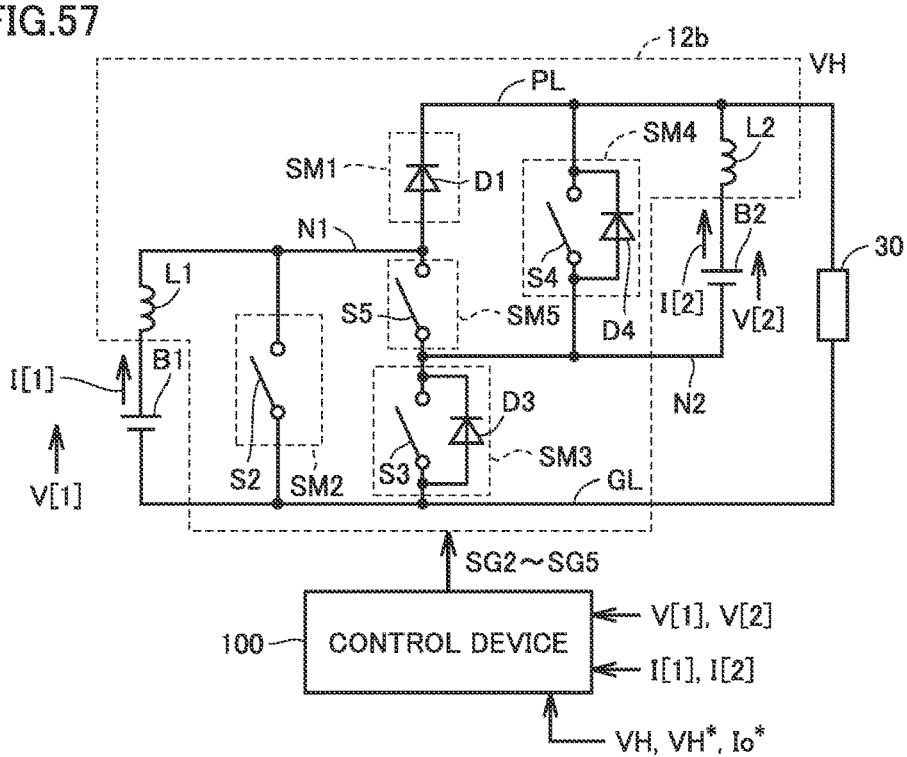
FIG. 57 is a circuit diagram showing a modification of the configuration of the power converter shown in FIG. 37 when the first DC power supply is not regeneratively charged.

Referring to FIG. 57, in power converter 12b, arrangement of switching element S1 for controlling regeneration to DC power supply B1 can be omitted as compared with power converter 11 shown in FIG. 37. "First semiconductor element SM1" between node N1 and power line PL can be implemented only by diode D1. In power converter 12b, diode D2 arranged mainly for securing a path for a regenerative current to DC power supply B1 can also be omitted.

Figure 58:
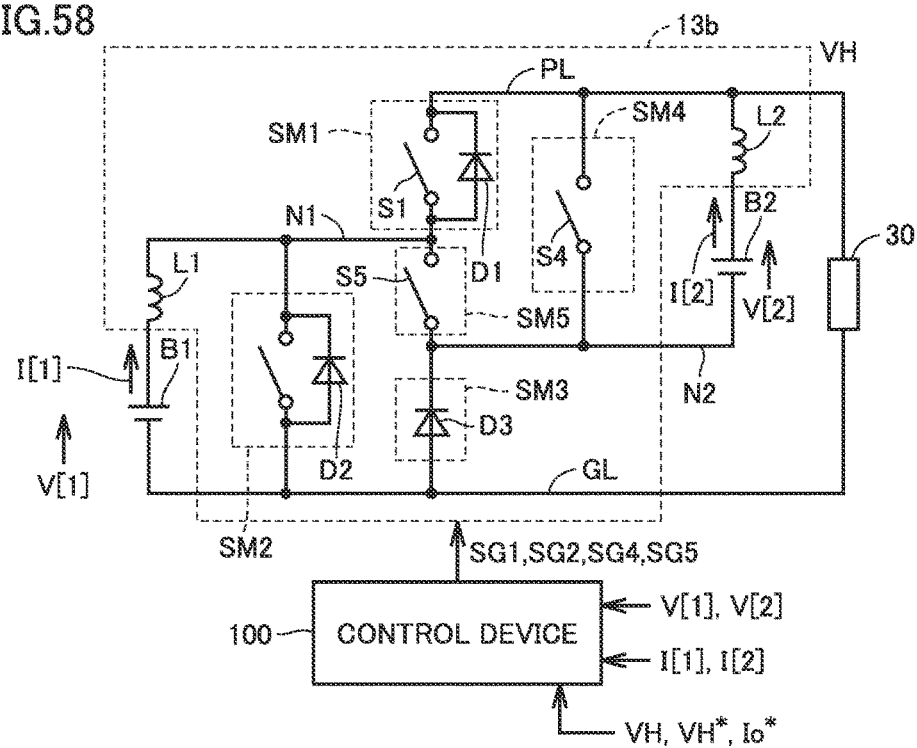
FIG. 58 is a circuit diagram showing a modification of the configuration of the power converter shown in FIG. 37 when the second DC power supply is not regeneratively charged.

Similarly, when DC power supply B2 is not regeneratively charged but used only for discharging (power running), a configuration of a power converter 13b shown in FIG. 58 can be employed.

Referring to FIG. 58, in power converter 13b, arrangement of switching element S3 for controlling regeneration to DC power supply B2 may be omitted as compared with power converter 11 shown in FIG. 37. "Third semiconductor element SM3" between node N2 and power line GL can be implemented only by diode D3. In power converter 13b, diode D4 arranged mainly for securing a path for a regenerative current to DC power supply B2 can also be omitted.

Figure 59:
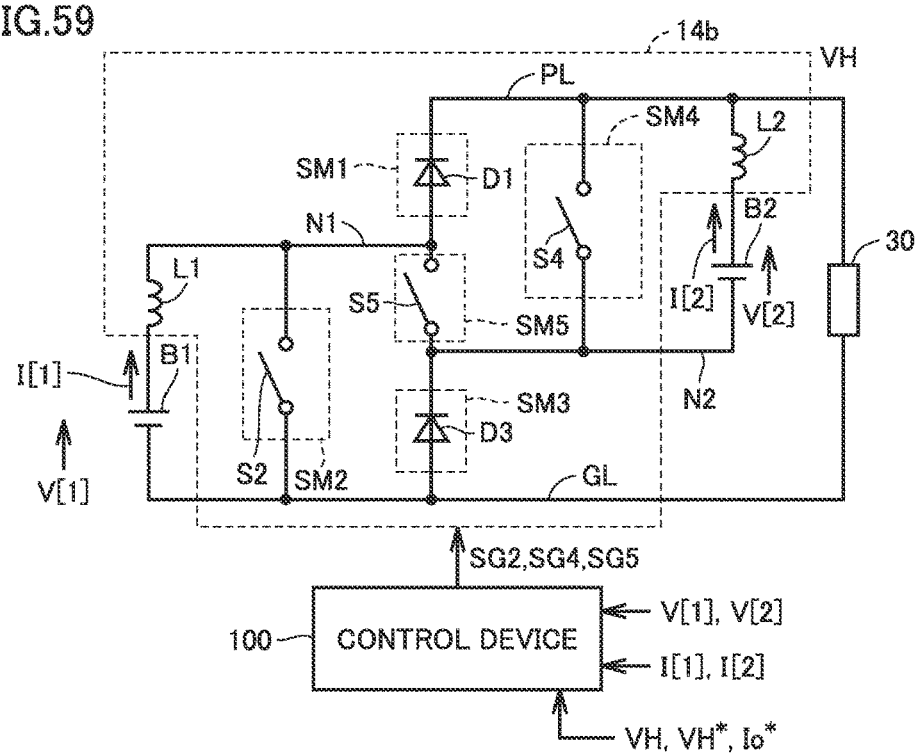
FIG. 59 is a circuit diagram showing a modification of the configuration of the power converter shown in FIG. 37 when the first and second DC power supplies are not regeneratively charged.

When neither of DC power supplies B1 and B2 is regeneratively charged but they are used only for discharging (power running), a configuration of a power converter 14b shown in FIG. 59 can be employed.

Referring to FIG. 59, in power converter 14b, arrangement of switching elements S1 and S3 for controlling regeneration to DC power supplies B1 and B2 can be omitted as compared with power converter 11 shown in FIG. 37. "First semiconductor element SM1" between node N1 and power line PL can be implemented only by diode D1 and "third semiconductor element SM3" between node N2 and power line GL can be implemented only by diode D3. In power converter 14a, diodes D2 and D4 arranged mainly for securing paths for regenerative currents to DC power supplies B1 and B2 can also be omitted.

In each of power converters 12b to 14b as well, on and off of switching elements S1, S2, S4, and S5 is controlled in accordance with FIG. 38 (the parallel boost mode), FIG. 52 (the series boost mode), or FIG. 53 (other modes).

By further providing switching element S1 in "first semiconductor element SM1" in the configuration of power converter 14a (FIG. 56) and power converter 14b (FIG. 59), DC power supply B1 can regeneratively be charged (FIGS. 55 and 58). In this case, as shown also in FIGS. 55 and 58, diode D2 is preferably connected in anti-parallel to switching element S2. By further providing switching element S3 in "third semiconductor element SM3" in the configuration of power converter 14a (FIG. 56) and power converter 14b (FIG. 59), DC power supply B2 can regeneratively be charged (FIGS. 54 and 57). In this case, as shown also in FIGS. 54 and 57, diode D4 is preferably connected in anti-parallel to switching element S4.

Regenerative charging can be applied to both of DC power supplies B1 and B2 by implementing each of "first semiconductor element SM1" to "fourth semiconductor element SM4" with a set of a switching element and a diode and having "fifth semiconductor element SM5" have a function to cut off a bidirectional current (a current from node N1 toward node N2 and a current from node N2 toward node N1) as in power converter 10 (FIG. 1) or power converter 11 (FIG. 37).

As shown in FIG. 32, when both of DC power supplies B1 and B2 perform the power running operation, a switching loss is distributed by moving the switching loss to switching element S1 (when the condition of IL2>IL1 is satisfied) or to switching element S3 (when the condition of IL1>IL2) is satisfied under switching control to set a time lag. Therefore, unevenness in increase in temperature among switching elements can be lessened by applying switching control described in the modification of the first embodiment to power converters 12a and 13a and power converters 12b and 13b where switching element S1 or S3 is arranged, among power converters 12a to 14a and 12b to 14b.

Though connection relation of switching elements S1 to S5 (S5a and S5b) and reactors L1 and L2 in the configuration of power converters 10 and 11 has been illustrated and described in the present embodiment, it is not intended to limit constituent elements of power converters 10 and 11 to these elements. Namely, in the present embodiment, the description constituent elements "being electrically connected" to each other encompasses the fact that other circuit elements or connector terminals are present between constituent elements and electrical connection between constituent elements is ensured via other circuit elements.

For example, when the configuration exemplified in FIG. 1 or 37 is configured such that a circuit portion (switching elements S3 to S5 (S5a and S5b)), diodes D3 and D4, reactor L2, and DC power supply B2 which remains in a general boost chopper circuit constituted of DC power supply B1, reactor L1, switching elements S1 and S2, and diodes D1 and D2 is made up as a separate unit and the unit is electrically connected to the boost chopper circuit through a connector terminal as well, the power converter and the power supply system according to the present embodiment are implemented so long as electrical connection relation among illustrated circuit elements is the same.

It is noted for confirmation purpose that load 30 can be implemented by any device in the present embodiment so long as the device operates with a DC voltage (output voltage VH). Namely, though an example in which load 30 is configured to include a traction motor of an electrically powered vehicle has been described in the present embodiment, application of the present invention is not limited to such a load.

It should be understood that the embodiments disclosed herein are illustrative and non-restrictive in every respect. The scope of the present invention is defined by the claims not by the description above, and is intended to include any modification within the meaning and scope equivalent to the terms of the claims.

REFERENCE SIGNS LIST

5 power supply system; 10, 11, 12a, 12b, 13a, 13b, 14a, 14b power converter; 30 load; 32 inverter; 35 motor generator; 36 power train; 37 drive wheel; 100 control device; 210, 220 controller; 230 PWM control unit; 240 carrier wave generation portion; 250 converter control unit; 252, 254 subtraction portion; B1, B2, PS DC power supply; CH smoothing capacitor; CHP boost chopper circuit; CW, CW1, CW2 carrier wave; D1-D4, D5a, D5b, D1, Du diode; DT, DT1, DT2 duty ratio; GL, PL power line; IL, IL1 IL2 reactor current; L, L1, L2 reactor; N1, N2 node; Pl1-Pl5 switching loss; S1, S2, S3b, S3, S4, S5, S5a, S5b, SG5b, S1, Su power switching element; SD, SD1, SD2 control pulse signal; SDoff1, SDoff2 forced pulse signal; SG1-SG5, SG5a, SG5b control signal; T(S1)-T(S3), T(S5) element temperature; VH DC voltage (output voltage); and VH* voltage command value

The invention claimed is:

1. A power supply system which controls a DC voltage between a first power line on a high voltage side and a second power line on a low voltage side, comprising:
    a first DC power supply;
    a second DC power supply;
    a power converter which carries out DC voltage conversion between the first and second DC power supplies and the first and second power lines; and
    a control device which controls an operation of the power converter,
    the power converter including:
        a first semiconductor element electrically connected between the first power line and a first node,
        a first reactor electrically connected in series with the first DC power supply, between the first node and the second power line,
        a second semiconductor element electrically connected between the second power line and the first node,
        a second reactor electrically connected in series with the second DC power supply, between a second node and the first power line,
        a third semiconductor element electrically connected between the second node and the second power line,
        a fourth semiconductor element electrically connected between the first power line and the second node, and
        a fifth semiconductor element electrically connected between the first node and the second node in an electrical path formed between the first node and the second node, without the second DC power supply being electrically connected in the electrical path formed between the first node and the second node,
    at least the fifth semiconductor element including a switching element which is configured to control formation and cut-off of at least one current path in response to a signal from the control device,
    each of a first reactor current which flows through the first reactor and a second reactor current which flows through the second reactor being controlled to have a plurality of inflection points in each control cycle as a result of control of on and off of the switching element in response to a control signal from the control device,
    the control device having a first switching control mode in which the control signal for the switching element is generated to turn on or off a plurality of the switching elements to simultaneously be turned on or off in a prescribed order with a time lag being set at least one of the plurality of inflection points produced in the first and second reactor currents, and
    in the first switching control mode, at the inflection point with the time lag being set, a switching loss being produced in a switching element turned off later or a switching element turned on earlier in accordance with the prescribed order.

2. The power supply system according to claim 1, wherein the control device generates the control signal for the switching element so as to realize such a current phase that a relative maximum point of the first reactor current and a relative minimum point of the second reactor current of the plurality of inflection points are identical in timing or a relative minimum point of the first reactor current and a relative maximum point of the second reactor current of the plurality of inflection points are identical in timing during a period in which both of the first and second DC power supplies perform a power running operation or a regeneration operation in the first switching control mode.

3. The power supply system according to claim 1, wherein the control device further has a second switching control mode in which the control signal for the switching element is generated without setting the time lag for the plurality of switching elements to simultaneously be turned on or off at each of the plurality of inflection points produced in the first and second reactor currents, and the control device generates the control signal for the switching element so as to alternately apply the first and second switching control modes.

4. The power supply system according to claim 1, wherein each of the first to fourth semiconductor elements includes:
the switching element for selectively forming an on state in which a current path is formed and an off state in which the current path is cut off, in response to the signal from the control device, and
a diode connected in anti-parallel to the switching element, for forming a current path during forward biasing, and
the at least one current path of which the formation and cut-off are controlled by the switching element of the fifth semiconductor element includes a current path between the first node and the second node.

5. The power supply system according to claim 1, wherein each of the first to fourth semiconductor elements includes:
the switching element for selectively forming an on state in which a current path is formed and an off state in which the current path is cut off, in response to the signal from the control device, and
a diode connected in anti-parallel to the switching element, for forming a current path during forward biasing, and
the at least one current path of which the formation and cut-off are controlled by the switching element of the fifth semiconductor element includes a current path from the first node to the second node and a current path from the second node to the first node.

6. The power supply system according to claim 1, wherein each of the second and fourth semiconductor elements includes a switching element,
a diode connected to have a direction from the first node toward the first power line as a forward direction and a diode connected to have a direction from the second power line toward the second node as the forward direction are provided in the first and third semiconductor elements, respectively,
the at least one current path of which the formation and cut-off are controlled by the switching element of the fifth semiconductor element includes a current path from the first node to the second node,
the switching element connected in parallel with the diode is further provided in any one of the first and third semiconductor elements.

7. The power supply system according to claim 1, wherein the fifth semiconductor element includes:
(i) a first diode and a first switching element electrically connected in series between the first node and the second node; and
(ii) a second diode and a second switching element electrically connected in series between the first node and the second node, the second diode and the second switching element being connected between the first nodes and the second node in parallel to the first diode and the first switching element.

8. The power supply system according to claim 1, wherein the third semiconductor element includes a switching element connected in parallel with a diode, and
the third semiconductor element is in an electrical path formed between the second node and the second power line, with the third semiconductor element being directly connected to the second power line in the electrical path formed between the second node and the second power line.

9. The power supply system according to claim 1, wherein the fourth semiconductor element includes a switching element connected in parallel with a diode, and the fourth semiconductor element is electrically connected in parallel with the first reactor, between the first node and the second power line.

10. The power supply system according to claim 2, wherein
the control device further has a second switching control mode in which the control signal for the switching element is generated without setting the time lag for the plurality of switching elements to simultaneously be turned on or off at each of the plurality of inflection points produced in the first and second reactor currents, and
the control device generates the control signal for the switching element so as to alternately apply the first and second switching control modes.

* * * * *